United States Patent
Goldberg et al.

(10) Patent No.: US 6,217,695 B1
(45) Date of Patent: Apr. 17, 2001

(54) METHOD AND APPARATUS FOR RADIATION HEATING SUBSTRATES AND APPLYING EXTRUDED MATERIAL

(75) Inventors: David A. Goldberg; Ira S. Faberman, both of Boulder, CO (US)

(73) Assignee: WMW Systems, LLC, Boulder, CO (US)

( * ) Notice: Subject to any disclaimer, the term of this patent is extended or adjusted under 35 U.S.C. 154(b) by 0 days.

(21) Appl. No.: 09/187,446

(22) Filed: Nov. 6, 1998

Related U.S. Application Data

(63) Continuation-in-part of application No. PCT/US97/07773, filed on May 6, 1997
(60) Provisional application No. 60/082,103, filed on Apr. 17, 1998, provisional application No. 60/082,099, filed on Apr. 17, 1998, and provisional application No. 60/016,905, filed on May 6, 1996.

(51) Int. Cl.$^7$ ...................................................... B32B 31/12
(52) U.S. Cl. .................. 156/244.17; 156/244.23; 156/272.2; 156/272.8; 156/273.3; 156/321; 156/322; 427/554; 427/557; 427/314
(58) Field of Search .................. 156/244.17, 244.23, 156/272.2, 273.3, 321, 322, 272.8; 427/542, 557, 314, 322, 324, 325, 554, 316; 264/446, 476, 492

(56) References Cited

U.S. PATENT DOCUMENTS

| | | | |
|---|---|---|---|
| 2,375,113 | * | 5/1945 | Klammt et al. .................... 427/557 |
| 2,852,407 | | 9/1958 | Wood, Jr. et al. .................... 117/4 |
| 2,944,586 | * | 7/1960 | Yanulis ............................ 156/244.18 |
| 3,281,259 | | 10/1966 | Lux et al. ............................ 117/11 |
| 3,498,865 | * | 3/1970 | Pauin et al. ...................... 156/244.17 |
| 3,551,199 | | 12/1970 | Forster ................................ 117/227 |
| 3,570,748 | | 3/1971 | Coyle et al. .......................... 229/53 |
| 3,911,173 | | 10/1975 | Sprague, Jr. ........................ 427/207 |
| 3,924,013 | * | 12/1975 | Kane ................................. 156/244.23 |
| 3,944,453 | | 3/1976 | Chudgar et al. ....................... 156/143 |
| 4,082,854 | | 4/1978 | Yamada et al. ....................... 426/106 |
| 4,234,624 | | 11/1980 | Linderoth et al. ...................... 427/55 |
| 4,390,387 | | 6/1983 | Mahn ................................... 428/90 |
| 4,484,971 | | 11/1984 | Wang ............................... 156/244.14 |

(List continued on next page.)

FOREIGN PATENT DOCUMENTS

0644032 A2 * 3/1995 (EP).

*Primary Examiner*—Michael W. Ball
*Assistant Examiner*—Michael A Tolin
(74) *Attorney, Agent, or Firm*—Sheridan Ross P.C.

(57) ABSTRACT

A method and apparatus for applying an extrudable material to a substrate, in which a concentrated light beam is directed onto the substrate before or after the application of the extrudable material. The energy of the beam is concentrated on the substrate surface, wherein it is subsequently transferred to the extrudable material deposited on its surface, thereby increasing the temperature and lowering the viscosity of the closely situated material so as to facilitate material penetration into the substrate. This method allows the use of illumination of modest energy density, of wavelengths absorbed by the extrudable material, or of such cross-sectional extent that it may not be transmitted through the extrusion device by which the extrudable material is deposited. When the extrudable material is an adhesive and is applied to a plurality of substrates, of which at least one is treated with a light beam according to this method, and the extrudable materials adhered to the substrates are brought into contact, the joining of the extrudable materials creates a strong bond between the substrates. Also, differential material heating near the substrate can create differential material properties as a function of the distance from the substrate. In addition, uniform treatment can be provided through either closed-loop or open-loop process control.

20 Claims, 21 Drawing Sheets

DIRECTION OF SUBSTRATE MOVEMENT

U.S. PATENT DOCUMENTS

| | | | |
|---|---|---|---|
| 4,525,414 | 6/1985 | Ohya et al. | 428/213 |
| 4,528,219 | 7/1985 | Yamada et al. | 428/35 |
| 4,559,095 | 12/1985 | Babbin | 156/244.13 |
| 4,636,609 | 1/1987 | Nakamata | 219/121 LD |
| 4,644,127 | 2/1987 | La Rocca | 219/121 FS |
| 4,861,404 | 8/1989 | Neff | 156/204 |
| 4,902,378 | 2/1990 | Ouderkirk et al. | 156/643 |
| 4,931,125 | 6/1990 | Volkmann et al. | 156/272.8 |
| 4,936,938 | 6/1990 | Simpson et al. | 156/244.23 |
| 4,954,393 | 9/1990 | Jones | 428/288 |
| 5,189,130 * | 2/1993 | Kageyama | 526/352 |
| 5,213,900 | 5/1993 | Friedrich | 428/474.4 |
| 5,348,604 | 9/1994 | Neff | 156/272.8 |
| 5,549,943 | 8/1996 | Vicik | 428/34.8 |
| 5,840,147 * | 11/1998 | Grimm | 156/272.2 |

* cited by examiner

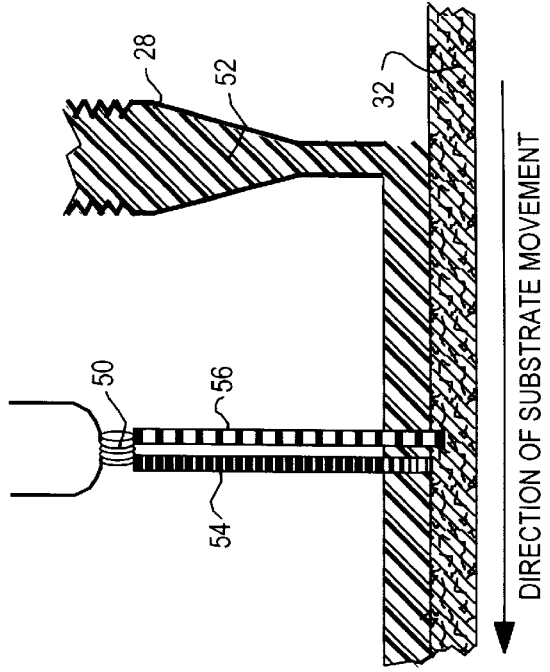
*FIG. 7*
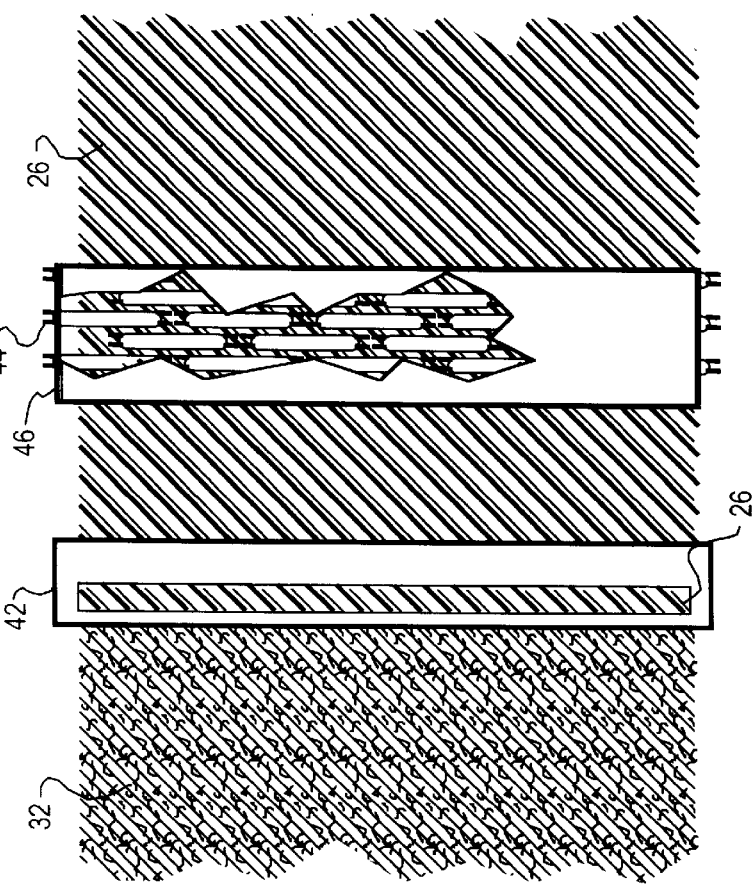
*FIG. 6*
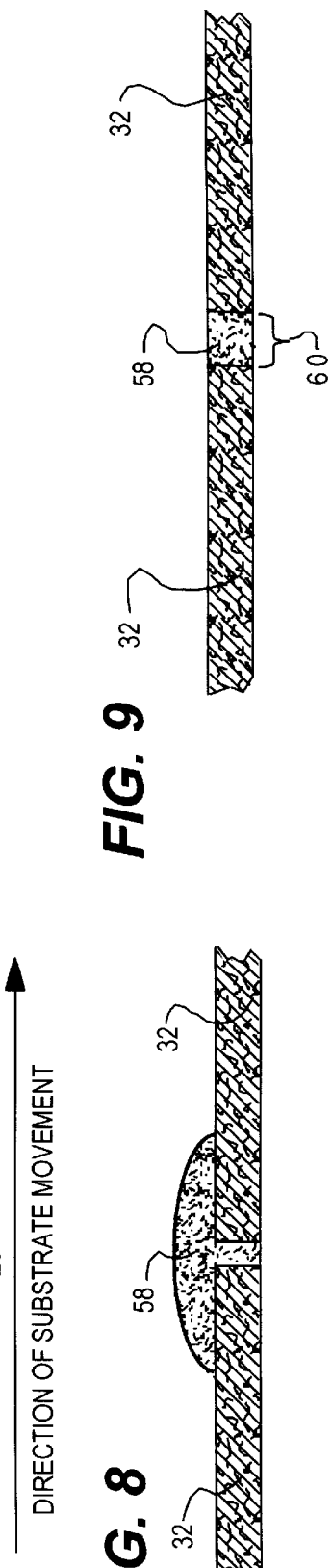
*FIG. 9*
*FIG. 8*

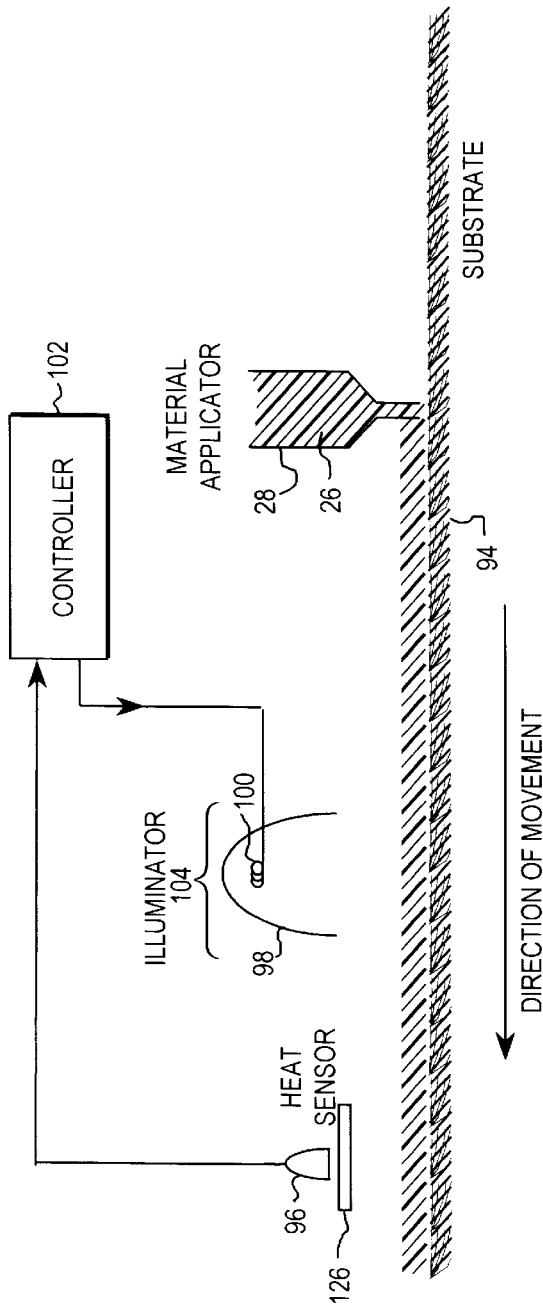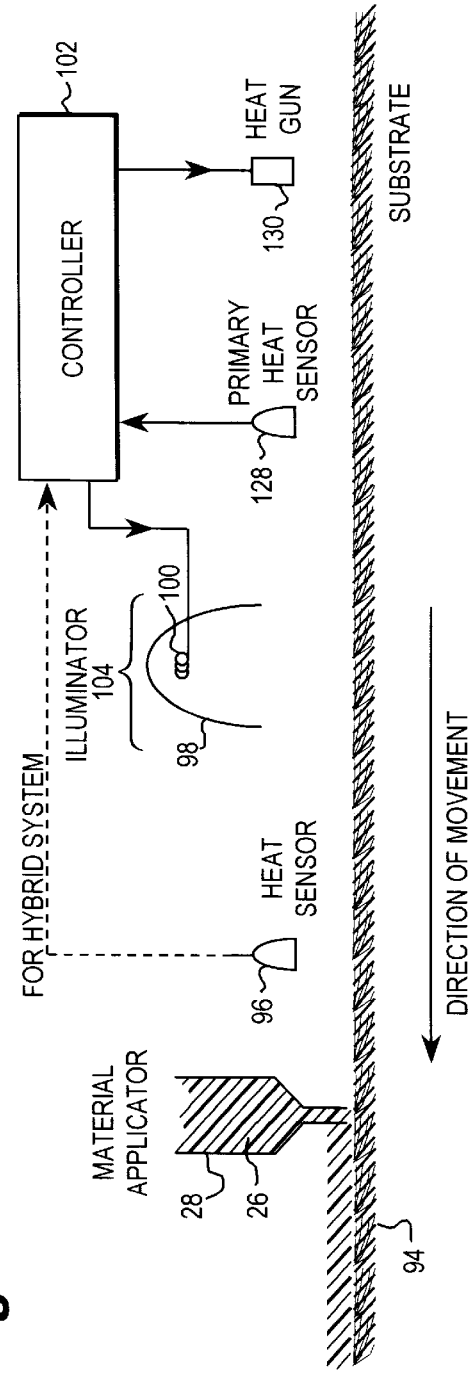
Fig. 19
Fig. 20

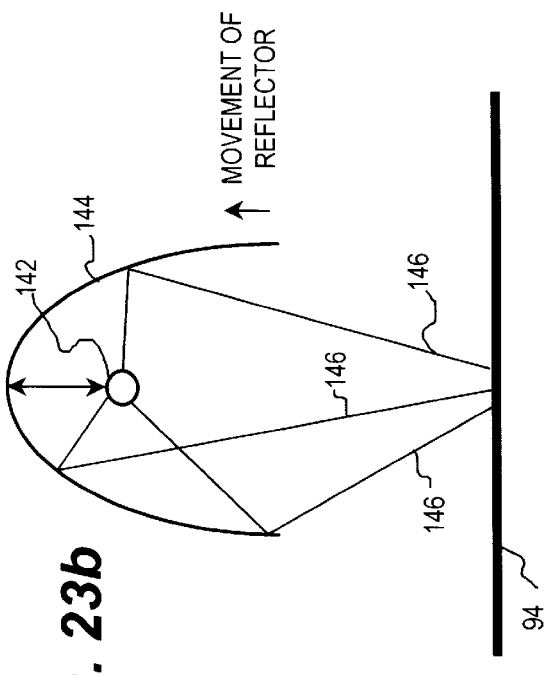
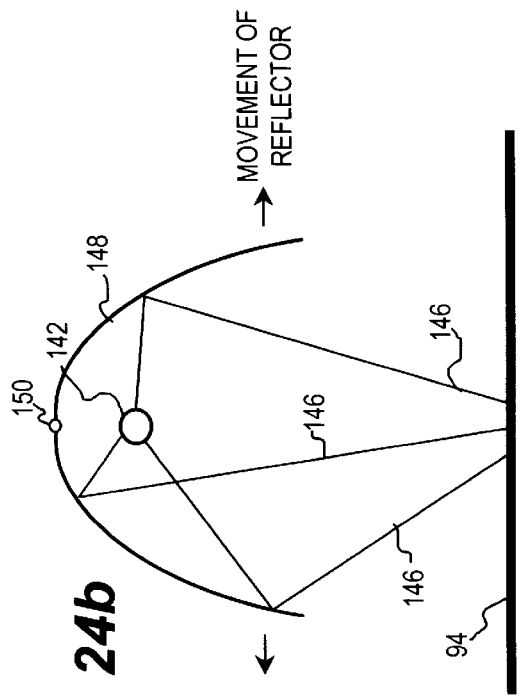
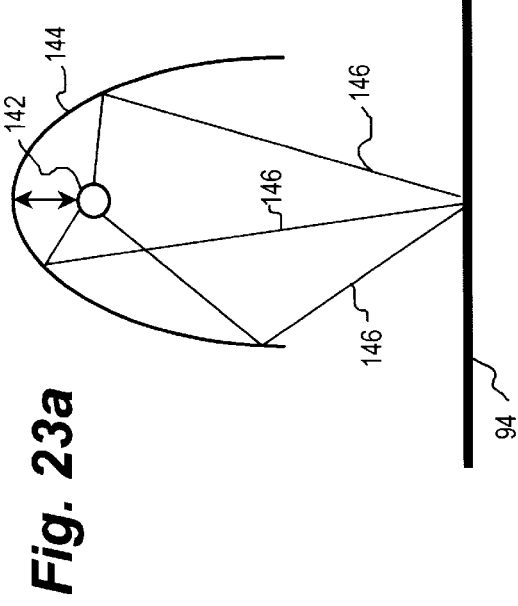
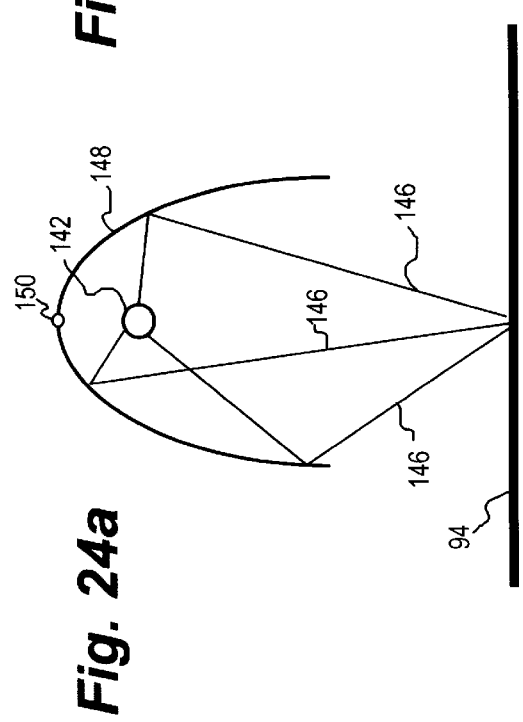

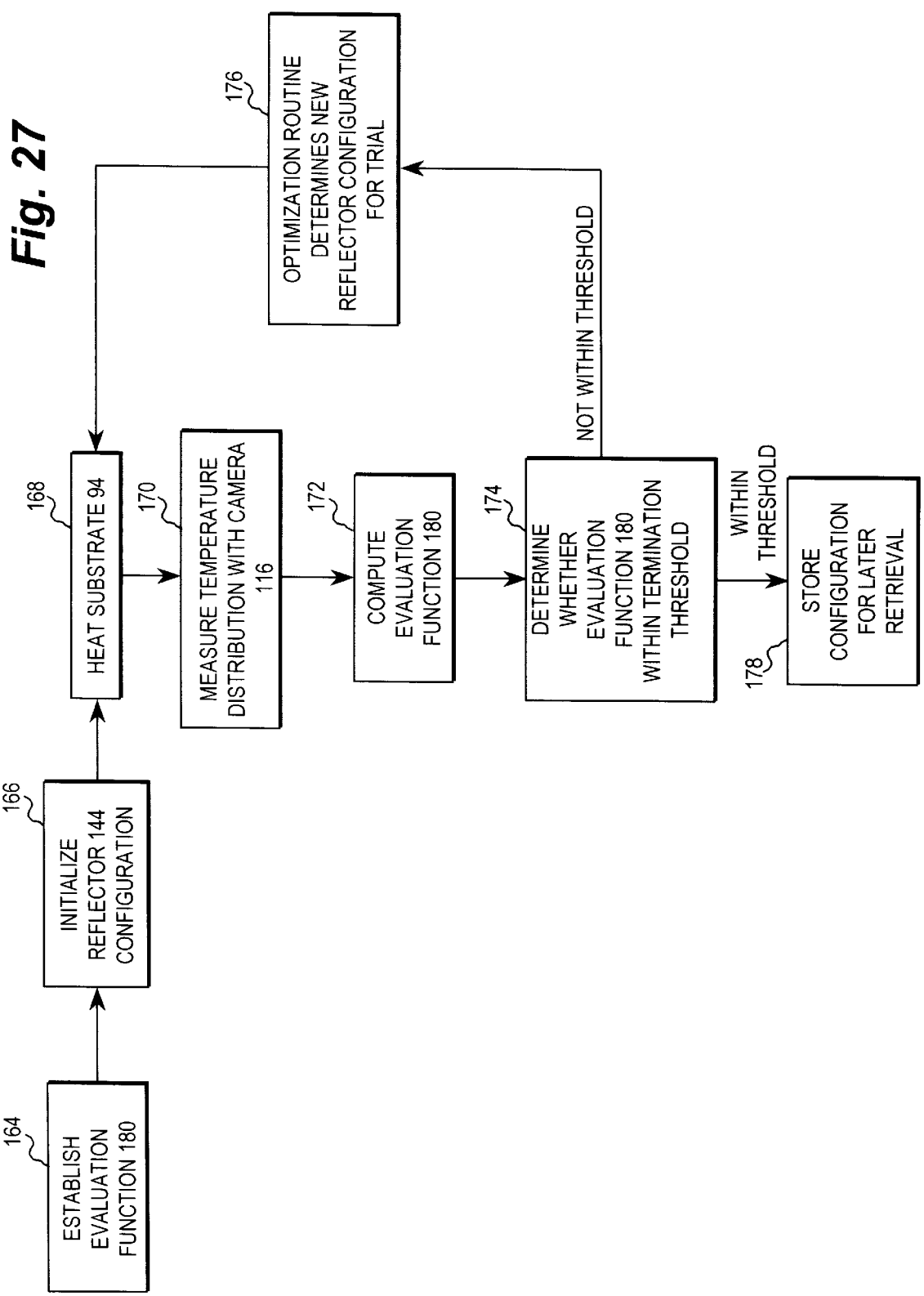

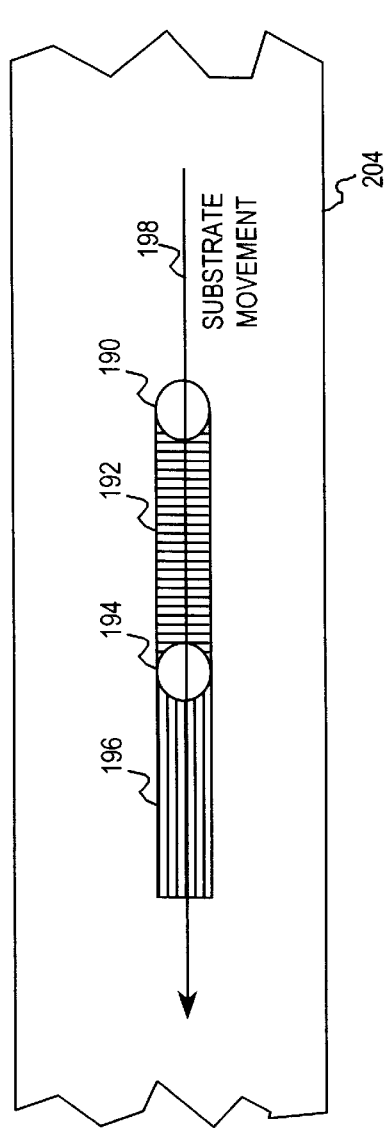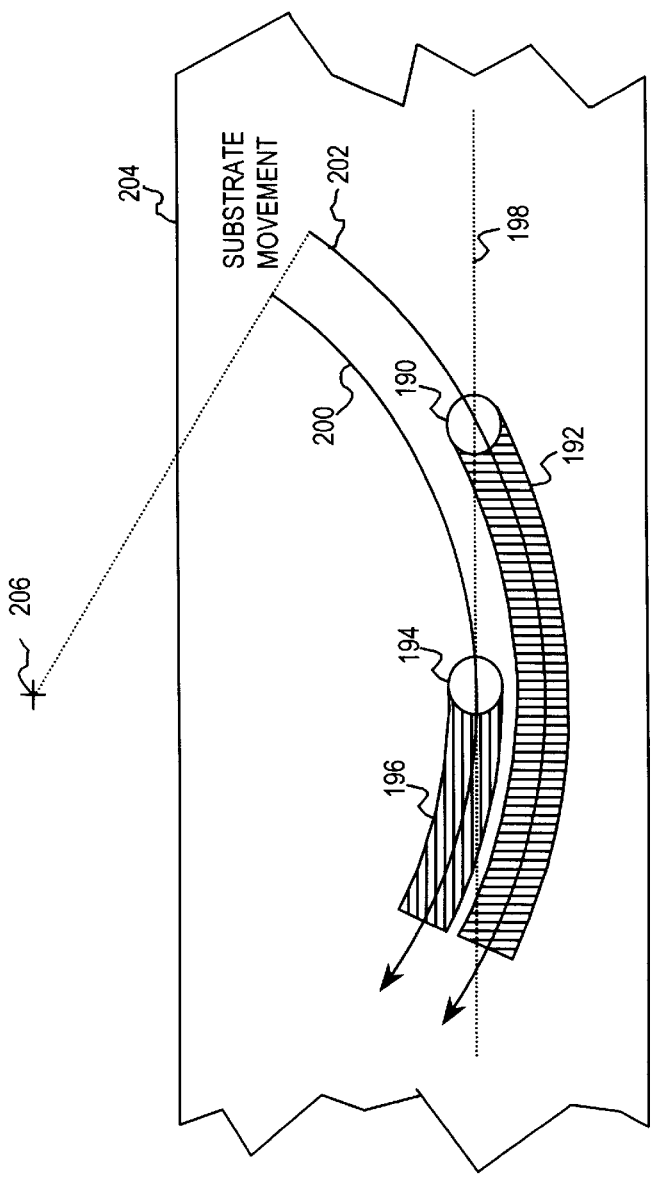
Fig. 28a
Fig. 28b

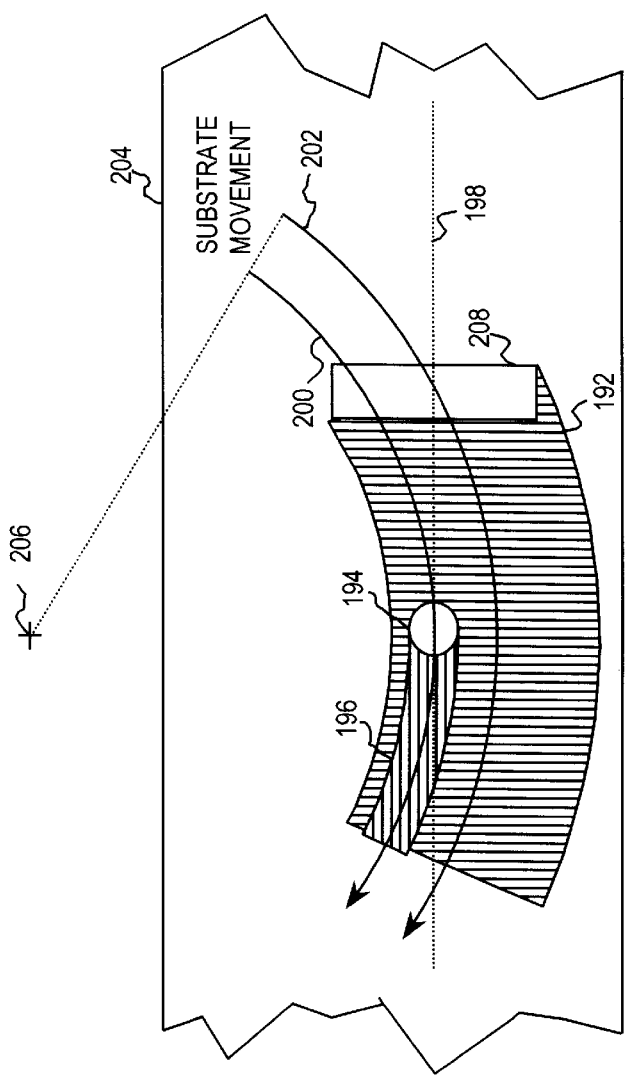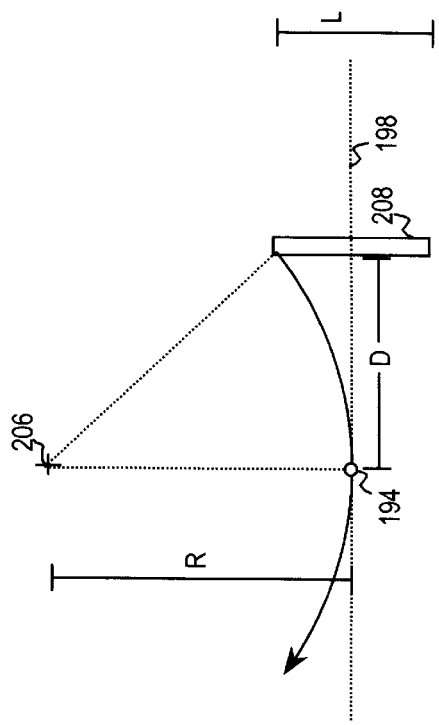
Fig. 29
Fig. 30

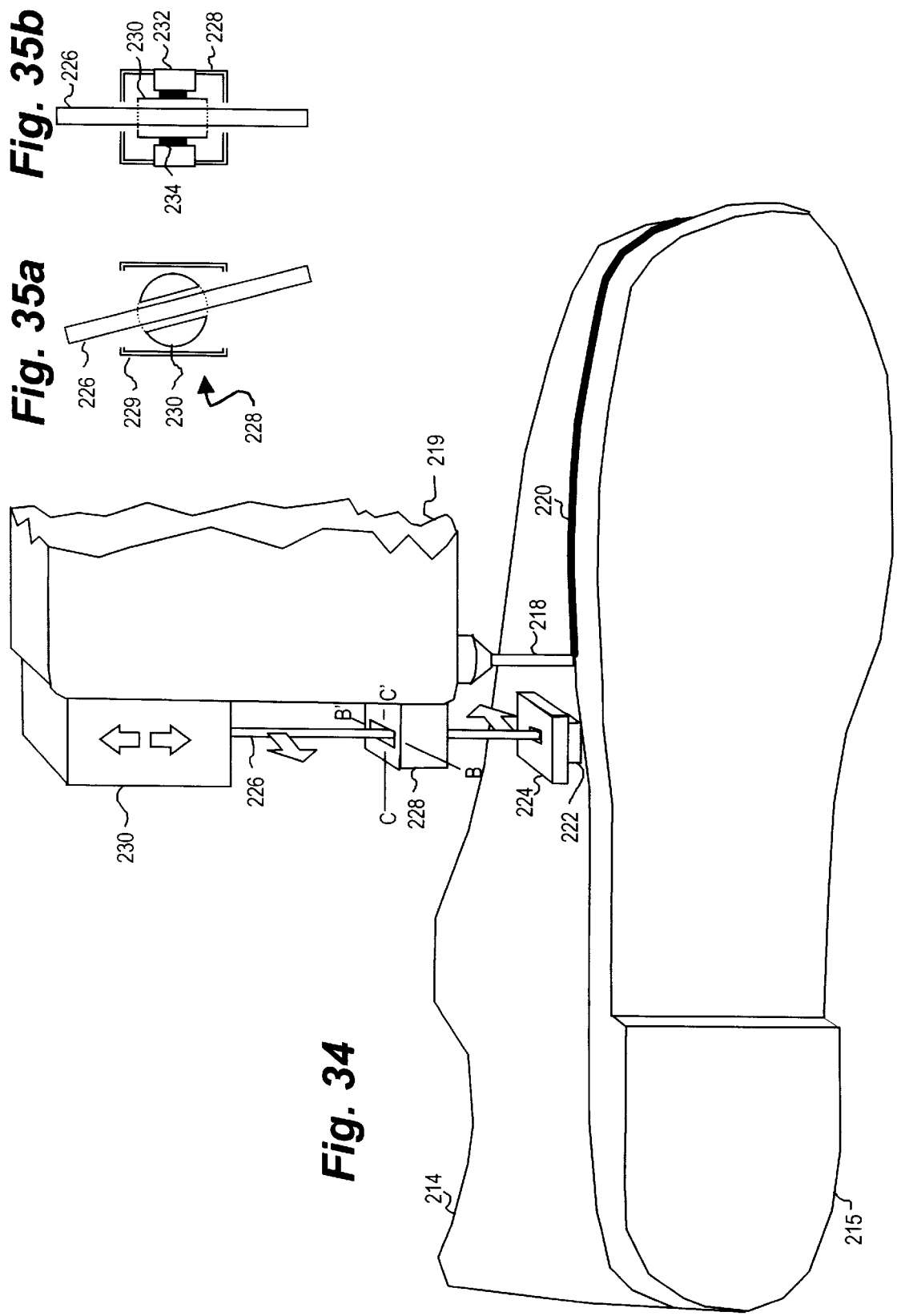

METHOD AND APPARATUS FOR RADIATION HEATING SUBSTRATES AND APPLYING EXTRUDED MATERIAL

CROSS-REFERENCE TO RELATED PATENT APPLICATIONS

This application is related to and claims priority under 35 U.S.C. § 119(e) from U.S. Provisional Patent Application No. 60/082,099, filed Apr. 17, 1998, titled "Process Control Methods for Radiation Heating Substrates and Applying Extrudable Material," and from U.S. Provisional Patent Application No. 60/082,103, filed Apr. 17, 1998, titled "Coordinated Movement of Applicator and Illuminator for Radiation Heating Substrates and Applying Extruded Material," the contents of each which are incorporated herein by reference. This application also claims priority under 35 U.S.C. §§ 119(e), 120, 365 from Provisional Patent Application No. 60/016,905, filed May 6, 1996, titled "Method for Extrudable Material Application with Light-Mediated Heating of the Substrate," CIP PCT Application No. PCT/US97/07773, filed May 6, 1997, the contents of which are incorporated herein by reference.

TECHNICAL FIELD

This invention relates to the application of extrudable materials to substrates, which may be used for the adhesive bonding of a plurality of substrates.

BACKGROUND ART

The application of extrudable materials to substrates to form protective films, penetrating films, films with beneficial optical, electrical, aesthetic or physical properties, or for adhesive bonding is widely used. Such practices include the use of varnishes to protect wood surfaces, paints to protect and embellish wood, plastic, ceramic or metallic surfaces, and the use of hot-melt and solvent-based adhesives to bond a wide variety of substrates. Examples of extrudable adhesive use include the bonding of metallic, fabric, foam, wood, leather, and plastic substrates in the assembly of such products as furniture, packaging, automotive subassemblies, wooden and metallic windows, trade show exhibits and point-of-purchase displays, electrical components, apparel, luggage, and more.

Many treatments are known to affect the joining of an applied extrudable material to a substrate. Many of these include the use either of chemical reagents to pre-treat the substrate, or the use of laser irradiation either as a pre-treatment (U.S. Pat. No. 4,931,125 to Volkmann et al. and U.S. Pat. No. 4,644,127 to LaRocca), a post-treatment (U.S. Pat. No. 4,861,404 to Neff and U.S. Pat. No. 4,636,609 to Nakamata), or simultaneous with the application of the material to the substrate (U.S. Pat. No. 5,348,604 to Neff).

U.S. Pat. No. 4,931,125 to Volkmann et al. describes a method for pre-treatment of components using a laser beam to create projections and/or depressions in the substrate. This treatment is limited in the types of substrates to which it can be applied, and is generally useful only for non-porous substrates. Also, because of the multiple processes (pre-treatment, followed by bonding) required by this method, it may be expensive to implement in certain industrial environments.

U.S. Pat. No. 4,636,609 to Nakamata teaches the joining of two different kinds of solid synthetic resins, wherein the laser irradiation is used to melt together the two dissimilar resins. This method involves the direct fusion of dissimilar solid synthetic substrates only, and requires specific physical and optical properties for the combination of substrates that significantly limit the range of substrates that may be used.

U.S. Pat. No. 4,644,127 to La Rocca uses a laser to assist in the bonding of metallic pieces. This method teaches the melting of the applied metal by the laser beam prior to its application to the substrate surface, and therefore the substrates are limited to metallic substrates and the applied materials are limited to gas streams containing powdered metals.

The method of U.S. Pat. No. 4,861,404 to Neff involves the transfer of heat from a laser directly to the bulk extrudable material for purposes of heating the material. However, this requires extremely high energy densities, since the energy is not concentrated at the interface between the substrate and the material, where the deposited energy has its greatest effect, but is distributed throughout the material. Furthermore, because the extrudable material is heated in bulk, this greatly increases the time required for the material to regain structural integrity (the "closing" time), an important factor in many manufacturing applications. In addition, this method requires certain optical properties of the extrudable material that limit the range of its application.

The method of U.S. Pat. No. 5,348,604 to Neff requires that light-energy pass through the extrudable material within the nozzle apparatus. Because of the high energy densities required in the technique, this is generally practical only with light energy from a laser that, as discussed below, is difficult and expensive in many manufacturing environments. Furthermore, this method precludes the use of the light energy which passes through the adhesive from initiating a catalysis of the extrudable materials, such as those used to strengthen certain hot-melt adhesives, since the curing of any adhesive that resides within the nozzle would render the nozzle inoperable. In addition, this method requires special optical properties of the extrudable material that limit its range of applications. Also, this method places limits on the extrusion apparatus for the material that increases the cost and complexity of the apparatus.

The prior art described above generally involves laser irradiation of the extrudable material or the substrate. While lasers excel at providing highly concentrated radiation, high-power lasers tend to be complicated and costly to operate, including YAG lasers, which are often used because of the superior quality of the wavelength of light produced. Furthermore, due to the requirement of precisely orienting and placing the laser mirrors, as well as the use of sophisticated water-cooling mechanisms for certain laser classes, including YAG lasers, which require water-purifiers, heat-exchangers, and refrigerator systems, lasers in industrial environments may require frequent maintenance. Also, many high-power lasers, including YAG lasers, output only a small fraction of the electrical-energy input, requiring large power supplies, waste heat elimination systems, and large power usage for relatively small power applications. In general, high-power lasers are expensive to purchase, operate and maintain. All of these disadvantages make high-power lasers, and the methods that employ them, unsuitable for many industrial applications.

It was our intention to create a method that could use simple and inexpensive devices to enhance the bonding of extrudable materials to a substrate. It was our intention to solve the problems of the prior art that gave rise to the current invention.

SUMMARY OF THE INVENTION

It is an object of the present invention to provide a method of applying an extrudable material to a substrate with a strong bond.

It is in addition an object of the present invention to provide a method of applying an extrudable material to a substrate that is applicable in a wide range of applications.

It is another object of the present invention to provide an inexpensive method of applying an extrudable material to a substrate, wherein the method uses inexpensive devices.

It is still another object of the present invention to provide an inexpensive method of applying an extrudable material to a substrate, wherein the method uses easy-to-maintain devices.

It is further an object of the present invention to provide an energy-efficient method of applying an extrudable material to a substrate.

It is also an object of the present invention to provide a method of applying an extrudable material to a substrate, wherein the method is suitable for large-area surfaces.

It is additionally an object of the present invention to provide a method of applying a wide range of extrudable materials to a substrate with a strong bond.

It is still further an object of the present invention to provide a method of applying an extrudable material to a wide range of substrates.

It is yet another object of the present invention to provide a method of applying an extrudable material to a substrate, in such a way that the "closing time" of the substrate is short.

It is still further an object of the present invention to provide a method of applying an extrudable material to a substrate, using low energy density irradiation sources.

It is yet another object of the present invention to provide a method of applying an extrudable material to a substrate, wherein the material can be applied to the substrate through small orifices.

Additional objects, advantages and novel features of this invention shall be set forth in part in the description that follows, and will become apparent to those skilled in the art upon examination of the following specification or may be learned through the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to a method for applying an extrudable material to an opaque substrate which is heated with light from a radiant heat source. The method includes the steps of irradiating the substrate with the radiant heat with sufficient energy to substantially heat the substrate, but not to pyrolyze its constituents, and applying the extrudable material within approximately 1 minute to the substrate at a location upon which the light was directed.

The radiant heat may be generated by a laser, which may be a carbon-dioxide laser or a linear diode array.

The radiant heat may also be generated by a substantially isotropic energy illumination source, which may be a high-pressure xenon arc lamp, or a coiled tungsten wire. The longitudinal axis of the coiled tungsten wire may be oriented approximately parallel to the direction of movement of the substrate relative to the area of application of the material. The radiant heat may be collected using a reflecting surface. This reflecting surface may be constructed so that one of its cross-sections may contain a shape selected from the group consisting of ellipses, circles and parabolas. The radiant heat may be collected using a converging optical lens.

The radiant heat may irradiate the substrate with greater than 50 mJ/mm$^2$, or may irradiate the substrate with greater than 250 mJ/mm$^2$. The material may be applied to the substrate within approximately 5 seconds of the irradiation of the substrate The substrate may be treated to improve its absorption of radiant heat, prior to the step of irradiating. This treatment may involve the application of a highly absorbing material to the substrate.

The substrate may be protected from oxidation while irradiating by means of a stream of non-reactive gas which excludes oxygen-bearing atmosphere from contacting the substrate.

The method may be used in combination with the heat-activatable material, wherein the material comprises a bulk heat-activatable agent whose temperature of heat-activation is below that of the temperature of the molten material at the time of application and a particle heat-activatable agent including particles of diameter less than 100 microns, whose temperature of heat-activation is above that of the temperature of the molten material at the time of application to the heated area and whose temperature of heat-activation is below that of the heated area, where the particles are homogeneously mixed within the bulk agent. The particles may have a diameter of less than 25 microns and may have a temperature of heat-activation that is greater than 50° C. above that of the temperature of the molten material at the time of application to the heated area.

The present invention is also related to a method which includes the steps of applying the extrudable material to the substrate, and irradiating the substrate with radiant heat at a location upon which the extrudable material has previously been applied, using sufficient energy to substantially heat the substrate, but not to pyrolyze its constituents. The energy density of the radiant heat on the substrate may be greater than 50 mJ/mm$^2$, or may be greater than 250 mJ/mm$^2$.

The radiant heat may be generated by a laser, which may be a linear diode array.

The radiant heat field may also be generated by a substantially isotropic energy illumination source, which may be a high-pressure xenon arc lamp, or a coiled tungsten wire. The radiant heat may be collected using a reflecting surface. This reflecting surface may be constructed so that one of its cross-sections may contain a shape selected from the group consisting of ellipses, circles and parabolas. The longitudinal axis of the coiled tungsten wire may be oriented approximately parallel to the direction of movement of the substrate relative to the area of application of the material.

The radiant heat from the substantially isotropic energy illumination source may be collected using a converging optical lens.

The substrate may be treated to improve its absorption of radiant heat, prior to the step of irradiating. This treatment may involve the application of a highly absorbing material to the substrate.

The extrudable material may include a light-activatable cross-linkable material whose rate of cross-linking may be dependent on the heat of the material.

The method may be used in combination with the heat-activatable material, wherein the material comprises a bulk heat-activatable agent whose temperature of heat-activation is below that of the temperature of the molten material at the time of application and a particle heat-activatable agent including particles of diameter less than 100 microns, whose temperature of heat-activation is above that of the temperature of the molten material at the time of application to the heated area and whose temperature of heat-activation is below that of the heated area, where the particles are homogeneously mixed within the bulk agent. The particles may have a diameter of less than 25 microns and may have a temperature of heat-activation that is greater than 50° C. above that of the temperature of the molten material at the time of application to the heated area. The particles may have a diameter of less than 25 microns, and may be cross-linkable.

The present invention is also related to a device for applying a heat-activatable material to a solid substrate to form a bond, including an extruder, a transporter for moving the area relative to the extruder and a radiant heater that produces radiant energy with sufficient power to irradiate the area with an energy density on the substrate that is greater than approximately 50 mJ/mm$^2$.

The heater may be disposed relative to the extruder so that the area is heated by the radiant heater prior to the application of material by the extruder, or the heater may be disposed relative to the extruder so that the area is heated by the radiant heater subsequent to the application of material by the extruder.

The radiant heat may include a laser, and the laser may include a diode array. The radiant heat may include an energy transducer that generates substantially isotropic heat radiation. This energy transducer may include a xenon arc lamp or a coiled tungsten wire. The coiled tungsten wire may be substantially linear and may be oriented approximately parallel to the predetermined direction of movement.

The radiant heater may include a reflector that collects heat radiation from the energy transducer using a reflecting surface. The reflector may contain a shape through one of its cross-sections that is substantially in a form selected from the group consisting of ellipses, circles and parabolas. If the shape is substantially an ellipse, the ratio of the long axis to the short axis may be less than 1.33 or may be less than 1.2.

The radiant heater may include an air cleanser that disperses gas over the reflective surface of the reflector, and the dispersed gas may be provided as a laminar flow over the surface of the reflector.

The radiant heater may include a converging optical lens that collects heat radiation from the energy transducer.

The radiant heater may have sufficient power to irradiate the substrate with an energy density that is greater than approximately of 50 mJ/mm$^2$, or greater than 250 mJ/mm$^2$. The material may be applied to the substrate within approximately 0.1 minute of the irradiation of the substrate.

The radiant heater may include a frequency-responsive optical discriminator.

The device may include a surface modifier that modifies the substrate to promote absorption of radiant heat, prior to irradiating the substrate, where the modifying may comprise applying a radiant-heat absorbing compound onto the substrate.

The device may include a venter that vents a stream of non-reactive gas over the substrate.

The device may include a temperature sensor responsive to the temperature of the substrate and a controller which is responsive to the signals of the temperature sensor, and which generates controlling signals to which the radiant heater is responsive. The temperature sensor may include a plurality of heat detectors, each of which is deployed so that it detects heat emanating from distinct regions on the substrate. One heat detector may be deployed so that it detects heat emanating from a region on the substrate that has not been irradiated by the radiant heater.

The radiant heater may include an optical element in which the shape or positional configuration of the optical element may be changed.

The irradiation may be greater than 50% of the amount at which substantial degradation of the substrate in the area occurs.

The device may further include a movement controller that generates movement control signals, an extruder conveyance that moves the extruder, and a radiant heater conveyance that moves the radiant heater. The extruder conveyance may move the extruder substantially perpendicular to the substrate movement, and the radiant heater conveyance may move the radiant heater substantially perpendicular to the substrate movement. The movement controller may generate controlling signals to which the radiant heater is responsive.

The present invention is also related to a device for bonding a first and second solid substrate with a heat-activatable material, including an extruder, a first heater and a second radiant heater and a joiner.

The present invention is further related to a heat-activatable material for bonding to a heated substrate, comprising a bulk heat-activatable agent and a particle heat-activatable agent including particles of diameter less than 100 microns, wherein the particles are homogeneously mixed within the bulk agent. The diameter of the particles may be less than 25 microns, cross-linkable, or chemically-reactive with the substrate.

BRIEF DESCRIPTION OF THE DRAWINGS

FIG. 6 is a cut-away top view of a fifth embodiment of the present invention, including an areal deposition device, in which the substrate is heated after extrudable material application.

FIG. 7 is a cross-sectional schematic of a sixth embodiment of the present invention, depicting the initiation of cross-linking in a light-activatable cross-linkable extrudable material by means of a broad spectrum lighting source that simultaneously performs light-mediation heating of the substrate.

FIG. 8 is a schematic cross-section of an article made using the sinuous or linear deposition method of this invention, as might be made using the devices of FIG. 1, FIG. 2, FIG. 3, or FIG. 7, in which light-mediated substrate heating is used on surfaces which are closely opposed, where the cross-section is perpendicular to the direction of movement of the substrate.

FIG. 9 is a schematic cross-section of an article made using the sinuous or linear deposition method of this invention, as might be made using the devices of FIG. 1, FIG. 2, FIG. 3, or FIG. 7, in which light-mediated substrate heating is used on surfaces which are separated by a more substantial gap than shown in FIG. 8, where the cross-section is perpendicular to the direction of movement of the substrate.

FIG. 18b is a graph of the temperature distribution along a cross-section of the substrate shown in FIG. 18a.

FIG. 19 is a schematic of an embodiment of the present invention in which the illuminator acts on the substrate subsequent to extrudable material deposition.

FIG. 20 is a schematic of an embodiment of the present invention that employs open-loop process control.

FIG. 23a and FIG. 23b are cross-sectional schematics of a trough illuminator in which the reflector moves relative to the enclosed heating element.

FIG. 24a and FIG. 24b are cross-section schematics of a trough illuminator in which the shape of the reflector may be adjusted.

FIG. 27 is a flow diagram of the steps for calibrating the control response system that uses gradient descent optimization for calibration.

FIG. 28a is a top-view schematic diagram of sinuous deposition in which the heat application point and the extrudable material deposition point are separated, and the substrate movement is linear.

FIG. 28b is a top-view schematic diagram of sinuous deposition as in FIG. 28a, in which the substrate is pivoting about a pivot point.

FIG. 29 is a top-view schematic diagram of a sinuous deposition apparatus in which the light application location is of a fixed, elongated length.

FIG. 30 is a schematic diagram of an apparatus as in FIG. 29, in which important physical relationships are depicted.

FIG. 34 is a perspective view of a sinuous deposition apparatus for bonding a shoe top to a sole, in which the point of light application can move in three dimensions.

FIG. 35a is a cross-section of a rotating pivot used in the apparatus of FIG. 34.

FIG. 35b is another cross-section of the rotating pivot used in the apparatus of FIG. 34.

BEST MODE FOR CARRYING-OUT THE INVENTION

Functional Overview

Figure 1:
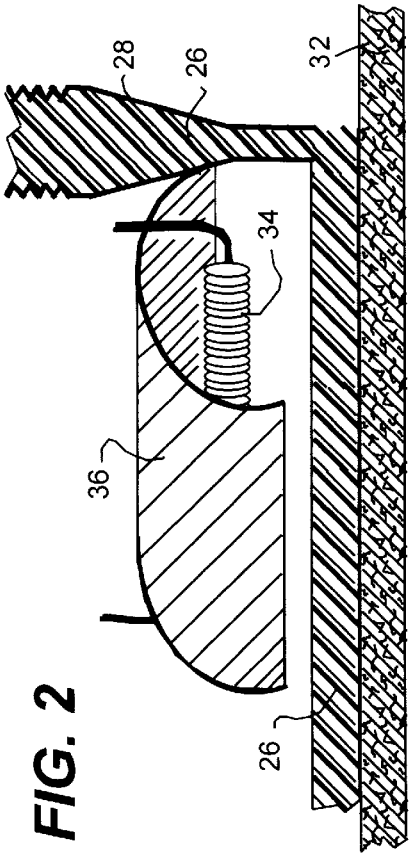
FIG. 1 is a cross-sectional schematic view of a sinuous deposition device according to the present invention, carried out with an arc lamp whose energy is collected with an ellipsoidal reflector, in which the substrate is heated after extrudable material application.

The penetration of an extrudable material into a substrate is highly dependent on the viscosity of the material. Thus, many materials are heated prior to deposition onto a substrate, in order to minimize material viscosity. At the same time, these high temperatures must be balanced with other considerations, including the pyrolysis of the material, the melting of the substrate, and the "closing" time for the material (i.e. when the material regains structural integrity and loses its tackiness).

When an extrudable material, such as a hot-melt adhesive, is applied to a room-temperature substrate, cooling occurs very rapidly at the contact surface between the material and substrate. In the case of hot-melt adhesives, it should be noted that most adhesives are applied at temperatures very close to their melting points in order to minimize the damage that can occur to adhesives that are maintained at highly elevated temperatures. Furthermore, an important parameter in the industrial use of most hot-melt adhesives is their closing times—that is, the time until the adhesive hardens to the point that it can be manipulated with structural integrity and without surface tackiness. Many adhesives are engineered to minimize the closing time, thereby increasing the process throughput. With adhesives engineered for fast closing times, however, even relatively small decreases in temperature can result in rapid increases in viscosity in the adhesive.

This increase in viscosity slows or prevents the penetration of adhesive into the substrate, and prevents the adhesive from engulfing exposed prominences or strands of substrate, or penetrating into crevices in the substrate. Thus, the rapid cooling of the extrudable materials at the substrate interface results in only superficial bonding of the material to the substrate for many industrial applications.

This invention teaches the directed heating of the substrate using an electromagnetic energy field, which will hereinafter be referred to as a light or laser beam, even though the field may lack sharp boundaries. In most applications, wavelengths from the infrared to ultra-violet in the electromagnetic energy spectrum will be used, due to their ease of generation, transmission, reflection, and focusing. However, in other applications, electromagnetic radiation from other frequency bands, including microwaves, could be profitably employed.

If the light beam travels through the applied extrudable material on its path towards the substrate, some fraction of the light energy will be absorbed by the material, leading to heating of the bulk extrudable material rather than the substrate. In general, even if a large fraction of the incident illumination is absorbed by the extrudable material, because of the large local mass of the material relative to the substrate surface to which it is immediately applied, the material temperature will be relatively little affected by the absorbed light. Furthermore, these heating effects will not be concentrated at the interface between substrate and material, where the physical processes affecting bond strength are occurring. Therefore, either the light beam used for heating the substrate should be directed so that it does not pass through the extrudable material, or the material should be largely transparent to the majority of the heat energy in the light beam.

Once the substrate has absorbed the heat energy from the incident illumination, its temperature will rise dramatically. According to the method of this invention, it is desirable to transfer some of the heat captured by the substrate to that extrudable material that is in close contact with the substrate. In the case where the extrudable material is a hot-melt adhesive, this local heating at the substrate-material interface permits rapid cooling of the bulk adhesive distant from the interface after it has been deposited on the substrate This promotes the closing of the adhesive within a reasonable period of time, while still altering the adhesion properties of that extrudable material closest to the substrate.

It should be noted that the materials used in the following description are generally materials that are heat-activatable, such as hot-melt adhesives. The method, however, works more generally on any material deposition in which the penetration of the material is dependent on its temperature, and the temperature of the substrate. This might include, for example, the penetration of resins and curable varnishes into wood.

The preferred embodiments of this invention depend on whether the apparatus deposits a sinuous line of extrudable material, a linear stream of material, or an areal deposition of material. Each of these cases is covered in the following sections.

Sinuous Deposition of Extrudable Material

In order to deposit a sinuous bead of material mediated with light engendered heating of the substrate, the position on the substrate which is heated must be very closely situated to the position where the extrudable material is deposited. The substrate will be simultaneously translated and rotated around the material application position for a sinuous bead to be deposited, and if the light is applied distantly from the material application position, it cannot be guaranteed that the substrate location on which the light is trained will be the same substrate location to which the adhesive is deposited.

In general, for sinuous deposition, the position of light application and the position of material deposition will be closely situated, which requires that the light must be highly concentrated on the substrate. In the case of light-mediated heating of the substrate where the light is supplied by a laser, the focusing of the illumination source is not difficult, since light produced by a laser is either naturally collimated, or comes from a small point source, as in a laser diode. Lasers with sufficient energy to perform light-mediated heating of the substrate, however, are generally expensive to purchase, expensive to operate, and difficult to maintain. Alternative light supplies include traditional incandescent lamps, halogen lamps, and high-pressure arc lamps. Compared, for instance, with a YAG laser, these lamps are 20–30 times more efficient at converting electrical energy into light and heat energy. However, while laser light is naturally collimated, for the most part these alternative light supplies produce light that is substantially isotropic. Thus, the light must be optically collected or focused, and the degree to which this is possible will be the primary restriction on the use of these light sources in light-mediated substrate heating.

FIG. 1 is a cross-sectional schematic view of a sinuous deposition device that utilizes light-mediated heating of the substrate after extrudable material deposition, carried out with an arc lamp whose energy is collected with an ellipsoidal reflector. An illuminating high-pressure arc lamp 22 is placed at one focus of an ellipsoidal mirror 24, and the material deposition location is placed near the other focus of the mirror. The salient property of an ellipsoidal mirror is that raypaths emanating from one focus are intercepted by the ellipsoidal mirror, and subsequently reflect off the mirror surface and collect at the other focus. This property of ellipsoidal mirrors is often utilized in optical devices, and is frequently used, for example, in lamps which illuminate fiber optic bundles.

Because the lamp 22 is not a point source of light energy, not all of the energy source can be contained within the point focus of the ellipsoidal mirror, and those parts of the arc not located precisely at the focus of the ellipsoidal mirror will not precisely intercept the point at which it is desirable for light to impinge on the substrate. Thus, light sources with the smallest light emission volume are highly desirable. Arc lamps have the advantage of a very high radiance, with large amounts of their energy being emitted from a very small surface volume. High-pressure xenon arc lamps often emit more than half of their energy at longer than visible wavelengths, which is of great benefit in light-mediated heating of the substrate because such wavelengths are very efficiently absorbed by a variety of substrates. Examples of suitable high-pressure arc lamps are the Cermax Xenon arc lamp series with integrated reflectors (e.g. EX990C-10F) from ILC Technology of Sunnyvale, Calif., or the water-cooled Photomax reflector from Oriel Corporation of Stratford, Conn., which may be fitted with a range of matched arc lamps.

As an alternative, one may use tungsten-halogen lamps, which are generally very inexpensive, require unsophisticated and inexpensive power sources, are extremely efficient in their use of input electrical energy, and which emit the vast majority of their light output in infrared wavelengths. In general, low voltage tungsten-halogen bulbs have smaller filaments than those of high-voltage halogen bulbs, and many inexpensive versions of these bulbs are commercially available in the range of up to 250 watts or more. If additional power is required, multiple bulbs or reflectors can be used. Alternatively, these bulbs can be run at voltages higher than their nominal rating, which increases the light output at the expense of significantly lower bulb lifetimes. The MR16 EKE 150 Watt projector lamp, available from a number of suppliers including General Electric, is suitable for lower power applications, and includes an integrated ellipsoidal reflector to collect the output light.

In FIG. 1, an extrudable material 26 is deposited onto a substrate 32 by means of a nozzle 28, which is situated in such a manner as to interfere as little as possible with a plurality of incident light rays 30 from the lamp. The extrudable material 26 is administered in the preferred case through means of a positive displacement pump attached to the nozzle, although simpler air pressure-mediated devices are possible, such as the Polygun II hot-melt adhesive applicator from 3M Adhesive Systems of St. Paul, Minn.

The illuminating lamp is located in such a manner as to illuminate the substrate 32 after the extrudable material 26 has been deposited on its surface. It is also possible to locate the illuminating lamp so that it heats the substrate 32 before deposition of the material 26. In such cases that application throughputs require larger energy fluxes than that available from a single lamp, it may be necessary to place a plurality of lamp assemblies (including in each case a lamp 22 and a mirror 24) in positions adjacent to the position that the material is deposited.

It should be understood with regard to FIG. 1 that there exist alternative schemes for capturing the illumination from the lamp 22 other than the use of an ellipsoidal mirror. For instance, non-ellipsoidal mirrors can be used to converge the light energy to a pseudo-focus. Alternatively, the lamp 22 can be placed at the focus of a parabolic mirror, in which case the reflected light rays would become nearly collimated. Such collimated rays can then be focused using standard converging lens arrays. It is considered within the teachings of this invention that the mirror can be any shape that collects light energy from the light source onto the substrate, and need not be specifically derived from a conic section such as a parabola, circle or an ellipse. In certain applications, it may be useful for the mirror to be asymmetric, such that the collected light is distributed on the substrate in a linear, elliptical or other shape, rather than focused into the smallest possible area. Such illumination geometries would be of particular benefit in those cases where the extrudable material is not deposited in a narrow line, or where the extrudable material is illuminated for some duration.

Linear Deposition of Extrudable Material

In order to raise the substrate temperature to that at which light mediation of deposition occurs, a certain amount of heat must be projected onto the substrate. When the extrudable material is deposited as a sinuous stream, the topology of the deposition process requires that the light energy be concentrated to a small area near to the material deposition location, since the substrate which is to be heated can otherwise not be located predictably with respect to the application apparatus. However, when the extrudable material is deposited in a linear fashion on the substrate, then the light energy can be projected onto the substrate over a linear distance overlaying the extrusion path, requiring far less concentrated light energy. In algebraic terms, $H=PT$, where $H$ is the heat deposited by the illumination system on a certain area of substrate (e.g. in units of watt-sec per cm2), $P$ is the illumination power density (e.g. in units of watt-$cm^2$) and $T$ is the time during which the light is applied to a given area of substrate (e.g. in units of seconds). Thus, with a sinuous bead, the topology demands a high power illumination $P$, since the time $T$ during which the light can be focused on a particular substrate is small. On the other hand, when a linear stream of extrudable material is used, a longer time may be used with a lower power density. This low power density allows for simple and inexpensive light illumination systems.

Figure 2:
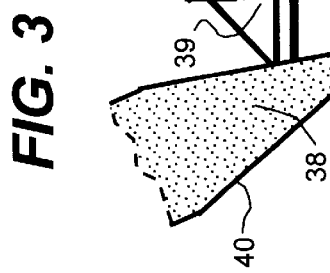
FIG. 2 is a cross-sectional view of a second embodiment of the present invention, including a linear deposition device, using a lamp containing a coiled tungsten wire whose energy is collected with a trough ellipsoidal reflector, in which the substrate is heated after extrudable material application, in which lamp and reflector are shown in an oblique view.

FIG. 2 is a cross-sectional view of a second embodiment of the present invention, including a linear deposition device that utilizes light-mediated heating of the substrate after extrudable material deposition, using a lamp containing a coiled tungsten wire whose energy is collected with a trough ellipsoidal reflector, in which lamp and reflector are shown in an oblique view. In the description of this second and subsequent embodiments, like components such as the extrudable material 26, nozzle 28, and substrate 32 will be referenced with the same reference numbers. An extended length lamp 34 is bounded above by a trough mirror 36, whose cross-section perpendicular to the long axis is roughly elliptical. The longitudinal ends of this mirror 36 may either be open, or alternatively and more efficiently, they may be turned down to collect light from the ends and direct it towards the substrate 32. The extended length lamp 34 is placed at the one focus of the trough mirror 36, and a large fraction of the illuminating light collects near the other focus of the elliptical trough reflector, where the collection of such foci is coincident with the linear distribution of sites on the substrate 32 on which the extrudable material 26 is deposited via the nozzle 28.

There are many additional options for collecting the source illumination. For instance, if the lamp may be placed quite close to the substrate surface, the elliptical reflector 36 can be replaced with a cylindrical trough reflector. In this case, the lamp is placed at the center of trough he semi-cylinder, and light rays that are emitted away from the substrate are reflected off of the mirror, and back to the lamp, where they combine with rays generated by the lamp directed downwards to the substrate. In addition, one could use a parabolic trough reflector behind the lamp to collimate the light rays, with a converging cylinder lens between the lamp and the substrate to collect lamp illumination.

In all of the geometries for the trough reflector 36 discussed above, the properties of the ray collection of conic sections are based generally on the lamp being a point source. For example, if the lamp is located around one focus of an ellipse, its rays collect at the other focus only if the lamp is a point. Since the lamp filament is not a point, but generally has appreciable size relative to the size of the cross-section, instead of the rays collecting at the other focus, they will have a spread around the other focus. This problem is compounded by the fact the rays from the lamp do not emerge from the lamp perpendicular to the long axis of the filament, but come out in planes oriented at many different emergent angles relative to a perpendicular cross-section. To a ray emitted at an angle to the perpendicular, the geometry of the cross-section is that of an elongated ellipse with a different focal position of the ellipse in the perpendicular cross-section. Thus, for an elliptical trough reflector 36, it is impossible to place the lamp filament so that it is located at the focus of the elliptical section (perhaps not perpendicular to the filament axis) for all raypaths.

In raypath modeling experiments that we have performed, however, we have shown that the use of elliptical cross-sections with long and short-axes of similar length (i.e. close to a circular cross-section) for the trough geometries greatly reduces the problem discussed in the previous paragraph. For an elliptical cross-section of a trough reflector 36, when the ratio of long-axis to the short-axis exceeds 1.33, the amount of energy absorbed by the substrate is reduced by 30% compared to the maximum substrate absorption obtained at a ratio of 1.11. While this figure is highly dependent on the cross-sectional diameter of the filament relative to the size of the reflector, the extent and placement of the substrate, and other factors, it appears that elliptical reflectors with similar long and short axes, are efficient at placing radiant energy from an extended length lamp 34 onto a substrate 32.

The extended length lamp 34 and the semi-elliptical trough mirror 36 as a unit may be called the heating element. This heating element may be placed in such a way to heat the substrate either after the application of the extrudable material, as shown in FIG. 2, or the heating element may come before the application of extrudable material. The decision regarding the placement of the heating element involves application specific considerations that will generally deal with the nature of the substrate and extruded materials and the topological requirements of the apparatus. In general, the amount of heat entering the substrate prior to material deposition must overcome heat losses by means of conduction, convection and radiation prior to encountering the deposited material.

Heating the substrate before the application of the extrudable material has the advantage that the radiant heat will not be lost through reflection at the air/extrudable material interface, or be absorbed within the bulk of the extrudable material. On the other hand, heat transferred to the substrate may be lost through radiation, convection and conduction before the extrudable material has touched the substrate. In general, the effects of this heat loss will be minimal when the extrudable material is applied soon after illumination. The heat captured by the substrate may translate into temperature rises in the substrate that can either pyrolyze the substrate, or subject the substrate to oxidation in the presence of the atmosphere. Thus, the amount of heat transmitted to the substrata must be regulated to limit the temperature increase below that which causes substantial substrate degradation.

Figure 3:
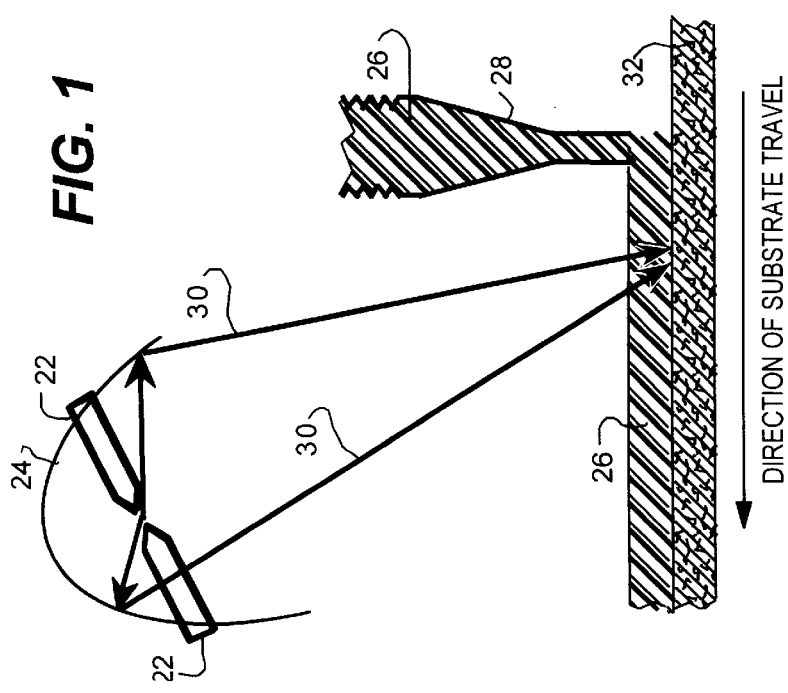
FIG. 3 is a cross-sectional view of a third embodiment of the present invention, including a linear deposition device that contains a linear diode array whose energy is collected with a trough converging lens, using a non-reactive gas to prevent oxidation of the substrate, in which the substrate is heated before extrudable material application, and in which the linear diode array and lens are shown in an oblique view.

FIG. 3 is a cross-sectional view of a third embodiment of the present invention, including a linear deposition device that utilizes light-mediated heating of the substrate before extrudable material deposition. A laser diode array 37, optionally in conjunction with a cylinder converging lens 39, is used to heat the substrate prior to deposition of the extrudable material. The converging lens 39 is used to compensate for the divergence of light energy typically found in laser diodes, and allows the laser diode array 37 to stand back from the substrate 32 surface. In order to prevent oxidation, a stream of a non-reactive gas 38 directed out of a gas-dispensing nozzle 40 may optionally be directed at the substrate 32 to exclude the majority of the oxygen present at the substrate surface. The non-reactive gas 38 will be chosen both on the basis of its non-reactivity to the substrate 32, its lack of toxicity, its cost, its transparency to the light-energy emanating from the laser diode array 37, and its thermal conductivity. In general, gases with low thermal conductivity are to be preferred, as they will remove less heat from the substrate prior to the application of the extrudable material 26. Gases that will frequently meet these criteria include nitrogen and argon. It is within the teachings of this patent for the placement of the nozzle 40 to be such that the stream of non-reactive gas is directed either towards the point of extrudable material deposition, or it may be placed near the nozzle with the stream of non-reactive gas directed away from the deposition point.

Heating after the extrudable material has been applied suffers from fewer problems related to pyrolysis, since as the substrate temperature rises, it efficiently transmits heat to the overlying material through conduction. Also, the overlying material excludes atmospheric oxygen, so oxidation of the substrate material is a less significant problem.

In practice, both methods of light-mediated heating of the substrate can provide significant increases in penetration of the extrudable material into the substrate. In certain circumstances, it may be beneficial to illuminate the substrate both before and after the deposition of the extrudable material. This case might be useful, for instance, when using a low power illumination source, or where the topological constraints of the deposition apparatus permits only a short illumination distance on either side of the deposition location.

In cases where the deposition process allows for heat illumination over an extended length, a variety of illumination sources are possible, including high wattage tungsten-halogen lamps, quartz and ceramic heating rods, and high-power linear diode arrays. It should be noted that laser diodes and laser diode arrays are efficient laser power sources whose emitting surface cross-section has one relatively small dimension (on the order of a micron) and one much larger linear dimension (on the order of centimeters). Because of the long linear dimension, laser diode arrays are difficult to implement in the prior art, which requires the illumination to pass through a topologically-constrained nozzle along with the extrudable material. In the current invention, such constraints are eliminated by illuminating the substrate before or after the point of deposition. An example of a suitable laser diode array is the B1-81-15C-19-30-A laser diode array from Coherent, Inc., of Santa Clara, Calif., which outputs 15 watts of continuous wave power.

It should be understood that other highly-concentrated light sources may still be used in this process. For example, in cases where the substrate is heated prior to deposition of the extrudable material, a carbon dioxide laser may be beneficial. Such lasers are generally inexpensive and efficient compared to many other laser light sources, and are available in very high power outputs. Because their light output at 10.6 microns is efficiently absorbed by many extrudable materials, they cannot be used in many cases where the illumination light passes through the extrudable material. However, these carbon dioxide lasers may be used when light-mediated heating of the substrate is performed prior to deposition of the extrudable material, as depicted in FIG. 2, where the extended length lamp 34 and the mirror 36 could be replaced in certain applications with a carbon dioxide laser of the appropriate power.

Areal Deposition of Extrudable Material

In certain applications, it will be desirable to deposit areal coverings of extrudable material. The linear deposition scheme previously discussed could conceivably be used for such circumstances, in which a plurality of parallel linear depositions could be used to cover an area. This requires, however, a significant amount of material handling, and may not result in the most efficient use of the light energy.

Figures 4, 5:
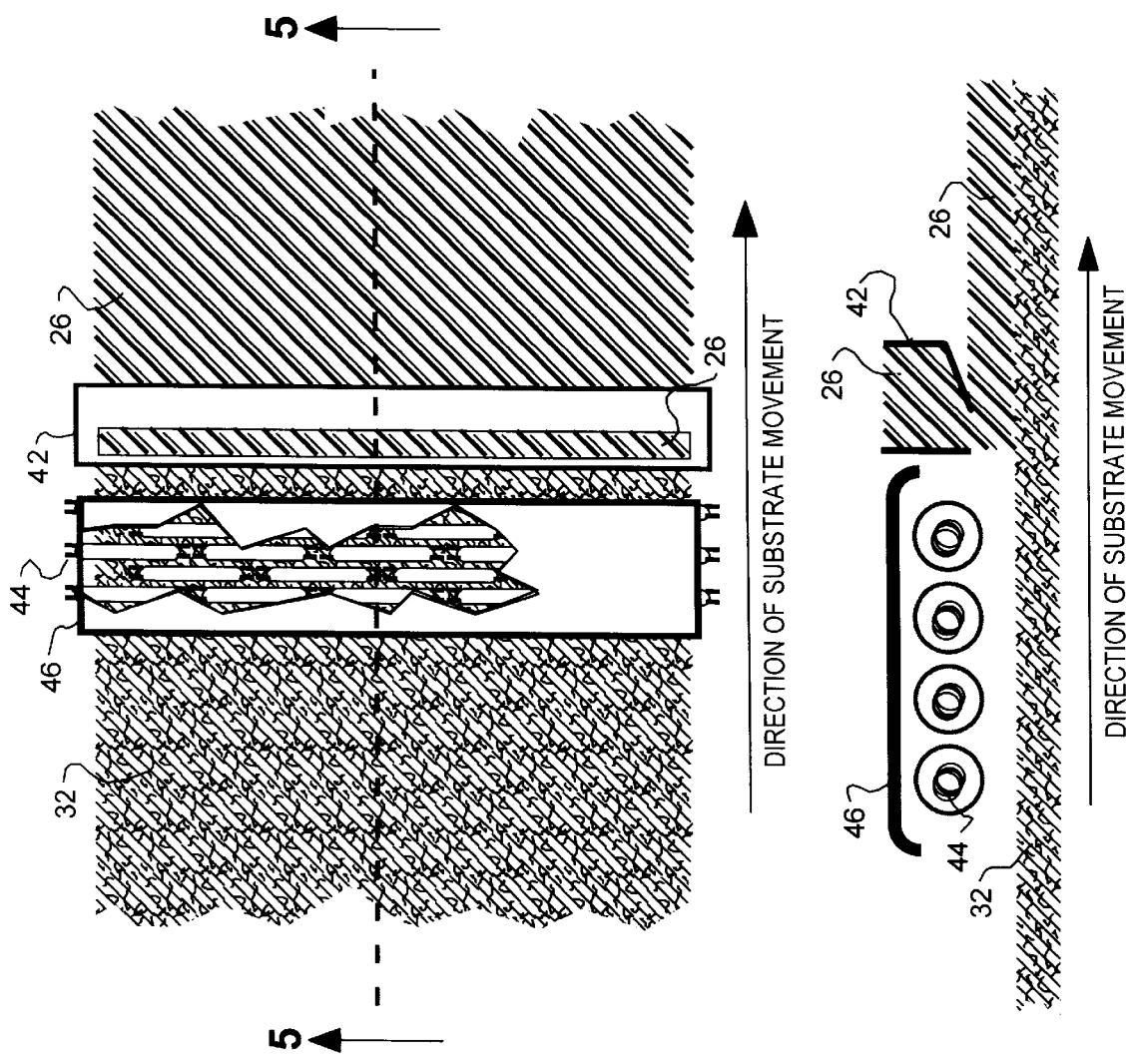
FIG. 4 is a cut-away top view of a fourth embodiment of the present invention, including an areal deposition device, in which the substrate is heated prior to extrudable material application.
FIG. 5 is a cross-sectional schematic of the areal deposition device of FIG. 4, taken along line 5—5 of FIG. 4.

Alternatively, trough deposition of extrudable material over the surface can be performed, using commercially available apparatus. Light-mediation of this process can be performed by areal heating before, after, or both before and after the deposition of extrudable material. The use of areal heating before the deposition of extrudable material is described in the fourth embodiment of the present invention shown in FIGS. 4 and 5. When light-mediation is performed before and after extrudable material deposition, light energy may impinge on the substrate simultaneously on either side of the deposition apparatus—that is, the processes may run either simultaneously or sequentially. FIG. 4 is a cut-away top view of an areal deposition device that utilizes light-mediated heating of the substrate prior to extrudable material deposition. The substrate 32 lies across the entire deposition surface, moving in the direction indicated by the arrow at the bottom of the figure. The extrudable material 26 is deposited along the width of the substrate by a trough material spreader 42. Such trough material spreaders are widely used in industry, and employ a variety of mechanical means to lay a wide bead of extrudable material perpendicular to the direction of movement of substrate. Before the extrudable material is deposited, a lamp array 44 illuminates the substrate 32. The lamp array 44 includes a plurality of extended length illumination devices oriented with their long axes perpendicular to the direction of movement of the substrate. Above the lamp array 44 is an areal reflector 46, which reflects light that is emitted by the lamp array away from the substrate, so that it is redirected toward the substrate. This reflector will generally be roughly planar, although its shape may be molded in order to increase light directed at the substrate. For example, the reflector may be turned down on the edges to capture stray light.

It should be understood that within the teachings of this invention the orientation of the lamp array 44 may be different from that shown in FIG. 4 and FIG. 5, with the long axis of the lamps oriented along the axis of substrate movement. Furthermore, this invention teaches that the lamp array 44 may be placed over the substrate 32 after the deposition of the extrudable material, according to the same principles enunciated above with reference to the linear stream of extrudable material. Such a configuration is depicted in FIG. 6, which is a schematic top view of a fifth embodiment of the present invention, including an areal deposition device that utilizes light-mediated heating of the substrate after deposition of the extrudable material. Alternatively, lamps could be placed both before and after the deposition point.

Characteristics of the Extrudable Material

In such cases that the substrate illumination occurs subsequent to the extrudable material deposition, it is beneficial to reduce the amount of light absorbed by or reflected at the surface of the extrudable material. Thus, the material should be largely transparent to the incident illumination. This generally precludes the use of certain dyes or additives with high absorption in the infrared, or large particles that scatter the light.

In many applications of industrial importance, hot-melt adhesives will be used as the extrudable material. In many of these applications, the strength of the adhesive can be improved using catalyzed cross-linking. One frequently used method to initiate such cross-linking involves the use of light initiation, particularly with short wavelength ultraviolet light. Given the presence of intense light provided by the illumination source of this invention, it would be useful to utilize some fraction of this light for initiation of the cross-linking catalysis, especially in those cases where broad spectrum sources such as a tungsten-halogen lamp or a halogen arc lamp are used.

FIG. 7 is a cross-sectional schematic of a sixth embodiment of the present invention, depicting the initiation of cross-linking in a light-activatable cross-linkable extrudable material by means of a broad spectrum lighting source that simultaneously performs light-mediation heating of the substrate. The light collecting apparatus is not shown. A broad spectrum lamp 50, which could, for example, be an arc lamp or an incandescent lamp such as a tungsten-halogen bulb, is positioned above a light-activatable, cross-linkable extrudable material 52 which has been deposited by the nozzle 28 onto the substrate 32. It should be noted that most light-activatable, UV-cured material is activated by shorter wavelength light, generally UV light, due to the higher energy of the UV photons. Two light rays are depicted emanating from the lamp 50. A short wavelength UV ray 54 is absorbed by the UV-cured material 52, initiating a cross-linking reaction within the material 52. Light curable extrudable material 52 should be chosen so that the UV light rays can penetrate significantly into the material, so as to initiate the cross-linking throughout the thickness of the material. A long-wavelength visible or infrared light ray 56 passes through the UV-cured extrudable material 52, which is largely transparent to light rays of these wavelengths, and impinges on the substrate 32, where it is absorbed and its energy is converted into heat. It should be understood that the broad spectrum lamp may be substituted with light sources that emit a limited number of discrete wavelengths, given that some of these wavelengths are suitable to initiate cross-linking reactions, and others are longer wavelengths more suitable for heating the substrate.

This mode of deposition using the light used in heating the substrate to additionally initiate cross-linking or other catalyzed processes within the extrudable material can function whenever the light is positioned to illuminate the substrate at a point after deposition of the extrudable material. Thus, the devices of FIG. 2 and FIG. 6, used respectively in linear and areal deposition using light-mediated heating of the substrate, could also utilize the light to initiate a reaction within the extrudable substrate.

Such catalyzed reactions can be used in conjunction with conventional UV-initiated cross-linking of high-viscosity adhesives, such as the high-viscosity, UV-curable 60-7016 urethane acrylate adhesive from Epoxies, Etc. of Greenville, R.I. These adhesives could also be used in conjunction with surface treatments on an areal basis, in which the cross-linking can occur after the extrudable material has penetrated into the substrate surface.

The speed of reactions are governed by the well-known Arrhenius equation, which relates the rate constant k to the activation energy of the reaction and the temperature at which the reaction is carried out. From this equation and knowledge of the activation energy and temperature of the reaction, the acceleration of the reaction with temperature can be determined. In the methods of the present invention, a strong temperature gradient is created with the highest temperatures at the material-substrate interface. While the temperature of the bulk extrudable material is about 200° C., the temperature at the interface may reach much higher temperatures, anticipated to exceed that of the adhesive by 100–200° C. Over a broad range of organic chemical reactions with activation energies of 15 to 50 kcal/mol ° K, the speedup should range from 16-fold where the activation energy is 15 kcal/mol ° K and the change in temperature is 100° C. to a 16.8 million-fold rate enhancement where the activation energy is 50 kcal/mol ° K and the change in temperature is 200° K. For example, a rate enhancement of 500,000-fold would mean that a reaction that took place in 6 days at the lower temperature (e.g. 200° C.) would take place in only 1 second at the elevated temperature. With the possibilities for such large differences in rate enhancement with temperature, the temperature gradient created by the present invention can be used to engineer bonds with special properties.

Figure 37:
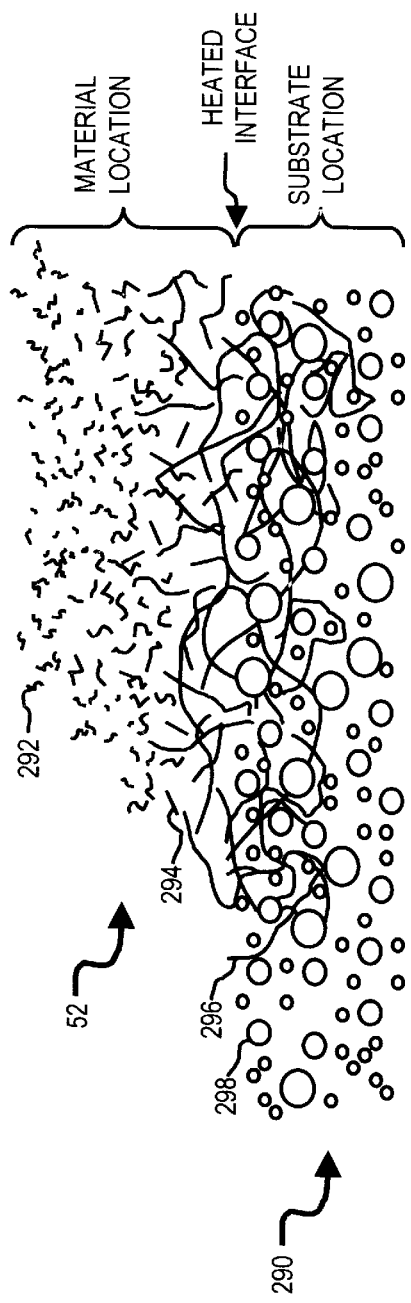
FIG. 37 is a cross-sectional schematic of a cross-linkable extrudable material with variable amounts of cross-linking penetrating a fibrous substrate using methods similar to that shown in FIG. 7.

FIG. 37 is a cross-sectional schematic of the cross-linkable extrudable material 52 with variable amounts of cross-linking penetrating a fibrous substrate 290. The fibrous substrate 290 is composed of various individual fibers 298 of various sizes. The cross-linkable extrudable material 52 has been laid down on the top surface of the substrate 290, and a strong light with mixed frequencies, including UV, has been irradiated onto the surface according to the depiction of FIG. 7. Between the initial material location and substrate location, the substrate-material interface has been heated, allowing penetration of the material 52 into the substrate 290. UV light energy from the incident irradiation has activated the cross-linkable extrudable material 52, which begins to cross-link. It should be noted that the rate of cross-linking is related not only to the amount of initiator (determined in part by the intensity of the UV light), but also the temperature at which the reaction takes place (which is determined more by the amount of infra-red and visible light in the incident radiation than the UV light).

The extrudable material 52 that is distal to the substrate-material interface cross-links at a base rate, creating minimally-crosslinked short polymers 292 to form. Closer to the interface, moderately-crosslinked medium-length polymers 294 are produced, due to the higher temperature of the extrudable material 52 due to its closer proximity to the heated substrate-material interface. For the extrudable material 52 that has penetrated the fibrous substrate 290 and has intimate contact with the highly heated fibers 298, long and highly-crosslinked polymers 296 are formed because of the highly elevated temperature of the material, caused by its very close proximity to the heated fibers 298 at the interface. These highly-crosslinked polymers 296 encapsulate and interdigitate with the fibers 298 of the substrate 290, creating a very tight mechanical bond to form.

Highly-crosslinked polymers tend to have some undesirable effects such as brittleness and lack of flexibility. By limiting their effects to a narrow zone near the substrate-material interface, these deleterious effects are significantly reduced, yet their positive impact on bond strength remains. The methods of the present invention, however, allow for very high degrees of extrudable material 52 cross-linking at the interface, which is where bond strength is most highly affected. Away from the interface, less highly developed cross-linking can maintain desirable material 52 properties. As the hot-melt extrudable material 52 hardens, residual cross-linking will slow and then stop.

The reactions afforded by high temperature at the substrate-material interface are not limited to UV cross-linkable extrudable material 52, and may include any reactive compositions that either polymerize or cross-link. In addition, the reactions may involve both the substrate and the material. For example, organic substitution reactions (e.g. those that form esters and amides) may be used with one functional group (e.g. the carboxylic acid) on the substrate and the other functional group (e.g. an alcohol or amine) on the material. Such esterification reactions often proceed slowly at room or moderate temperatures, but can be made to react much more quickly at elevated temperatures, such as those at the substrate-material interface. The chemical bonding of the substrate and material would yield very high bond strengths.

In general, many heat-activatable extrudable materials, such as hot-melt adhesives, show decreasing viscosity with increasing temperature. This effect, however, often becomes less dramatic past a certain temperature, at which the decrease in viscosity becomes asymptotic. Often, the extrudable material is chosen so that its operating temperature is near this point of near minimum viscosity. It is a benefit to the operation of the present invention to have an extrudable material whose viscosity continues to decrease past the operating temperature until near the maximum interfacial temperature reached during these methods of the present invention.

Figure 38:
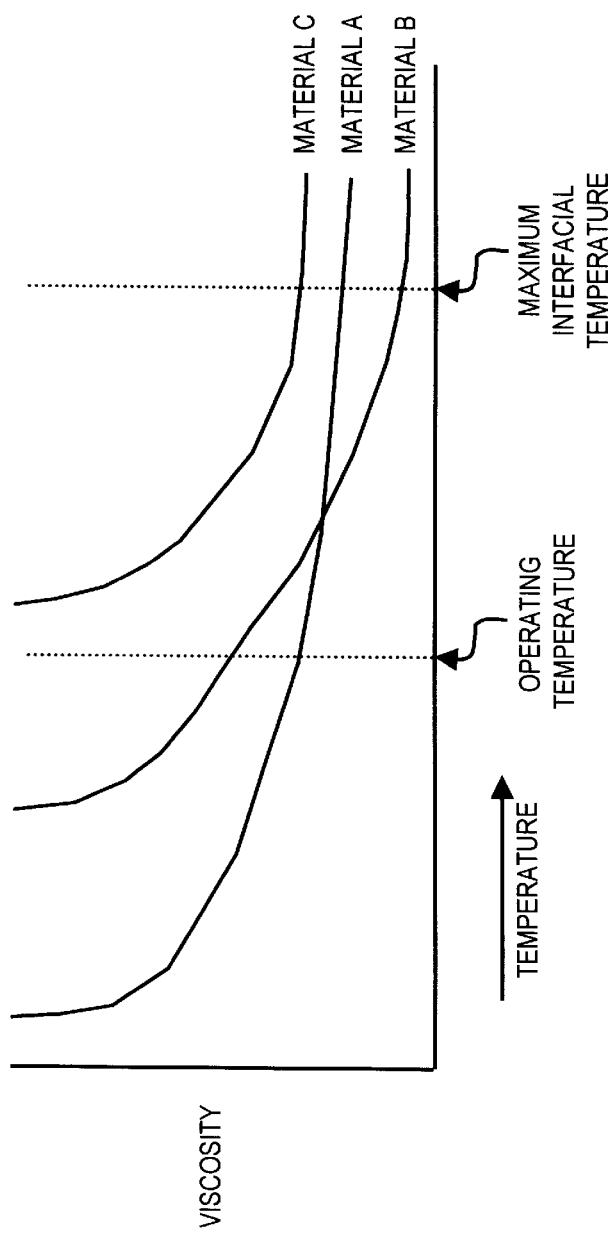
FIG. 38 is a graph of the viscosity of three extrudable materials as a function of temperature.

FIG. 38 is a graph of viscosity versus temperature for three extrudable materials A, B and C. Extrudable material A behaves like most conventional hot-melt adhesives, where the viscosity of the extrudable material is near its minimum at the operating temperature of the material. Heating the material more fully to the maximum interfacial temperature of the present invention has a modest and beneficial effect. However, material B has a higher viscosity at moderate temperatures, including the operating temperature for the adhesive. At the operating temperature, material B's viscosity is greater than that of material A, so that it makes less strong physical (e.g. interdigitation) bonds with the substrate. However, at the much higher temperature of the maximum interfacial temperature, its viscosity is lower than that of material A, and thus makes excellent physical bonds with the substrate. Normally, material B could not be used at this higher temperature, because, for example, it might degrade with prolonged exposure at the higher temperature, but it is relatively unaffected by exposure to the maximum interfacial temperatures for the very short periods of time (seconds or less) at which the material is maintained at that temperature of the present invention. Thus, the method of the present invention allows the use of materials with viscosity-temperature profiles that would make them unattractive for conventional application methods. It should be noted that it is not important that the final viscosity of material B be less than that of the final viscosity of material A, as long as material B reaches a working viscosity that allows its penetration into the substrate material.

Figure 39A:
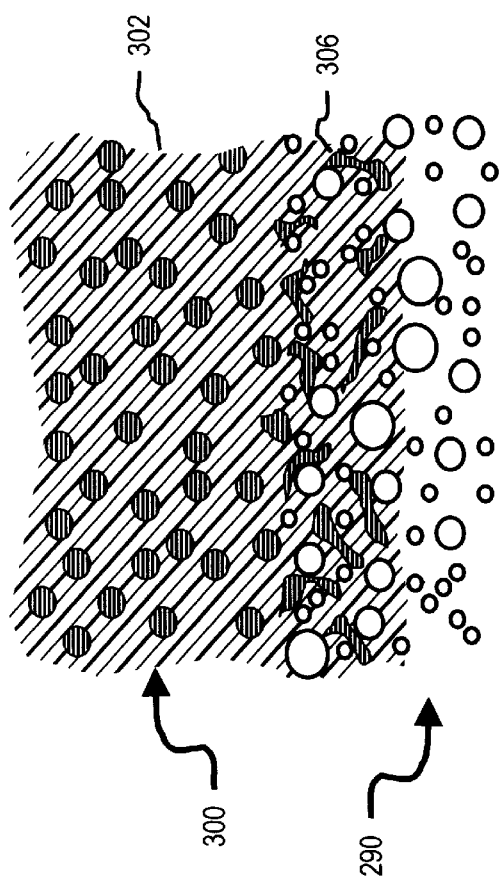
FIG. 39a is a cross-sectional schematic of a bimaterial suspension deposited on a fibrous substrate.
Figure 39B:
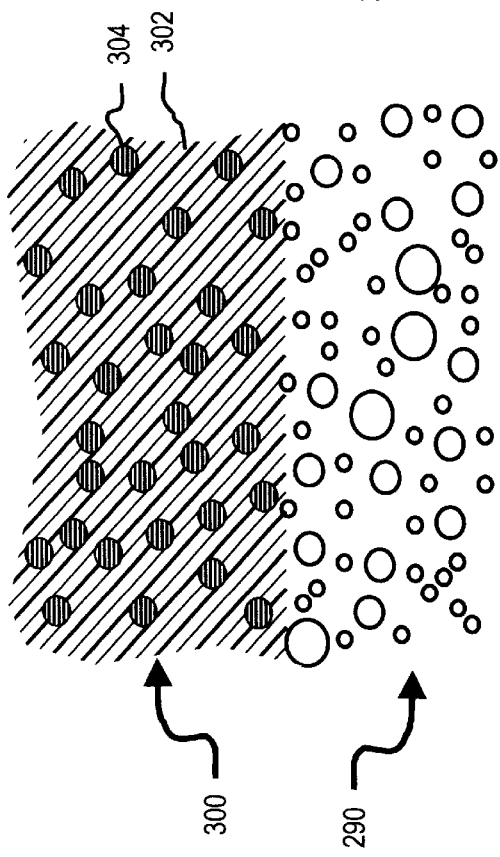
FIG. 39b is a cross-sectional schematic of the bimaterial suspension of FIG. 39a as it penetrates the fibrous substrate after irradiation.

The differences in viscosity between different heat-activatable extrudable materials may be exploited in yet another manner. Referring to FIG. 38, consider a third material, material C, which has very high viscosity at the normal operating temperature of application, and may not have reached its temperature of melting. Materials A and C may represent, for example, different polymer polyamide weights or crystalline forms. The material C may be supplied as a very fine powder suspension within material A, retaining its solid form within the deposition apparatus, which is maintained at the operating temperature. Such a situation is shown in FIG. 39*a*, a cross-sectional schematic of a bimaterial suspension 300 deposited on the fibrous substrate 290. The suspension 300 comprises a low-melting temperature extrudable material 302, in which fine particles 304 of a high-melting temperature extrudable material are suspended. The suspension 300 is deposited on top of the fibrous substrate 290, on which it sits prior to irradiation in the manner of the present invention.

FIG. 39*b* is a cross-sectional schematic of the bimaterial suspension 300 after it penetrates the fibrous substrate 290 after irradiation. As can be seen, the low-melting temperature extrudable material 302 penetrates the fibrous substrate 290 as described above. As it penetrates the fibrous substrate 290, it carries with it the fine particles 304 that are suspended in it. As these particles are brought into close proximity to the heated interface, the high temperatures to which they are subjected cause the high-melting temperature material of the particles 304 to melt, such that deformed particles 306 are formed under the influence of shear and other forces in the suspension 300 as it passes through the fibrous substrate 290. These deformed particles 306 elongate and cling to fibers within the fibrous substrate 290. As the suspension 300 cools, these deformed high-melting temperature particles 306, due to their generally higher internal tensile strength than that of the surrounding material 302, and due to their changed geometry, prevent the release of the solidified bimaterial suspension 300 from the fibrous substrate 290. This bond is enhanced if the material 302 and the particles 304 are comprised of compositions that have an affinity for one another, such as if they are both polyamides or otherwise chemically related. Also, in case the light application is to occur after the deposition of the suspension 300, it is important that the suspension 300 not scatter light too greatly. Therefore, it is preferable either for the compositions of the materials 302 and the particles 304 to be similar, or that they have similar indices of refraction. Note that the presence of the particles 304 should have minimal effects on the flow properties of the suspension 300 as long as the unit density of particles 304 within the suspension 300 is not too great and the size of the particles 304 is small relative to the size of the interstitial pores in the substrate. For example, for most woven fibers, the particles 304 should preferably be less than 100 microns in diameter, and more preferably less than 25 microns, and even more preferably less than 10 microns.

The temperatures of heat activation of the surrounding material 302 and the particles 304 needs to be high enough to account for variations in the operating temperature of the suspension 300 within the deposition apparatus, the difference in temperature between the operating temperature of the suspension 300 and the fibrous substrate 290, and the depth into the suspension 300 away from the fibrous substrate 290 that activation of the particles 304 is desired. In general, it is good that the particles 304 have a melting temperature at least 50° C. and even 100° C. above that of the operation temperature of the suspension 300, and 75° C. and even 125° C. greater than that of the melting temperature of the surrounding material 302.

It should be appreciated that the particles 304 may differ from the surrounding material 302 in more than their melting temperature. For instance, the particles 304 may include UV-activatable cross-linkable material in a suspension 302 that is not cross-linkable. At positions distant from the material-substrate interface, cross-linking in the particles 304 will occur slowly, since the particles 304 will not be molten or fully molten. Furthermore, even if the material in the particles 304 does cross-link somewhat, it will have little effect on the bulk property of the material after it solidifies, since the particles will be in a compact shape and thus resistant to external forces (e.g. shear). However, the particles 304 that are heated through their proximity to the heated substrate will become molten and deformed, increasing their contact with the surrounded material 302, and increasing in their cross-linking due to their higher temperature and molten condition. The high strength and stiffer mechanical properties of this material will enhance the strengthening effects mentioned above, compared to particles 304 with simply higher viscosity and tensile strength. It should also be noted that in the preceding discussion of cross-linkable material that the use of UV-activation is not a requirement of the present invention, and other forms of activation (e.g. water or heat cured materials) may be employed within the spirit of the present invention.

Deposition Topologies and Sequences

This invention teaches a variety of possible deposition topologies. FIG. 4, FIG. 5 and FIG. 6 describe the areal deposition of the material on a near-planar surface, with the general intent of providing a film on the surface of a substrate. FIG. 1, FIG. 2 and FIG. 3 depict the deposition of a film on a substrate surface in a linear or sinuous bead, such as might be used in decorative purposes, or positioning electrical or optical lines on a substrate surface.

When the method of the present invention is applied to a plurality of surfaces, using an adhesive as the extrudable material, it can be used to bond like or dissimilar materials together. The present invention teaches a variety of topologies relating the substrates and the bonding adhesive.

FIG. 8 is a schematic cross-section of an article made using sinuous or linear deposition methods, as might be made using the first, second, third or sixth embodiments of the present invention, where the cross-section is perpendicular to the direction of movement of the substrate, in which light-mediated substrate heating is used on surfaces in close opposition. In this figure, a plurality of the substrates 32 are placed in close opposition, and the surfaces most exposed are bonded using light-mediated substrate heating, with a resulting adhesive bead 58. The substrates are held together due to the structural integrity of the adhesive bead, which resists forces, largely shear in nature, when the substrates are pulled apart. The substrates bonded by this method may be of similar or dissimilar composition.

FIG. 9 is a schematic cross-section of an article made using sinuous or linear deposition methods, as might be made using the first, second, third or sixth embodiments of the present invention, where the cross-section is perpendicular to the direction of movement of the substrate, in which light-mediated substrate heating is used on surfaces which are separated by a more substantial gap than shown in FIG. 8. In this figure, a plurality of the substrates 32 are placed in wide opposition, containing a gap 60, into which the adhesive 58 is deposited using light-mediated substrate heating. The substrates are held together due to the structural integrity of the adhesive, which resists tensile or cleavage forces when the substrates are pulled apart. Articles can be made by a combination of the bonds described in FIG. 8 and FIG. 9, where the form of the bond is controlled by the separation of the substrates, the amount of adhesive applied, and the specific topology of adhesive deposition. When both types of bonds are combined in a single article, increased strength against tensile, shear and cleavage forces is produced.

Bonds of the types depicted in FIG. 8 and FIG. 9 may be combined or configured in a variety of different manners, other than the "butt" bonds shown. For example, one substrate may be placed on top of another, and the edge of the upper substrate may then be bonded to the lower substrate using material deposition at the boundary region. Light-mediation of this bond can be accomplished using illumination that straddles the boundary, heating both upper and lower substrates.

It should be noted that the substrates bonded through light-mediation may be of different compositions. For example, fabric can be bonded to wood, in which both substrates are treated with light-mediation of the material application. Furthermore, the method will also have beneficial effects when only one of the substrates utilizes light-mediation. Thus, if one of the substrates bonds tightly to the adhesive in the absence of light-mediation, whereas the bond with the other substrate is greatly enhanced by light-mediation, then it is within the teaching of the current invention to heat only one of the substrates through the light-mediation methods described above in order to have a beneficial effect.

In addition, substrates may be treated over a broad surface area so that the adhesive will lie between the substrates as a wide area film. In order to allow this type of joint, two possible deposition sequence embodiments are illustrated. FIG. 10a is a cross-sectional schematic of a seventh embodiment of the present invention, showing a method for bonding two substrates where the two substrates are positioned so that the deposition on both substrate surfaces uses a single material applicator. A plurality of unbonded substrates 32 are brought into close approximation in the presence of an adhesive applicator 64, which may be a trough or nozzle adhesive applicator. The applicator deposits the adhesive 58 into the space between the substrates, and the unbonded substrate 32 is continuously fed into position adjacent to the applicator 64 under the influence of a plurality of rollers 68, which both feed in new unbonded substrate 32, as well as maintain the proper gap between bonded substrates. Alternatively, the rollers 68 could apply pressure against the substrates 32, in order to improve bond strength.

During the bonding process, a plurality of lamps 70, extending the width of the substrate to be bonded, and in conjunction with a plurality of elliptical or circular trough reflectors 72, illuminate and heat the substrate at light application points 74, prior to its contact with the adhesive 58. If the width of adhesive bead 58 is small, the lamps and reflectors may be similar to those used in applying linear or sinuous beads as depicted in FIGS. 1, 2, and 3.

In bonding two substrates, the bonding of the adhesive to itself is not difficult to achieve. Rather it is the bonding of the adhesive to the substrate that is most important. Thus, light-mediated heating of the substrate may be used to independently allow penetration of the adhesive to a plurality of substrates, which may subsequently be brought together for the remaining surface adhesives to join.

Figure 10B:
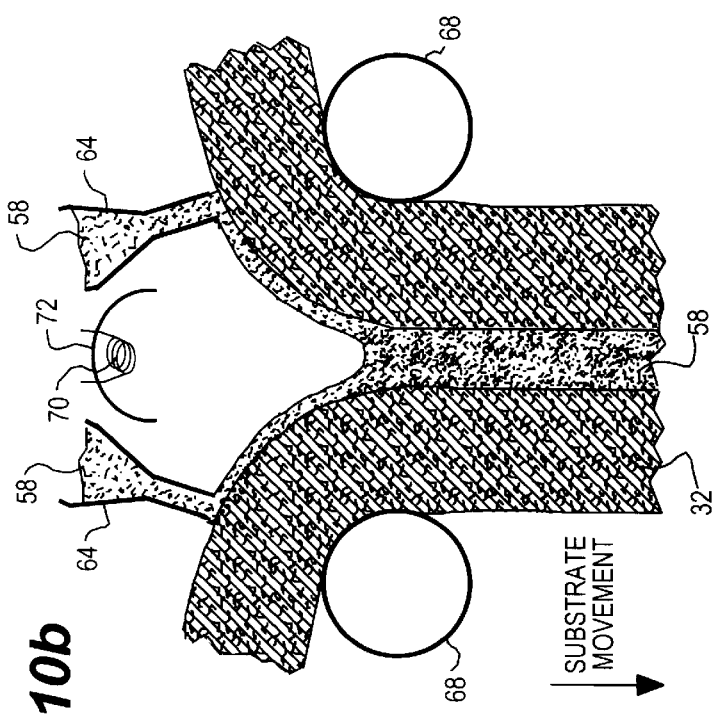
FIG. 10b is a cross-sectional schematic of an eighth embodiment of the present invention, including a method for bonding two substrates in which the substrates are positioned so that the deposition on both substrate surfaces uses a different material applicator for each substrate.
Figure 10A:
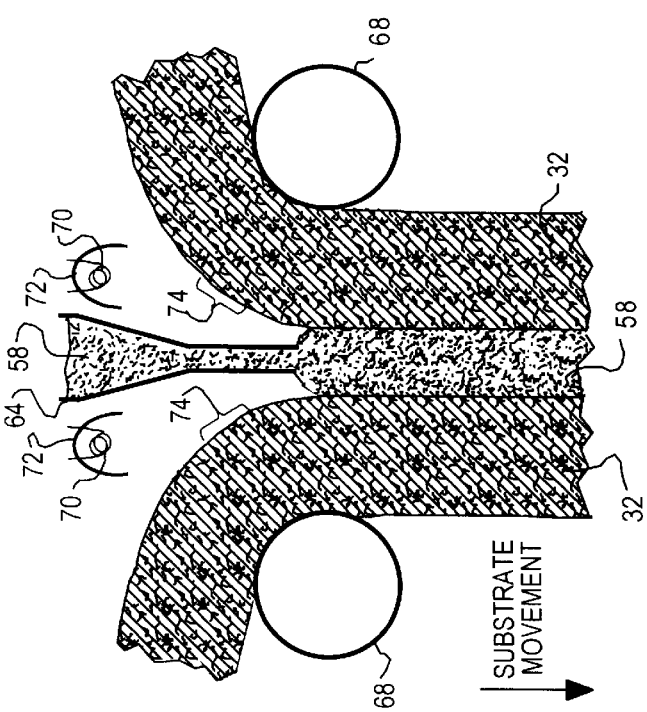
FIG. 10a is a cross-sectional schematic of a seventh embodiment of the present invention, including a method for bonding two substrates in which the substrates are positioned so that the deposition on both substrate surfaces uses a single material applicator.

FIG. 10b is a cross-sectional schematic of an eighth embodiment of the present invention, showing a method for bonding two substrates in which the substrates are positioned so that the deposition on both substrate surfaces uses a different material applicator for each substrate. The substrates 32 may be of similar or dissimilar composition. Two trough applicators 64 are used to spread the adhesive 58 separately on each substrate. After adhesive application, both substrates are heated using illumination from the extended lamp 70, some of whose rays are reflected onto the substrate 32 using the trough reflector 72. The joined substrates are pressed together and transported via the rollers 68, bringing fresh unbonded substrate 32 under the trough adhesive applicators 64.

It is understood that this same effect can be achieved using alternative methods. For example, a plurality of lamps can replace the single lamp 70 of FIG. 10b, each lamp to be used to heat a separate substrate. Also, a plurality of lamps could be used to heat the substrate prior to the application of the adhesive. In addition, in case the substrate pieces are inflexible and the substrate cannot be bent around rollers 68, it would be within the teachings of this invention to treat each substrate separately, depositing the extrudable material with light-mediated heating of the substrate using any of the sinuous, linear or areal methods described above. Both substrates, each with a linear or areal distribution of adhesive on its surface, are then placed in close opposition, so that the adhesive depositions on each substrate interact physically, and thereby form a tight bond.

Figure 11:
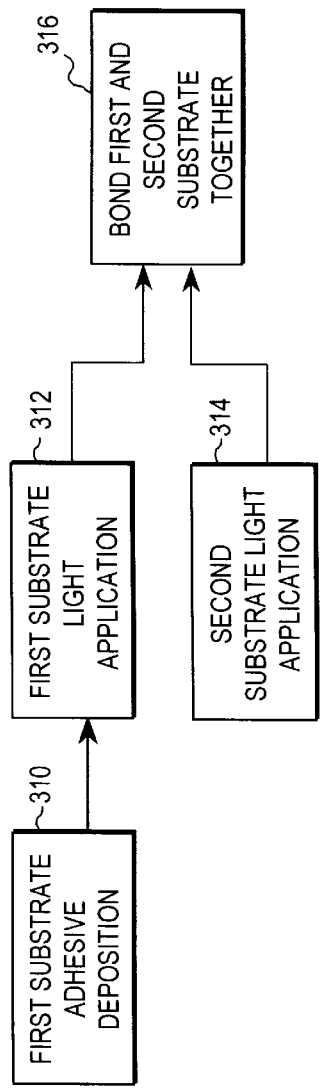
FIG. 11 is a flow diagram of the steps of bonding together two substrates wherein both substrates are treated with light, but adhesive is deposited on only one substrate.

It is also understood that within a given application, it is within the spirit of the present invention to deposit adhesive onto a first surface before light application, whereas a second substrate is treated only with light application and has no adhesive independently deposited on it, using instead the adhesive deposited onto the first surface. For example, consider two substrates (e.g. wood) to be bonded together. FIG. 11 presents a flow chart of steps that might be used to bond these substrates together. In a step 310, an adhesive is applied to a first substrate. In a subsequent step 312, light is applied to this first substrate according to the present invention, such as in the manner of FIG. 2, causing the adhesive to couple tightly to the first substrate. In a step 314, light is applied to a second substrate, to which adhesive had not been previously deposited. This now-heated substrate is primed to receive adhesive in the spirit of the present invention. However, instead of independently applying adhesive to this second substrate, in a step 316 the first substrate which was treated in the steps 310 and 312 is brought into contact with the area of the second substrate treated in the step 314, so that the adhesive on the first substrate is tightly coupled to the second substrate. Because the adhesive is now tightly coupled to both the first and second substrate, the adhesive serves to bond the two substrates.

It should be noted that in the method shown in FIG. 11, the first substrate has material deposition prior to light application, whereas the second substrate has material deposition subsequent to light application. In fact, any combination of sequences of material deposition and light application are within the spirit of the present application. While this process can be continuous for flexible substrates (e.g. in the manner of FIGS. 10a and 10b), for inflexible substrates such as wood, treatment of the entire substrates in the steps 310, 312, and 214 must precede the bonding step 316 for the entire substrate. If the substrates are long, this means that there may be an extended period of time during which the substrates are treated before they can be bonded. Thus, particularly for the second substrate, after light application, there may be a delay of many seconds before the adhesive deposited on the first substrate will be bonded to its light-treated surface. As will be described later, the processes of the present invention allow many seconds of time between material deposition and light application during which the effectiveness of the methods are not much affected.

In order to derive the largest efficiencies from the light sources used in light-mediated heating of the substrate, it is useful for the substrate to have a high absorption of the light energies emitted by the illumination device. Certain substrates, however, may be either transparent to the majority of the light energy impinging on the substrate surface, or may be highly reflective. In both circumstances, the efficacy of light-mediated substrate heating will be reduced.

Figure 12:
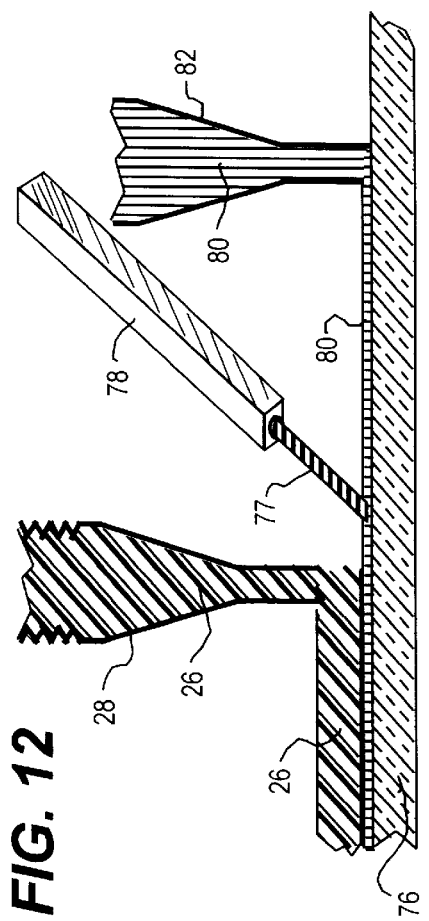
FIG. 12 is a cross-sectional view of a ninth embodiment of the present invention, in which a light-absorbing substance is applied to the substrate in order to enhance substrate heating through light absorption.

In order to overcome these effects, the extrudable material application apparatus may contain a module for altering the light-absorbing properties of the substrate. FIG. 12 is a cross-sectional view of a ninth embodiment of the present invention, showing a linear deposition device in which light-mediated heating of the substrate is performed prior to the deposition of the extrudable material 26, and in which a light-absorbing substance is applied to the substrate in order to enhance substrate heating through light absorption. In FIG. 12, the extrudable material 26 is deposited through the nozzle 28 onto a transparent or reflective substrate 76. The substrate 76 differs from typical substrate 32 of the previous figures, in that this substrate 76 is either somewhat transparent to or relatively reflective of a substantial fraction of a plurality of collimated light rays 77 emanating from the light source, in this case a carbon dioxide laser 78. In this figure, a low reflection, high light-absorption composition 80 is deposited on the substrate 76 through a spray nozzle 82. The composition 80 may contain carbon black as the light absorptive agent.

It is within the teachings of this invention that the nozzle 82 could be replaced with a roller for spreading the composition 80, possibly with a reservoir in contact with the roller for the purpose of maintaining a surface of the composition 80 on the surface of the roller. It is also within the teachings of the invention that coating the transparent or reflective substrate 76 with the composition 80 may occur well before the deposition of the extrudable material 26, and possibly as two processes carried out on different apparatuses. It is also within the teachings of this invention that the coating of the transparent or reflective substrate 76 with the composition 80 may be of benefit when the light-mediated heating of the substrate occurs prior to or after the deposition of the extrudable material 26. Furthermore, the carbon dioxide laser 78 could be replaced with any light source of a suitable energy density.

As an alternative to depositing a highly light-absorbent compound, other means of altering the surface properties can have similar effects. For example, roughening the surface with an abrasive surface can serve either to increase the absorbency of a highly reflective surface, or alternatively, may remove a surface treatment or layer on the substrate, revealing a more light-absorbent underlying substrate composition.

Removal of Unwanted Light Energy

In general, it is of benefit to allow all collectable light from the light sources to fall onto the substrate surface. Any light that is absorbed by the substrate will generally be converted into heat energy, with beneficial effects for the application of an extrudable material. However, in certain cases, particularly where a human operator is involved in the control of the apparatus, intense visible light may interfere with the visual observation of the process. Such observation may be important in process control, such as in the case where this invention is used for an apparatus for bonding fabrics, as in the manner of a sewing machine. In such cases, it is beneficial for safety purposes either not to produce visible light or to shield the operator from some fraction of the unwanted visible light emanating from the illumination source.

In order to shift the wavelength of the illumination toward the invisible infrared, one can use a lamp that operates at a lower temperature. Since most lamps produce a large fraction of their light through black body radiation, a lower operating temperature, usually regulated through the amount of electrical energy input to an arc or filament source, will generate a larger fraction of the energy in longer wavelengths. This control over wavelength is usually compromised by the need to generate large radiances at the illumination source, so as to keep the illumination source small, allowing more efficient capture of the generated light energy.

Figure 13:
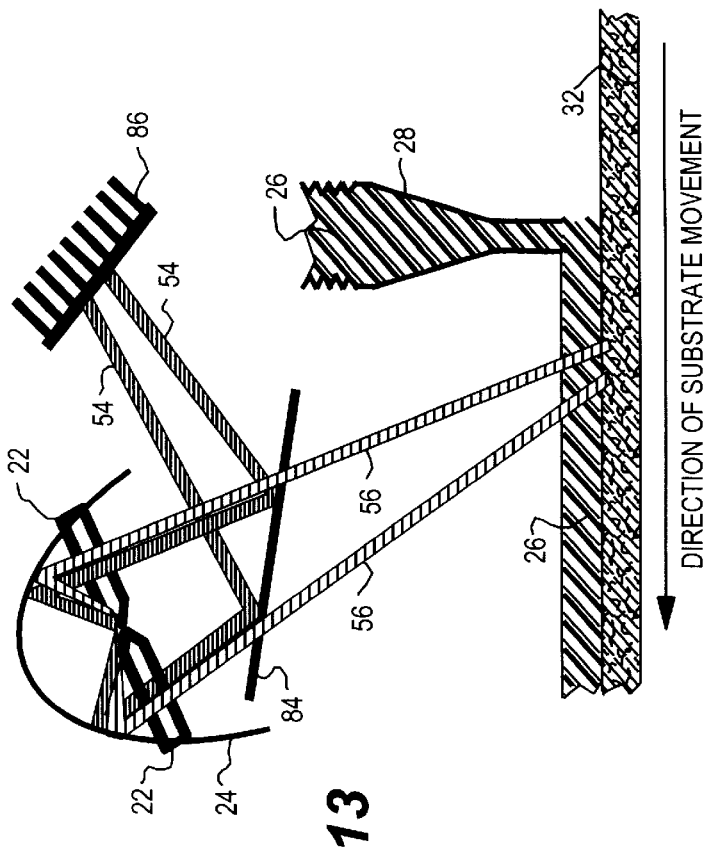
FIG. 13 is a cross-sectional view of a tenth embodiment of the present invention, in which a "cold mirror" is used to remove unwanted radiation.

It is also possible to remove some of the visible wavelengths via optics which are designed to transmit infra-red wavelength light, while absorbing or reflecting shorter visible wavelengths. These optical devices are frequently called "cold mirrors," and are commercially available from a number of commercial sources with different cut-offs between transmitted and reflected light. An example is the #66239 cold mirror from Oriel Corporation of Stratford, Conn. FIG. 13 is a cross-sectional view of a tenth embodiment of the present invention, including a device in which a cold mirror is used to remove unwanted radiation. The arc lamp 22 produces wide spectrum light energy consisting of long wavelength light rays 56 and short wavelength visible and UV rays 54, which are concentrated by the ellipsoidal mirror 24 and projected at the substrate 32, on which lies the extrudable material 26 which has been deposited with the nozzle 28. A cold mirror 84 lies between the illumination source and the substrate, which reflects the short wavelength rays 54 away from the substrate, but which allows the longer wavelength rays 56 to pass through unimpeded. The rays 54 that are reflected by the cold mirror 84 are collected on absorbing heat sink 86, where the heat is removed with a passive radiating fin structure, possibly in conjunction with forced air cooling or with a water-cooling apparatus. Other means of removing the reflected light rays are possible, including dispersing them into a part of the room, such as the ceiling, where they will not pose a safety hazard. All such configurations would allow a human operator to monitor and control the process, minimizing the possibility of damage to the operator's vision.

It is understood that such a method of removing unwanted light may be practiced with any of the broad spectrum wavelength sources hereabove mentioned, either as point, linear or areal light sources. It is also within the teachings of this invention to use a "hot mirror" which selectively reflects longer wavelengths, and which may be placed in such a way to reflect only longer wavelengths at the substrate, and in which shorter wavelengths pass through towards a heat sink.

As mentioned above, it is most efficient to make use of both long and short wavelength illumination, which practice is interfered with by both hot and cold mirrors. As an alternative, light filters and or protective glasses or goggles may be interposed between the substrate, where considerable reflection of the incident light frequently occurs, and the operator's eyes. Such filters may be neutral density filters, or may be also designed to absorb UV wavelengths, which are particularly damaging to eye health.

Linear Reflector Construction

Figure 15A:
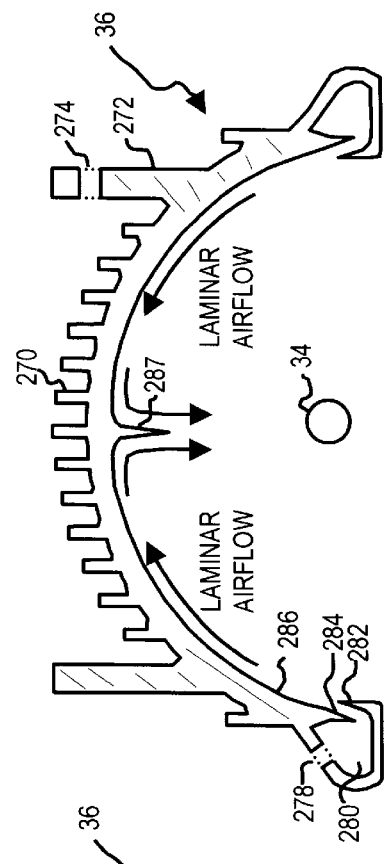
FIG. 15a is a cross-section of a linear reflector according to FIG. 2, perpendicular to its longitudinal axis.

As will be described below, reflector shape can be used to control the distribution of incident radiation on the substrate. Irrespective of the shape, however, there are a number of aspects of reflector construction that can have benefits in the operation of the present invention. FIG. 15a is a cross-section of a linear reflector 36 perpendicular to its longitudinal axis. The reflector 36 is comprised of metal, conveniently aluminum, so that it can be manufactured using inexpensive extrusion technology, although other materials and methods of production are consistent with the present invention. Along the outside surface of a backbone 286 of the reflector are arrayed small fins 270, whose purpose is to dissipate heat which collects from the incident radiation along an inner surface 276 of the reflector. This inner surface 276 is prepared so as to reflect the great majority of the radiation incident upon it from the extended length lamp 34, shown in cross-section. Such treatments may include polishing the inner surface 276, and may also include deposition by such processes as evaporation or sputtering of overcoats such as silicon oxide, silver, rhodium, gold or multilayer dielectric coatings, which may be used in conjunction with one another. The purpose of these coatings may be to enhance the amount of reflection in various parts of the electromagnetic spectrum (particularly in the infrared), or to protect the surface from handling or oxidation. With these special coatings, the amount of heat absorbed by the inner surface 276 may be reduced, and the fins will prevent buildup of any residual heat in the reflector 36. Larger fins 272 may also be incorporated, which serve both for heat dissipation, as well as sites for mechanically mounting the reflector 36 in the deposition system. This coupling may be assisted by the use of holes 274 or slots in similar position, placed along the length of the large fins 272, for mounting. In order to enhance the heat radiation from the outer surface and fins 270 and 272 of the reflector 36, it is preferred to paint, anodize or similarly color the outside surface black or a similar dark color.

Because the inner surface 276 of the reflector 36 is exposed over a long period to substrates and extruded materials heated to high temperatures, atmospherically-borne substances may adhere to the inner surface 276. This material may be outgassed from the substrate or extruded materials, or may represent pyrolysis or oxidation products from the incident radiation. Over a period of time, substances which adhere to this inner surface 276 will lower the reflectivity of the inner surface 276, complicating control over heat application, reducing consistency if treatment, and increasing the energy requirements of the process. In order to reduce these effects, it is convenient to have a laminar flow of air over the inner surface 276, to prevent contact of this inner surface 276 with atmospherically-borne substances previously mentioned.

To generate such a laminar airflow, a chamber 280 is provided that communicates with both the inner surface 276 and the outer surface of the reflector 36 backbone. This chamber 280 is continuous along the length of the reflector, and is sealed at its ends using welded, soldered or otherwise attached end-pieces (not shown). Pressurized clean air, which may be filtered, is introduced into the chamber 280 via one or a series of holes 278. The cross-section of chamber 280 is made large enough so that pressure equilibrium is maintained along the length of the chamber 280. A gas release channel 283 is formed from an inner guide 284 and an outer guide 282, which channels the pressurized air from the chamber 280 along the inner surface 276 of the reflector 36. This laminar airflow traverses the entire inner surface 276, and prevents contact with the atmosphere below the inner surface 276. After traversing this inner surface 276, the volume of air may be directed to the central area within the reflector 36 through use of a flare 288 built into the reflector 36, where it clears the contaminated air out the ends of the reflector. Alternatively, a longitudinal vane (not shown) may be used to direct the volume of air outside the reflector 36.

Figure 15B:
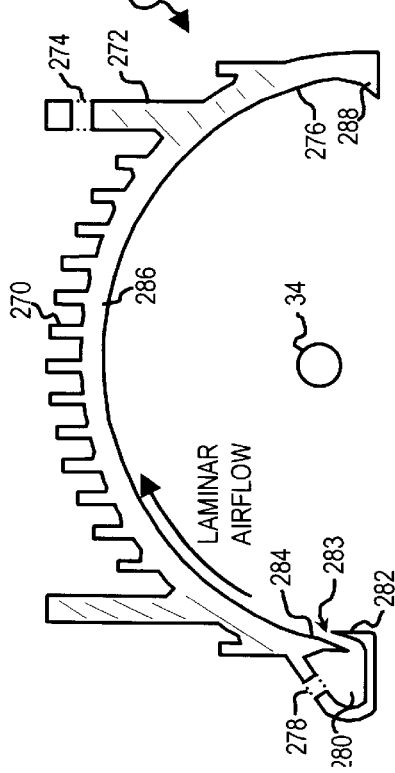
FIG. 15b is a cross-section of another linear reflector according to FIG. 2, perpendicular to its longitudinal axis.

It should be noted that many shapes, compositions and constructions of reflector construction are within the spirit of the present invention. For example, FIG. 15b is a cross-section of a linear reflector 36 perpendicular to its longitudinal axis in which chambers 280 are provided symmetrically on either side of the reflector 36, with a central, downward pointing vane 287 that is used to direct the airflow down to clear air from the central region of the reflector 36. This downward sweeping air has the added benefit of keeping contaminated air away from the extended length lamp 34, so that its surface does not become dirty and absorb emitted light. Instead of the laminar airflow shown in FIGS. 15a and 15b, various orifices may be located along the reflector 36 to sweep contaminating air out the ends of the reflector 36. Also, fins 270 and 272 may be positioned and shaped in a variety of ways to facilitate heat dissipation, or may be eliminated if the inner surface 276 is so reflective that heat build up in the reflector 36 is not an issue.

Control of Substrate Temperature

In general, the effectiveness of the procedure depends to some extent on the temperature to which the substrate is heated. Furthermore, the temperatures to which the substrate will be heated will be very large, and may in fact be close to the pyrolysis or combustion temperature of the substrate. If the amount of incident electromagnetic radiation energy onto the substrate or the optical absorbance of the substrate were to vary greatly, this could lead either to ineffective bonding if the temperature of the substrate dropped below the optimum, or to pyrolysis or oxidation of the substrate if the substrate temperature were too elevated. Thus, for effective bonding using radiation heating of substrates, control over the amount of energy incident on the substrate surface must be controlled with precision.

The present invention allows precise control over the amount of energy absorbed by the substrate surface by measurement of the heat radiated from the surface, which is related to the temperature of the surface by well-known physical laws. The present invention includes apparatus for measuring the blackbody light energy radiated from the substrate surface, and methods for using this radiated light measurement to properly control the amount of incident irradiation on the surface.

Figure 16:
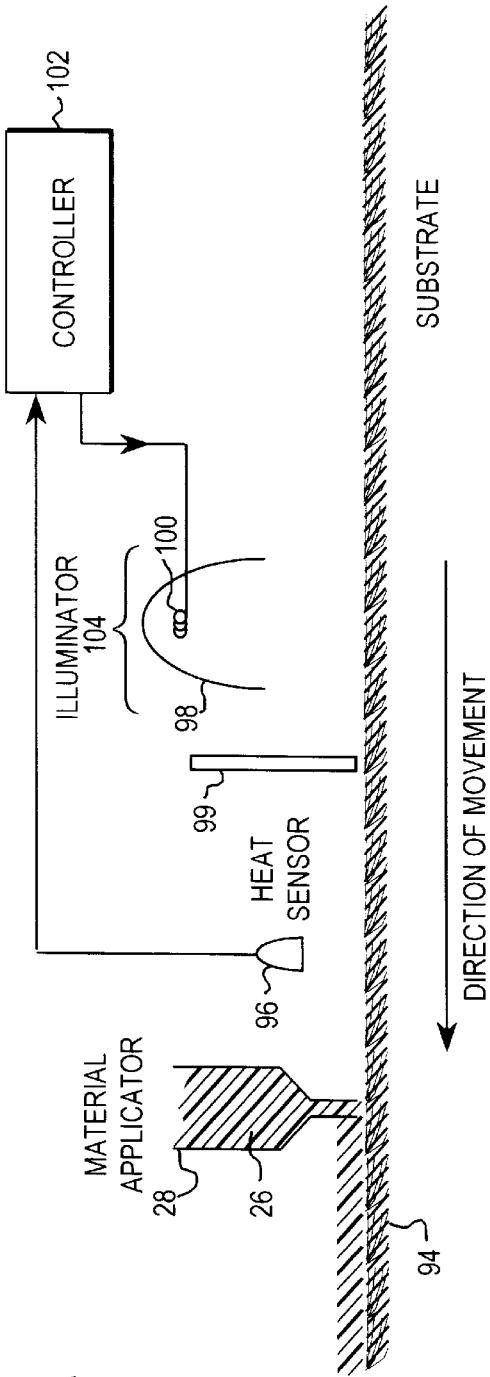
FIG. 16 is a schematic diagram of the present invention operated with closed-loop feedback of input radiation.

FIG. 16 is a schematic diagram of the present invention using feedback control of input radiation. A substrate 94, which is depicted as wooded, although within the teachings of the present invention it may be of varied composition such as fibrous, plastic, foam, etc., is moving to the left relative to a material applicator 28 used to deposit the extrudable material 26 on the substrate 94 surface. It should be noted that either the substrate 94 or the applicator 28 may be in motion, but for purposes of discussion, the substrate 94 will be described in motion.

As the substrate 94 moves underneath the applicator 28, the material 26 is forced from the applicator 28 onto the surface of the substrate 94. Prior to the application of the material 26, an illuminator 104, comprising an electrically energized filament 100 and a reflector 98, irradiates the substrate 94, thereby heating the substrate 94 to a high temperature. Thus, when the substrate 94 which is irradiated passes under the applicator 28, the extrudable material 26 which is deposited encounters the substrate 94 which is heated to high temperatures, and the material 26 in contact with the substrate 94 is heated substantially, causing its viscosity to be reduced. Thus, the material 26 can then penetrate and otherwise strongly interact both physically and chemically with the substrate 94, and thereby the strength of the bond between the material 26 and the substrate 94 is enhanced.

Because of the extreme temperatures to which the substrate 94 can be raised with this method, it is advantageous to be able to precisely control the amount of energy emitted by the illuminator 104. In general, this energy will be in the electromagnetic energy spectrum in the range from the visible through the far infrared, although other wavelengths (e.g. UV or shorter) may in certain cases be either the primary energy emitted by the illuminator 104, or at least a large fraction of the energy radiated (e.g. in high temperature blackbody radiation). For purposes of the following discussion, the energy emanating from the illuminator 104 will be described generically as light. Furthermore, the source of light may be other than an electrically-energized filament 100, and may alternatively be a resistively-heated ceramic bar, an arc lamp, a diode laser or any other rod or gas laser, or other source as may be effectively used to heat the substrate 94 at a distance.

It should be appreciated that in practice, the substrate 94 will have many different characteristics, including reflectivity/absorbance, heat capacity, and water content. If the reflectivity were to change over the substrate, the amount of light energy retained by the substrate 94 would be altered. If the heat capacity changes, even with constant absorbance, the final temperature of the substrate 94 under the influence of the incident light will be altered. And even were the reflectivity and the heat capacity to remain the same, changes in water content will affect the temperature of the substrate, since some of the incident, retained heat may go to vaporize the water, causing a loss of heat equal to the latent heat of vaporization of the water so lost. Furthermore, the illuminator 104 characteristics may also change, for example, with the service length of the filament 100, contaminants collecting either on the inside or outside wall of the transparent material enclosing the filament 100, or the changing alignment of the focusing elements such as reflector 98 relative to the filament 100 or the substrate 94.

A remote heat sensor 96 (pyrometer) is placed so as to measure the black-body radiation emitted by the substrate 94 which is heated between the time that the substrate 94 is heated under the illuminator 104 and the material 26 is applied by the applicator 28. A shield 99 is placed between the illuminator 104 and the heat sensor 96 so as to reduce the amount of stray heat radiation from the illuminator 104 interfering with the measurement of temperature on the substrate 94 by the heat sensor 96. The amount and spectral distribution of the blackbody radiation emitted by the substrate 94 is characteristic of the wooden substrate 94 material properties and the temperature of the substrate 94. The heat sensor 96 passes information related to the temperature of the wooden substrate 94 to a controller 102, which controls the amount of electrical energy sent to and dissipated by the filament 100 of the illuminator 104. When the controller 102 determines that the temperature of the substrate 94 passing under the illuminator 104 is higher than some predetermined optimal value, the controller 102 decreases the electrical energy supplied to the illuminator 104 (e.g. by decreasing the voltage of the electrical supply). Conversely, when the controller 102 determines that the temperature of the substrate 94 passing under the illuminator 104 is lower than the predetermined optimal value, the controller 102 increases the electrical energy supplied to the illuminator 104.

It is also within the spirit of the present invention that control over the energy density of absorbed light on the substrate 94 surface may be altered by varying the speed of substrate 94 movement under the illuminator 104. For example, when the controller 102 determines that the temperature of the substrate 94 passing under the illuminator 104 is lower than the predetermined optimal value, the controller 102 may decrease the speed of substrate 94 movement, while maintaining the output of the illuminator 104, so as to increase the energy density on the substrate 94.

Various embodiments of the present invention utilize different arrangements of the remote heat sensor 96, means for determining the temperature of the substrate 94, algorithms for determining the proper illuminator 104 output, and means of controlling the illuminator 104 output. The preferred embodiments of the present invention will be described in the following sections.

Closed-Loop Feedback

Figure 17:
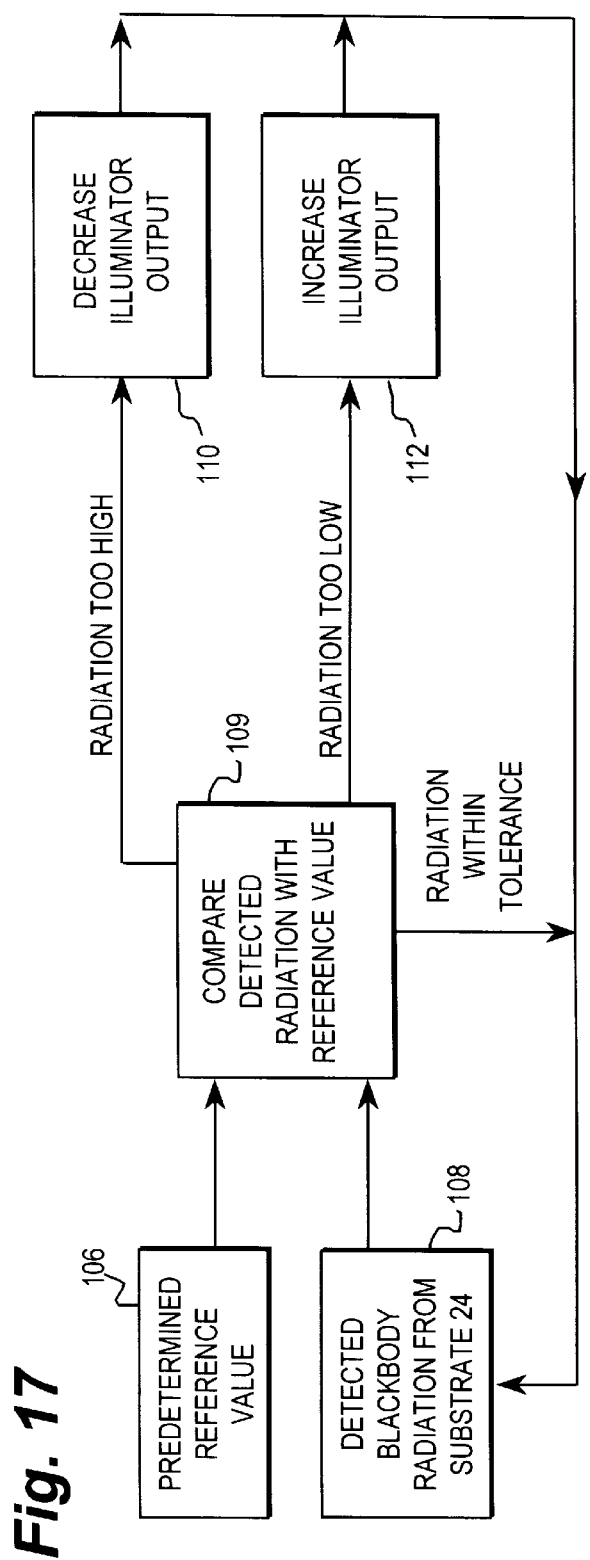
FIG. 17 is a flow diagram of a closed-loop feedback system according to the physical arrangement of FIG. 16.

FIG. 17 is a flow diagram of a closed-loop feedback system according to the physical arrangement depicted in FIG. 16. The detected value of blackbody radiation 108 emitted from the substrate 94 is sent to the controller 102, where it is compared with a reference quantity 106 of blackbody radiation in a step 109. In a step 110, if the detected radiation 108 is high relative to the reference 106, the controller 102 causes the filament to emit less light radiation onto the substrate 94. In a step 112, if the detected radiation 108 is low relative to the reference, the controller 102 cases the filament to emit more radiation onto the substrate. And if the detected blackbody radiation 108 is within the tolerances of the reference quantity 106, then no changes are made to the output of the illuminator 104.

As can be seen, the influence of the detected radiation 108 on the output of the radiation through the illuminator in the steps 110 and 112 causes a closed-loop feedback control system. The system will thus naturally adjust the amount of light radiation from the illuminator 104 to maintain the detected light output 108 close to that of the predetermined reference value 106. The details of the control of such feedback systems are well-known, and may involve the use of PID (proportional, integral and derivative action) and similar control algorithms and systems to prevent system drift, over-compensation, and the like.

It should be noted that the predetermined reference quantity 106 is in arbitrary units, and refers simply to the amount of heat radiation detected by the remote heat sensor 96. This quantity does not necessarily indicate a specific temperature of the substrate 94, since the amount of blackbody radiation may be variably related to the temperature of the substrate 94 in such as way as to be difficult or impossible to precisely predict. The amount of blackbody radiation emitted by the substrate 94 is given by $$P_r = \sigma \epsilon A T^4 \quad (1)$$

where $P_r$ is the power of radiated light, $\sigma$ is the Stefan-Boltzman constant, $\epsilon$ is the emissivity of the substrate's surface, A is the radiative surface area of the substrate, and T is temperature of the substrate in degrees Kelvin. Thus, the output blackbody radiation will be influenced not only by the changes in the substrate temperature, but also the emissivity $\epsilon$ and the surface area of the substrate 94.

The effects of emissivity on the measurement of temperature has been a central issue of pyrometry for many decades. A number of different methods have been used to compensate for emissivity effects, and generally involve the use of reference emitters, which may approximate blackbody emitters, and/or the use of multi-spectral detectors (e.g. two-color ratio pyrometers). The measurement of radiation at multiple wavelengths allows the use of algorithms that rely less on the overall power output (e.g. from the Stefan-Boltzman equation, above), but more on the changes in output spectrum as the temperature of the emitter changes. As the emitter becomes hotter, the blackbody radiation tends towards shorter wavelengths. However, most of the multi-spectral infrared detectors, in order to convert their output to absolute temperature measurements, must still make restrictive assumptions about the substrate emissivity which may not hold in real world situations (e.g. that emissivity is relatively constant over wavelength). An example of a multi-spectral pyrometer is shown in U.S. Pat. No. 5,132,922 to Khan, et. al. Further examples of multi-spectral pyrometers that further include referencing means are U.S. Pat. No. 5,326,173 to Evans, et. al., and U.S. Pat. No. 4,979,133 to Arima and Tsujimura.

Temperature Calibration Lacking Knowledge of Emissivity and Surface Area

The present invention includes a novel means of calibrating the heat detector 96 to the temperature of the substrate, without knowledge of the emissivity properties of the substrate 94. The method utilizes the fact that in almost every case, the illuminator 104 will necessarily heat the substrate 94 non-uniformly, allowing the heat detector 96 to compare sections of substrate 94 that have been heated differently by known amounts. The non-uniformity of illumination may result either from the inherent non-uniformity of the illumination due to optical effects (e.g. of the reflector or refraction design), or because the illumination may not extend over the entirety of the substrate 94. For example, if the illuminator 104 incorporates an ellipsoidal reflector 98, the light incident on the substrate 94 will generally peak over a narrow focal area, with a roughly bell-shaped cross-sectional intensity that rapidly falls off with distance from the central focus point.

Figure 18A:
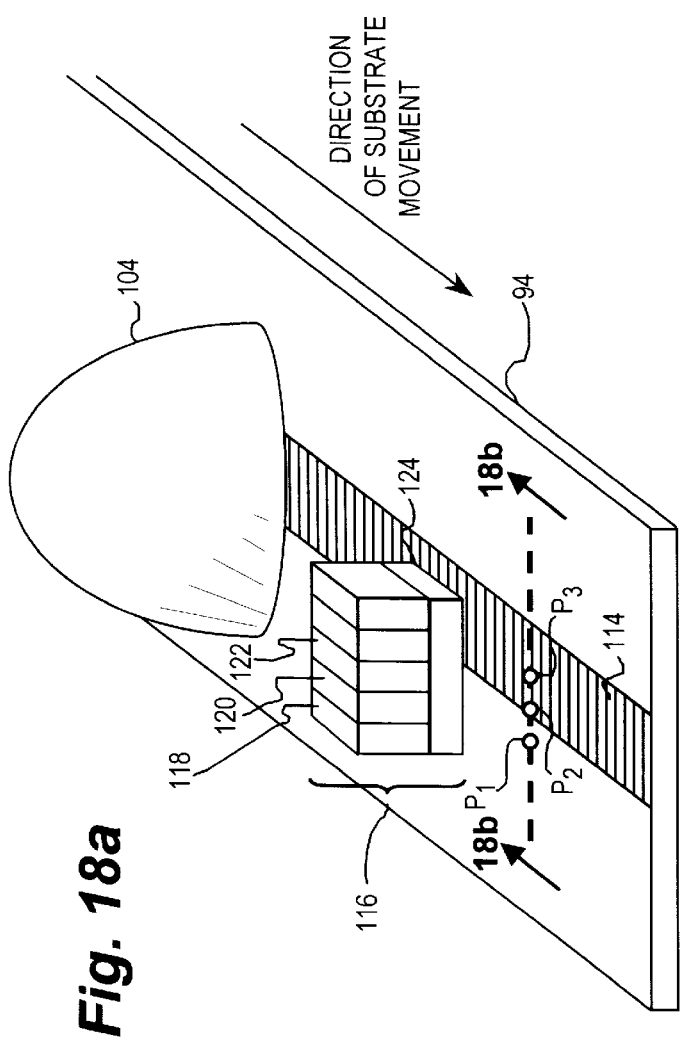
FIG. 18a is a top perspective view of a thermal imaging device in relation to a substrate and an illuminator.

FIG. 18a is a top perspective view, showing the irradiation of the substrate 94 by the illuminator 104. The illuminator 104 as shown includes an approximately ellipsoidal reflector (although other reflector geometries may also be efficient and convenient). A heated area 114 of the substrate 94 lies in roughly a strip of material in the direction of substrate movement from the illuminator 104. The lateral extents of this heated area 114 are not precise, since the lateral spread of the light beam from the illuminator 104 is not constant. Furthermore, this width may spread somewhat due to heat transfer within the substrate 94.

Figure 18B:
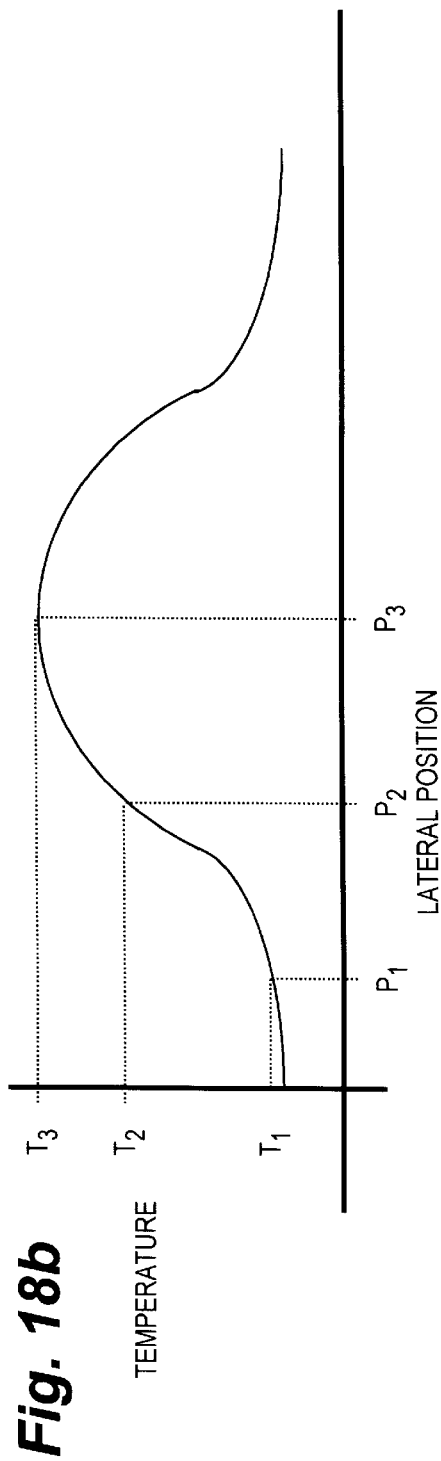

FIG. 18b is a graph of temperatures on the surface of the substrate 94 along the indicated cross section of FIG. 18a. Three points, $P_1$, $P_2$ and $P_3$ have been chosen along the cross-section line for particular analysis. As can be seen in FIG. 18b, the distribution of surface temperatures across the cross-section line varies. The point $P_3$ represents the maximum temperature, the point $P_2$ represents an intermediate temperature, and the point $P_1$ represents a location that is not illuminated by the illuminator 104, and is at most only slightly affected by heat conduction within the substrate 94. Thus, the temperature at the point $P_1$ is roughly that of the environmental temperature (assuming that the substrate is kept at environmental temperatures before processing).

A thermal camera 116 (shown in FIG. 18a) is positioned above the substrate 94 in such a way that its sensing elements, such as sensing elements 118, 120 and 122, are pointing at the substrate 94 and are sensitive to blackbody radiation (generally containing significant infrared components) emitted by the substrate 94. The thermal camera 116 further comprises a lens system 124, so that individual sensing elements 118, 120 and 122 are responsive to physically distinct locations on the substrate 94 surface. In this case, the sensing element 118 is primarily responsive to the heat radiated from the position $P_1$, the sensing element 120 is primarily responsive to the heat radiated from the position $P_2$, and the sensing element 124 is primarily responsive to the heat radiated from the position $P_3$. Thus, the camera 116 simultaneously detects the infrared radiation emanating from distinct points on the substrate 94. It should be noted that although the thermal camera 116 is used in this embodiment, including the lens system 124, it is within the spirit of the present invention that individual sensing elements, distinct electronically and/or physically from each other, with or without a lens system, may also be conveniently used.

While the substrate emissivity will affect absolute temperature measurements, the changes will generally be similar across the substrate 94 because the emissivity will be relatively constant across most substrates. Thus, one can isolate the effects of the emissivity by using a known reference from the substrate itself, as will be described in two different embodiments.

In the first embodiment, the blackbody radiation as measured from the points $P_1$ and $P_3$ through sensing elements 118 and 122, respectively, represent the emissions from a substrate region without appreciable energy input ($P_{r1}$) and the emissions from a substrate region with considerable energy input ($P_{r3}$). The ratio between the output blackbody radiation power at the two locations is $$\frac{P_{r3}}{P_{r1}} = \frac{T_3^4}{T_1^4} \qquad (2)$$

where $T_1$ is the temperature of the unheated substrate, and $T_3$ is temperature of the heated substrate at the point $P_3$ (all temperatures are given in degrees Kelvin). It should be noted that this relationship involves only a single unknown, $T_3$, where the other variables are either known or measurable. Solving this relationship for $T_3$ gives $$T_3 = T_1 \times \sqrt[4]{\frac{P_{r3}}{P_{r1}}} \qquad (3)$$

In general, the ratios of overall blackbody radiation power can be known with a fairly high degree of precision as measured by the thermal camera 116, as can be the background temperature of the substrate, $T_1$, thus giving a reasonable precision for the temperature of the substrate 94.

In order to obtain accurate numbers for the blackbody emissions from the substrate 94 lacking considerable heat input, a number of methods may be utilized. For example, a shield can be placed over the position $P_1$ of the substrate 94 from which the background temperature will be measured that prevents light from the illuminator 104 from striking the substrate 94 and heating it above the known background temperature. Alternatively, the sensing element 118 may be placed over the substrate 94 in a position before the illuminator 104 heats the substrate 94. This sensing element 118 may be placed at the same lateral position as $P_3$, the position at which the heated substrate temperature will be measured, thus providing accurate temperature measurements of the same material before and after substrate 94 heating.

It should be noted that the accuracy of the temperature measurement from blackbody radiation depends not only on the emissivity σ of the substrate, but also the radiative surface area A as well. Heating the substrate 94, however, may well change the substrate properties, including area. For example, if the substrate 94 has a large degree of surface roughness, and the heating melts the substrate 94, the roughness may be lessened, which will have the effect of lowering the emitting surface area and therefore the apprised value of temperature. Thus, even though the temperature is increasing above the limit of surface melting, the temperature sensed through blackbody radiation may appear less.

Furthermore, there may be changes in the emissivity of the substrate 94 with respect to temperature. For example, as the substrate 94 is heated, it may oxidize or char, giving it a surface coating which will likely have a different emissivity (e.g. by changing to a blacker color, it might have a higher emissivity). The method described retains high precision only when the emissivity and the effective emitting surface area remain roughly constant during the illumination.

If it is assumed that the radiation distribution from the illuminator 104 is roughly constant, then the relative amounts of radiation falling on lateral positions related to the points $P_1$, $P_2$ and $P_3$ will also be constant. Since the emissivity and emitting surface area of the substrate 94 at these lateral locations are assumed to be the same, the amount of heat absorbed at the points $P_2$ and $P_3$ in a given unit area will be proportional to the incident radiation. Furthermore, given roughly constant physical properties for the substrate 94, such as specific heat, thermal conductivity, and mass, changes in temperature ΔT at the various locations will also be proportional to different levels of incident irradiation. In this case, the ratio between the output blackbody radiation powers $P_{r2}$ and $P_{r3}$ at the two locations is $$\frac{P_{r3}}{P_{r2}} = \frac{(T_1 + \Delta T_3)^4}{(T_1 + \Delta T_2)^4} \quad (4)$$

where $\Delta T_2$ and $\Delta T_3$ are the changes in temperature at lateral positions $P_2$ and $P_3$, respectively. If $f$ is the ratio of incident light ($P_{i2}$ and $P_{i3}$) at lateral positions $P_2$ and $P_3$—that is, $f=P_{i2}/P_{i3}$—this relationship can be restated as $$\frac{P_{r3}}{P_{r2}} = \frac{(T_1 + \Delta T_3)^4}{(T_1 + f\Delta T_3)^4} \quad (5)$$

and then using the ratio relationship between temperature and the power of blackbody radiation, $T_3$ can be expressed as $$T_3 = \frac{RT_1(1-f)}{1-Rf} \quad (6)$$

where $$R = \sqrt[4]{\frac{P_{r3}}{P_{r1}}} \quad (7)$$

These relationships allow the measurement of the substrate temperature at many different locations on the substrate 94, requiring knowledge of the different relative amounts of incident irradiation at the different lateral locations along the substrate. Superficially, to find the temperature $T_3$, equation (3) has fewer variables than the corresponding equation (6). However, equation (3) is not appropriate when changes in emissivity and surface area with temperature are expected. Equation (6) assumes a constant emissivity and effective emitting surface area, but the use of this equation over many different pairs of lateral points tests these assumptions. For example, instead of using two points $P_2$ and $P_3$ laterally along the substrate, a number N points may be measured, giving both the temperatures at these points ($T_1$, $T_2$ ... $T_N$), and also their ΔT's (ΔT1, ΔT2 ... ΔTN) from the background temperature $T_1$. If the emissivity and effective emitting surface areas are unchanged, the ratio of these ΔT's should correspond to the ratios of the different $f$'s, representing the relative amounts of heat incident at the different lateral positions. That is, if the heat incident on the surface is doubled from one point to another, then the ΔT's should also double.

The mathematical relationships described above may be arranged in many different manners. Furthermore, equation (3) may be used in a similar manner as equation (6), but where the ratios $f$ are used to check the temperatures derived from equation (3) against the expected relative increases in temperature.

The ratios $f$ representing the relative incident heat at different lateral positions may be determined in a number of different ways. For example, an additional thermal camera 116 may be trained on the substrate surface while the substrate is under direct illumination. This has the potential difficulty that the incident radiation may not be constant for the entire duration of illumination or that the reflectivity may be uneven, in which case the thermal camera 116 may not capture the entire history of the substrate 94 illumination. Alternatively, a known, homogeneous absorber may be placed on top of or in place of the substrate 94 and processed through the illuminator 104, and the emitted radiation detected as before. In this case, the homogeneity of the absorber would be important for an accurate determination. Another method would be to run the substrate 94 through the illuminator 104 at a number of different energy levels, generally less than that at which changes in the substrate 94 properties (e.g. emissivity and emitting surface area) are expected. All of these methods would allow the ratios $f$ to be determined for production processing control.

It should be noted that at different energy inputs to the illuminator 104, the spectrum of incident light on the substrate 94 will vary. In the first embodiments of the present invention, multi-spectral infrared detectors used this changing spectrum to aid in temperature measurement. However, in the latter embodiments of the present invention, the total power blackbody emission of the substrate 94 was measured, which is not affected by the changing spectrum of the radiation. There are a number of detectors that may be used that operate either as energy or photon detectors. Recently, bolometers have been fashioned as Focal Plane Arrays (FPA), which when combined with lenses and appropriate electronics function as broad spectrum thermal imagers, arranged appropriately for use as a thermal camera 116, as in FIG. 18a. Such cameras 116 can be obtained from Land Infrared (Dronfield, UK), Inframetrics (North Billerica, Mass.) and Santa Barbara Research Center (Santa Barbara, Calif.).

Large amounts of stray heat radiation will be produced in a manufacturing system, including that generated by one or more illuminators 104 as well as from the material applicator 28 and the molten material 26. Thus, the thermal camera 116 may need to be shielded from the stray radiation, as in FIG. 16. This need may be reduced by the use of optical lenses that minimize the interference of stray radiation.

Process Control when the Extrudable Material is Applied Before the Incident Irradiation It is within the scope of the present invention that the illuminator 104 acts on the substrate 94 subsequent to the extrudable material 26 deposition on the substrate 94. FIG. 19 is a schematic of such an embodiment of the present invention. As can be seen, the heat sensor 96 senses the temperature of the substrate subsequent to the heating of the substrate 94. However, the heat sensor 96 will encounter a large background infrared emission from the molten extrudable material 26. Furthermore, it is challenging to instantiate an embodiment that requires intimate knowledge about the distribution of radiant heat energy incident on the substrate 94, because the extrudable material will generally have a significant refractive contrast with the air, and thus will strongly refract light, rendering information about the distribution of light less useful (unless the extrudable material approximates a thin, flat sheet).

In this case, it should be noted that the blackbody power law involves the fourth power of temperature. If the substrate 94 is expected to reach a substantially higher temperature than the overlying extrudable material, then the infrared emissions from the material 26 will be considerably less than the far more intense signal from the substrate 94. For example, if the material 26 is applied at 450° K (350° F.) and the substrate 94 reaches 625° K (660° F.) due to the subsequent application of light, and the material 26 and the substrate 94 have similar radiative surfaces, the overall power of the blackbody radiation from the substrate 94 will be 360% of the blackbody radiation of the material 26.

This effect will be even more accentuated if a spectral band pyrometer is used that is particularly responsive to shorter wavelength radiation. Because higher temperatures cause an increasing proportion of shorter wavelength blackbody radiation, sensing mainly shorter wavelength radiation will tend to emphasize the radiation from the substrate 94 (higher temperature) than from the molten material 26 (lower temperature). The spectral responsiveness of the detector can be affected either by using a sensing material that has an intrinsic spectral response, or by the use of an optical filter 126 (see FIG. 19) to condition the incoming light prior to reading by a broad-spectrum heat sensor.

Using the embodiments described above, the temperature of the substrate 94 may be monitored if the temperature of the substrate 94 reaches temperatures distinguishably higher than that of the overlying material 26. If the temperatures of the substrate and material are similar, the temperature of the substrate 94 may be difficult to accurately determine. However, even in this case, closed-loop feedback mechanisms will be robust enough to maintain a given level of substrate 94 blackbody radiation. Indeed, given that modern molten material application machinery provides very good control on the temperature of the applied material, the input material temperature can provide a useful reference for maintaining the constancy of the higher-temperature substrate.

Open-Loop Control Processes

The embodiments described above function as closed-loop feedback processes. Such processes are extremely robust, adjusting themselves for changes in the illuminator 104 output, the properties of the substrate 94, or the process parameters (e.g. the speed at which the substrate 94 moves). One problem with feedback, however, is that it affects only subsequent substrate moving through the process. That is, it operates by looking at the temperature of the substrate 94 after being illuminated, after which any damage that will occur to the substrate 94 has already occurred. While this is of less issue in cases where the substrate 94 is relatively homogeneous, and therefore it is expected that changes in the various parameters affecting the heating of the substrate 94 will occur relatively slowly, in more custom applications, alternative methods may be appropriate. An example of such an application is the application of materials to natural products such as leather, which may have inconsistent properties due to the heterogeneity of the original material, or the processing, such as tanning, that it undergoes.

It is important to note that, in general, the process is not trying to control for the heat delivered to the substrate 94, but rather for the temperature that the substrate 94 reaches. This temperature will be a function not only of the heat absorbance of the substrate 94 (which is determined largely by the emissivity and the effective surface area of the substrate 94), but also characteristics of the substrate 94 such as density and specific heat. Thus, the change in temperature (ΔT) that the substrate 94 will experience will be roughly $$\Delta T = \frac{\varepsilon A_r XYZP_i \Delta t}{cm} \quad (8)$$

where $P_i$ is the areal power density of incident irradiation, $\Delta t$ is the time of irradiation, c is the bulk specific heat of the material, m is the approximate mass of the substrate 94 affected, $A_r$ is the ratio between the total effective absorbing area and the geometrical area, and variables X, Y and Z are placeholders for various other parameters, both known and unknown. These other parameters might refer, for example, to the water content of the substrate 94 surface, which will also be an important factor in determining the temperature of the substrate 94 since the water will tend to dissipate heat through evaporative cooling. Other than the controllable level of incident irradiation and the time of application, the other parameters will generally affect the response of the substrate 94 to incident light. Open-loop control condenses all of these effects into a single radiant-heat conversion coefficient β, corresponding to the bulk response of the substrate 94 to incident light, yielding a response $$\Delta T = \beta P i \Delta t \quad (9)$$

The object of the open-loop control system, therefore, is to determine the conversion coefficient β, which will then allow the setting of the illuminator 104 to be determined.

FIG. 20 is a schematic of an open-loop control process of the present invention. As in FIG. 16, molten extrudable material 26 is applied to the substrate 94 subsequent to heating the substrate 94 with the illuminator 104. Prior to heating the substrate 94, however, a heat gun 130 briefly irradiates the substrate 94, and the effect of the heating is monitored by a primary heat sensor 128. In overview, by determining the temperature to which the substrate 94 is heated by the heat gun 130, the responsiveness of the substrate 94 to incident heat radiation can be determined. Furthermore, the response of the substrate 94 to the main illuminator 104 can be predicted prior to heating by the illuminator 104.

Figure 21:
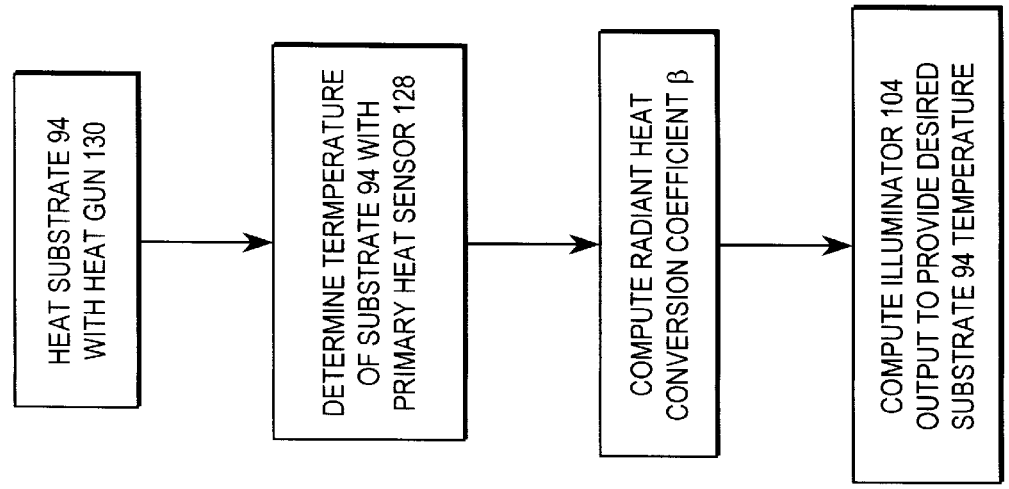
FIG. 21 is a flow-diagram of the steps of operation of the open-loop process control system shown in FIG. 20.

FIG. 21 is a flow-diagram of the open-loop control system. In the first step, the substrate 94 is heated with the heat gun 130. The purpose of heating the substrate 94 with the heat gun 130 is not to bring the substrate 94 to an operational temperature, but rather to determine the response of the substrate 94 to a small amount of heat. In the second step, the temperature of the substrate 94 is measured using the primary heat sensor 128. A variety of means of determining the temperature of the substrate 94 have been described in previous sections with regards to closed-loop feedback systems, and these may be generally used for this purpose. In the third step, the radiant heat conversion coefficient β is determined. Rearranging equation (9), $$\beta = \frac{\Delta T}{P_h \Delta t} \quad (10)$$

where the ΔT is that measured from the primary heat sensor 128 in the second step, the incident radiant heat density $P_h$ is predetermined from the arrangement of the heat gun 130, and the time of irradiation Δt is also known from the process speed, the settings of the heat gun 130, and the topology of the situation. Finally, in the fourth step, the setting of the illuminator 104 is determined by yet another rearrangement of equation (9)

$$P_i \Delta t = \frac{\Delta T}{\beta} \quad (11)$$

where ΔT is the desired change in substrate 94 temperature from the current value. For a given $P_i$ Δt (the energy delivered to the substrate), either the power $P_i$ of the illuminator 104 can be adjusted, or the duration of illumination Δt (e.g. by adjusting the process speed), or both, can be adjusted in order to maintain the proper temperature of the substrate 94.

The responsiveness of the substrate to incident irradiation is a function both of emissivity and effective radiant surface area. Both of these substrate characteristics have been described most intensively with respect to blackbody radiation emanating from the substrate 94, but these parameters have the same effects with regard to absorbance of incident irradiation. While the radiant surface area affects are independent of the spectral characteristics of the incoming radiation, the emissivity of the substrate is a function of the wavelength distribution of the incident light. Therefore, in order to obtain the most predictive result, the spectral characteristics of the light from the heat gun 130 should be similar to that of the illuminator 104. If the illuminator 104 is a blackbody source, then the heat gun 130 should likewise best be a blackbody radiant source of roughly the same color temperature. If the illuminator is a monochromatic source of radiation (e.g. a laser diode), then the heat gun should be a monochromatic source of similar wavelength. Some amount of difference in the spectrum of light from the illuminator 104 and the heat gun 130 is generally acceptable, assuming that the emissivity of the substrate 94 is not highly dependent on wavelength over the spectral interval of irradiation. Alternatively, if the ratio of emissivity of different wavelengths is known, and is relatively constant, then the absorbance of the heat from the heat gun relative to the illuminator 104 can be adjusted. The emissivity is also a function of the angle of incidence of radiation, and therefore, to the extent possible, the angle of incidence from the heat gun 130 should approximate that of the illuminator 104.

The amount of energy coming from the heat gun can be either large or small, although the larger the amount of energy, the more accurate the computation of β. Also, the larger the amount of energy coming from the heat gun 130, the less additional energy that would need to be applied by the illuminator 104. Consider a very small heat gun 130. In this case, the uncertainty in β will be large, and the illuminator will need to supply very large amounts of heat. Given the uncertainty in β, the illuminator may supply too much or too little heat.

In many cases, the heat gun 130 can be conveniently replaced by a second illuminator, which may be called a first-stage heater, that supplies roughly half of the heat required to get the substrate 94 to the desired temperature (although other fractions of the total heat energy may also prove useful). Because the pre-stage illuminator and the final illuminator 104 are roughly of the same energy output, they will generally satisfy the previous requirements of the similar topology and similar spectral characteristics for the heat gun 130 and the illuminator 104, as previously mentioned. Furthermore, because the substrate is raised to a relatively high temperature, the value of β can be measured relatively accurately. Finally, because the amount of additional energy needed to be supplied by the illuminator 104 is smaller, it will need to vary its output by a smaller amount with changes in the substrate 94, which should be easier to implement in many cases.

Hybrid Open-Loop/Closed-Loop Control

Previous embodiments have shown either distinctly closed-loop feedback or open-loop control. It is also possible to combine the two control systems. This is shown in FIG. 20, which has been previously discussed. In this figure, the heat sensor 96 that is used prominently in closed-loop feedback is optionally included. This heat sensor 96 provides feedback to the system about the success of the open-loop control system. This controls for factors affecting the heating of the substrate 94 that may be poorly controlled by use of the open-loop system. For example, mild heating of the substrate 94 from the heat gun 130 may not cause discoloring of the substrate 94 surface or explosive dehydration of the substrate 94 as might occur with much more massive heating from the illuminator 104. Thus, the feedback provided by the heat sensor 96 would allow second-order adjustments to be made to β to more accurately control the final temperature of the substrate 94.

One direct method of implementing hybrid control is to create a lookup table of responses from the primary heat sensor 128 versus the final temperature reached by the substrate as indicated by the feedback heat sensor 96. Thus, as final temperatures are read by the heat sensor 96, they are matched with the primary heat sensor 128 responses that generated them, teaching the system how to respond to given measurements from the primary heat sensor 128. Because the relationship between the two temperatures will vary somewhat with time (e.g. as the source of the substrate 94 changes), new relationships encountered by the system would update old values in the lookup table.

Response Systems—Multiple Lamps

The previous discussion has focused on the control systems that determine the amount of radiant light needed to bring the substrate 94 to a desired temperature. These control systems must also be integrated in with appropriate response systems, either electrical or mechanical, to put the control commands into effect. The control information may come in a number of different forms.

In many applications, material throughput may exceed the amount of light available from a single radiant heat source. When multiple lamps are present, heating control may be set by either adjusting the amount of light available from all sources in concert with one another, or by controlling the number of lamps that are functioning. The present invention will in general perform better, especially in the case where heat is applied to the substrate 94 before the material 26 is deposited, when the heat is applied in as close time proximity as possible before material 26 is applied. The reason for this is that heat applied to the substrate 94 may dissipate, either by blackbody radiation or conduction, if the heat is applied well before the material 26. Thus, if multiple lamps are present, it is preferable for the lamp closest to the point of material application to be fully activated.

Figure 22:
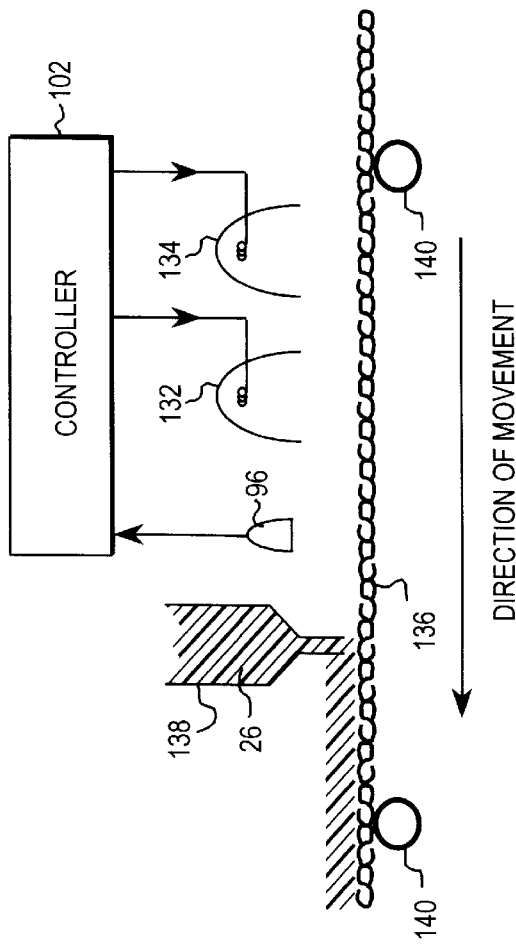
FIG. 22 is a schematic of a web-coating process that uses multiple heating sources according to the methods of the present invention.

FIG. 22 is a schematic of a web-coating process that uses multiple heating sources. The web substrate 136 is supported on two rollers 140. Extrudable material 26 is applied from a web-extruder 138. Before the material 26 is applied to the substrate 136, the substrate 136 is heated by a pair of lamps comprising a variable lamp 134 and a main lamp 132. The method of operation is to apply full heat with the main lamp 132, while to maintain lower and variable amounts of power output through the variable lamp 134, in response to control signals from the controller 102, which responds to input signals from the heat sensor 96, such as in a closed-loop feedback system. The variable lamp 134 acts as a pre-heater to raise the base temperature of the substrate 136, while the largest increase in temperature occurs from the main lamp 132. It should be noted that the use of multiple heat sources is not limited to web-coating processes, and may be used with linear as well as areal deposition processes.

The advantages of this system of process heating are numerous. As stated above, heat losses from the substrate 136 are minimized, particularly since the substrate 136 heated by the variable lamp 134 will be at a lower temperature, and thus less likely to suffer significant heat loss through radiation or conduction. Furthermore, if the temperature of the substrate 136 is raised sufficiently by the lamps 132 and 134, the substrate 136 may undergo pyrolysis, oxidation, or melting prior to the deposition of the material 26, which will halt these processes (either by removal of oxygen from the atmosphere, and/or by removal of heat by conduction to the relatively cooler material 26). Thus, the less time between the main heating and the deposition of the material 26, the less degradation the substrate 136 is likely to incur. In addition, and very importantly from the standpoint of a practical commercial process, if there are a multiplicity of lamps in a series, if one lamp should fail, the other lamps may be able to compensate for the loss of heat from the failed lamp, allowing the process to continue without interruption.

Response Systems—Movable Reflectors

In response to commands from the controller 102, illumination systems should be able to rapidly change the amount of heat emitted. While this is easily accomplished with certain filament-based systems (e.g. infrared halogen lamps) which have very rapid response times, other systems are not capable of such rapid responses. An example of this is ceramic heaters, which are characterized by a large heat mass and thus a long response time (tens of seconds or more). Ceramic heaters have certain favorable properties that might make them otherwise attractive to use in certain situations.

FIGS. 23a and 23b show cross-sections of a ceramic heater 142 used in conjunction with a movable trough reflector 144. In FIG. 23a, the ceramic heater 142 is placed at a point in the movable reflector 144, which may conveniently have a cross-section that is substantially in the shape of an ellipse, such that raypaths of radiant light emanating from the ceramic heater 142 converge in a small area on a substrate 94 which is placed roughly at the other focus of the ellipse forming the movable reflector 144. A collection of three raypaths 146 are shown for discussion purposes. It should be noted that for purposes of this discussion, the longitudinal axis of the movable trough reflector 144 is considered to be aligned in the direction of substrate 94 movement, so that the substrate 94 is heated along a line, and the material 26 is deposited in a small, narrow bead. Thus, in the figure, the movement of the substrate is perpendicular to the displayed cross-section.

When the controller for the apparatus receives information from a heat sensor that the substrate 94 is hotter than desired, the heat capacity of the heater 142 prohibits the rapid adjustment of heat output from the heater 142. Instead, the reflector 144 is moved up or down, so that the vertical position of the heater 142 relative to the movable reflector 144 is changed. In this case, the heater 142 position with respect to the focus of the ellipse comprising the cross-section of the movable reflector 144 is changed, so that the raypaths no longer focus as well as in the original movable reflector 144 position. FIG. 23b indicates the new raypaths corresponding to the raypaths in FIG. 23a, showing that they do not collect in as small an area. Because the raypaths are distributed over a wider area, the heating power density on the substrate 94 is less. It is important to note that the distance that the movable reflector 144 needs to be moved in order to substantially alter the heating power density on the substrate 94 may be very small, on the order of millimeters for a reflector 2 to 10 centimeters in diameter. This embodiment using a movable reflector 144 is not limited to any particular form of heating lamp, and may also be used with other lamps other than ceramic lamps. Furthermore, the shape of the reflector 144 may be other than that of an ellipse, and may conveniently be of a variety of different cross-sections.

An alternative embodiment of the present invention utilizing a different form of movement of movable reflectors is shown in FIG. 24a and FIG. 24b. As in FIG. 23a, a ceramic heater 142 is placed within a reflector, in this case an adjustable reflector 148, which has a pivot point 150 at or near to the center of symmetry through the cross-section. The arms of the reflector 148 move about the pivot point, and can thereby form a variety of cross-sectional shapes, of which two are shown in FIGS. 24a and 24b. Different reflector shapes will provide different distributions of heat energy on the substrate 94 surface, altering the temperature to which the substrate 94 will rise.

Movement of the reflector, either the movable reflector 144 or the adjustable reflector 148, can be accomplished by a variety of means well known within the art. Such means include servo-motors and stepper motors, and may include electromechanical means, employing electromagnetics with feedback mechanisms. It should be appreciated that the precise effect of reflector movement or adjustment need not be known a priori, since feedback mechanisms described earlier in the patent will allow precise control of the substrate 94 heating as long as the rough functional relationship between the heating and the movement or adjustment is relatively smooth and monotonic.

Movement or adjustment of the reflectors 144 and 148 may have other beneficial effects. For instance, when the width of the material 26 bead is changed, perhaps for a different application, it may be desirable to also change the width of the heating distribution on the substrate 94. One way to accomplish this is to change fixed reflectors and lamps to provide a new heat distribution. This may not be convenient, however, either due to the large number of reflectors that might therefore be necessary to accommodate a wide variety of applications, or because applications may change frequently, requiring the production line to be shut down in order to change the reflector. An alternative is to have either the moveable reflector 144 or the adjustable reflector 148 that can change the effective heat distribution.

Figure 25:
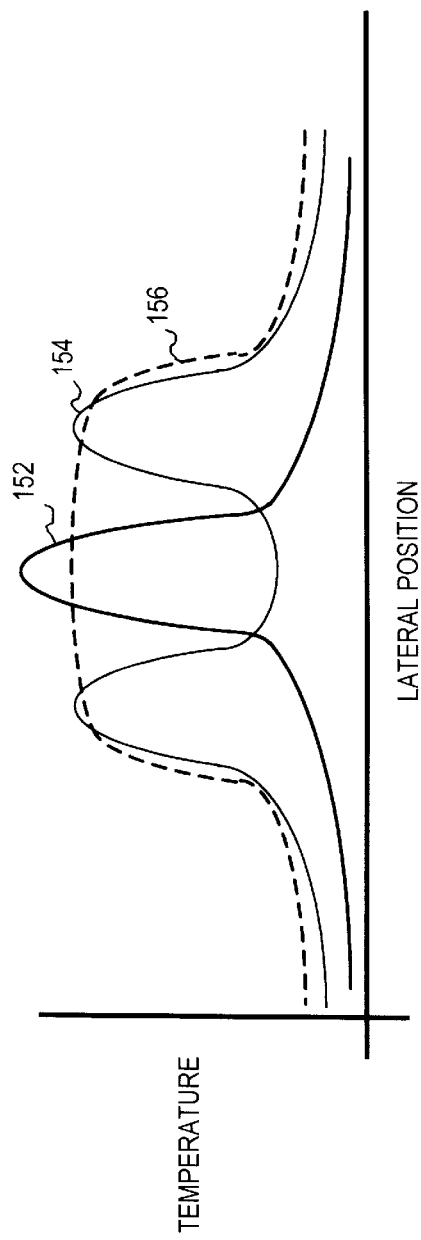
FIG. 25 is a graph of the spatial temperature distributions on the substrate surface resulting from differing heights of reflectors above the substrate.

It should be noted that reflectors that both move and adjust are within the scope of the present invention. In addition, instead of or in addition to the movement or adjustment of the reflectors 144 and 148, the heating element (e.g. the ceramic heater 142, or an infrared halogen lamp) may also be movable, either in relation to the substrate 94, with respect to the reflectors 144 or 148, or both. Furthermore, it may be convenient to "tilt" the movable reflector 144 along its longitudinal axis, so that this axis is no longer parallel to the substrate 94 surface. FIG. 25 presents temperature distributions on the substrate 94 representative of different heights or orientations of the movable reflector 144. A first temperature distribution 152 produces a very sharp peak, while a second temperature distribution 154, corresponding to a different illuminator 144 height, produces a bimodal distribution. The bimodal distribution might represent the divergence of two beam concentrations that normally converge on the substrate 94. By tilting the movable reflector 144 between the two heights yielding the temperature distributions 152 and 154, the values will approximately average, yielding a temperature distribution 156, which because of its relative uniformity will be far preferable to either of the pure distributions 152 and 154.

Figure 26A:
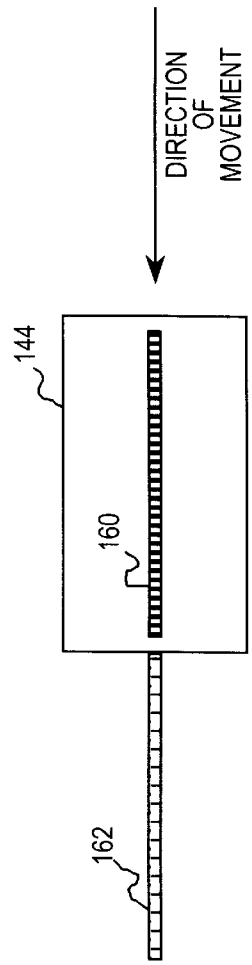
FIG. 26a and FIG. 26b are top-view schematics in which the reflector is swiveled with respect to the direction of substrate movement.
Figure 26B:
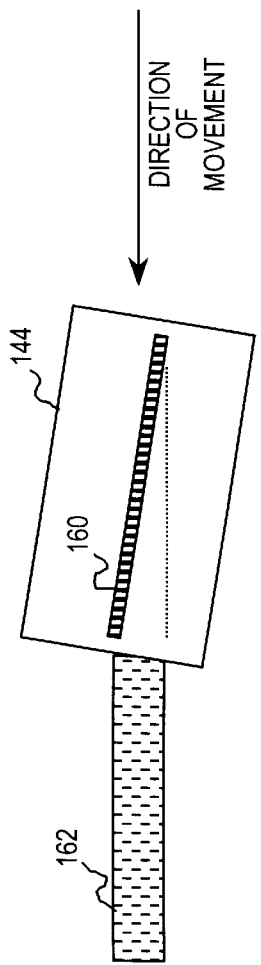

Instead of tilting the reflector 144, the reflector 144 may be swiveled so that its longitudinal axis is no longer in the direction of substrate 94 movement. Thus, if the temperature distribution on the substrate 94 is similar to that of temperature distribution 152—that is, very narrow—and a wider heated area on the substrate 94 is desired, by swiveling the movable reflector 144, a wider heat distribution may be attained. FIG. 26a and FIG. 26b are top-view schematics depicting the use of reflector swiveling. In FIG. 26a, the movable reflector 144 is oriented with its longitudinal axis along the direction of substrate movement indicated by the arrow to the right. The illuminator, of which reflector 144 is a part, causes a narrow heated region 160 on the substrate. Because the lamp that is part of the illuminator is aligned with the movable reflector 144, the heated region 160 is likewise so aligned. A prior heated region 162, extending beyond the movable reflector 144, indicates that the complete width of the prior heated region 162, which will interact with the material 26 so as to enhance the material 26 adhesion, will be roughly the same width as the heated region 160. In FIG. 26b, however, the reflector 144 is swiveled with respect to the direction of substrate 94 movement, and therefore the heated region 160 is likewise not aligned with respect to the substrate 94 movement. The prior heated region 162, instead of being the same width as the heated region 160, is now much broader. By swiveling the movable reflector 144 various amounts, the width of the prior heated region 162 can be adjusted to fit the material 26 application.

It is within the spirit of the present invention that tilting and swiveling may both involve the reflector alone, or both the reflector and the heating element contained within the reflector. In fact, any change in the position, orientation, or shape of the movable reflector 144 that has an effect on the temperature distribution on the substrate 94 is of potential benefit. The important implementation issue is to learn how to make use of the wide variety of possible reflector configurations to create an optimal temperature profile on the substrate. As will be discussed in the next section, calibration of the control response system is an integral part of making use of the various reflector configurations.

Calibrating Control Response Systems

The usefulness of control response systems is dependent on their ability to be calibrated. Thus, the system should be able to determine how the temperature distribution on the substrate 94 will be affected by changing the shape, position or orientation of the reflector 144 (for purposes of this discussion, the movable reflector 144 will be assumed to have the additional capability of changing its shape in the manner of the adjustable reflector 148). This discussion will consider two cases separately—when only one or two characteristics of the reflector are altered, or when many characteristics are altered.

Varying only one characteristic, if the temperature response is smooth and monotonic, a straightforward feedback system may be employed. In order to determine how to adjust the shape or position of the reflector, an imaging array such as the thermal camera 116 can determine the distribution of temperature and heat on the substrate, and by feedback mechanisms similar to those described in previous sections, properly adjust the shape or position of the movable or adjustable reflector 144 or 148. Thus, using the arrangement of the thermal camera 116 in FIG. 18a, a feedback mechanism may be used not only to control the overall temperature of the substrate, but also to control the lateral distribution of heat, providing proper width and uniformity of heat.

It should be appreciated that there are potentially many degrees of freedom in such a feedback system, where the reflector 148 shape may be altered around a pivot point 150, the movable reflector 144 may be vertically moved relative to the heating element, the substrate 94 or both, the reflector 144 may be tilted with respect to the horizontal axis, or the reflector 144 may be swiveled about the axis of substrate 94 motion, or any combination of the above and other parameters may be performed. With this many degrees of freedom, or where the response of the system is not smooth or is non-monotonic, feedback systems may have difficulty properly adjusting, since the different movements and shape adjustments may interfere or work contrary to one another. Furthermore, the system may need to adjust its output in response to control signals, and with many degrees of freedom, the system would need to explore a vast number of alternatives in order to find the optimal combination of reflector shapes, positions and orientations. It is possible that an open loop system could employ a ray-tracing program that could predict the temperature distribution on the substrate 94 that would result from a particular set of reflector parameters. This method is complicated, however, by the difficulty of robustly performing the large amount of ray tracing necessary to determine the output temperature distribution on the substrate 94 by varying the many different possible parameters.

There are a number of solutions to the problem of multiple degrees of freedom. Firstly, the degrees of freedom may be restricted by allowing only certain types of movements or limiting the range of possible movements. For example, it might be determined by experimentation that the vertical movement of the reflector 144 might be limited to within a very limited range of motion, perhaps only a few millimeters. This limitation reduces the number of potential movable reflector 144 states that can be examined by the feedback system. Secondly, in a calibration stage of operation, a very large number of different movable reflector 144 arrangements may be tried and the results monitored by an thermal camera 116. These results can be stored in a computer memory, and the configuration of the reflector 144 that gives an output most similar to the desired output may be arranged. Thirdly, an optimization program can be run for any set of desired temperature distributions on the substrate 94. Many conventional gradient descent optimizations capable of handling large dimensional optimization problems will easily tackle a problem of this complexity. The optimization may be carried out on various desired temperature distributions, and the results stored for later configuration on demand. This storage could comprise either a lookup table, or fitting the results to a multi-dimensional equation. Optimization has the advantage that it can efficiently search through the large range of possible configurations that occurs given a larger number of parameters. Fourthly, various neural network software programs can be used to learn the responses of the system, and thereby help to predict the outcome of any set of apparatus configurations. For example, in a back-propagation network including hidden nodes, the apparatus configurations (swivel, tilt, pivot, vertical movement, etc.) can be used as input nodes, and the temperature distribution (width, lateral variance) as the output nodes. By performing many tests, the back-propagation network should quickly learn the responses of the system.

FIG. 27 is a flow diagram of a system for calibrating the control response that uses gradient descent optimization for calibration. In a step 164, an evaluation function 180 is established. The evaluation function 180 should be, for purposes of optimization, a single number that expresses the "goodness" of a substrate 94 temperature distribution. The input to the function 180 will generally be the temperatures measured at specific lateral positions across the irradiated substrate 94. This number output from the function might be, for example, the variance of the temperature laterally across the substrate 94, or the total power on the substrate 94. Often, it is useful to combine more than one characteristic in the evaluation function 180, such as the product or sum of the variance of the temperature laterally and the total power on the substrate 94. In a step 166, an initial movable reflector 144 configuration is chosen. This configuration will generally be a configuration that is known to be a good configuration, determined by a previous optimization, although almost any valid configuration can serve as an initial configuration. In a step 168, the substrate is heated according to the reflector configuration chosen in the step 166. In a step 170, the temperature distribution on the substrate 94 resultant from the chosen movable reflector 144 configuration is measured, generally from a camera 116 with spatial resolution, although discrete temperature sensing elements not part of an imaging system may also be used. The temperatures measured in the step 170 are input to the evaluation function 180 in a step 172. In determining step 174, the resultant output value from the evaluation function 180 is compared with a termination threshold that tells whether the value of the function 180 is within a desired range. For example, if the evaluation function 180 is the variance of the temperatures laterally across the substrate, when the variance drops below a predetermined termination threshold, the current movable reflector 144 configuration is deemed "good enough." In a storing step 178, this movable reflector 144 configuration is then stored for later retrieval during operation. For example, if the optimization was run to determine the best means for making a laterally uniform region 5 mm wide on the substrate 94, and the material application system changes from depositing a 7 mm wide bead to a 5 mm wide bead, the optimum configuration for depositing a 5 mm wide bead can be retrieved from memory, and the movable reflector 144 can be made to conform with this configuration.

If the output value of the evaluation function 180 is not within the termination threshold, then the input movable reflector 144 configuration and the results of the evaluation function 180 are provided to the optimization routine in a determining step 176, which, in conjunction with the history of trials previously performed, determines a new reflector configuration to analyze. There are many methods for choosing the new reflector 144 configuration, many being in the class of gradient descent methods, which include secant methods for general optimization and the conjugate gradient technique preferable for optimizations with many parameters. Global optimization routines may be employed if the evaluation function has many local minima. A useful reference for numerical techniques in optimization is "Numerical Methods for Unconstrained Optimization and Nonlinear Equations" by Dennis and Schnabel (1983).

The calibration of the control response system is accurate as long as the movable reflector 144, the filament 100 and the electromechanical system that produces changes in the position, orientation and shape of the reflector 144 are unchanged. For example, smudges on the inside surface of the mirror which interfere with the reflection of heat radiation will alter the heat distribution on the substrate 94, as would errors in the sensors that position the movable reflector 144. Thus, in an operational system, it will be valuable to have a feedback system such as shown in FIG. 18a, which can monitor the heat distribution on the substrate 94 to ensure that it matches the desired distribution.

Overview of Mechanics of Sinuous Deposition

In sinuous deposition of extrudable material where the substrate is heated to enhance penetration of the extrudable material into the substrate, a significant problem is encountered when the point of heat application and the point of material deposition are spaced apart. FIG. 28a is a top-view schematic diagram of sinuous deposition in which the heat application point and the extrudable material deposition point are so separated, and the substrate movement is linear. A substrate 204 is flat along the surface moving from right to left in the line of substrate movement 198. At a point of light application 190, the substrate 204 is irradiated within a circular spot, although the spot of irradiation may also be an ellipse, square, rectangle, or other shape. As the substrate 204 moves along the line of substrate movement 198, it produces a line of heated substrate 192. This heated substrate 192 encounters a point of material application 194, in this case also shown as a circular spot, but without restriction may also be an ellipse, square, rectangle or other shape. Extrudable material is deposited on the heated substrate 192, and with the movement of the substrate 204, creates a line of deposited material 196. As can be seen, all of the points on which the substrate 204 is being acted fall on a single line, and given that this line is parallel to the line of substrate movement 198, the extrudable material will be deposited onto the heated substrate 192.

In general, the energy used in irradiating the substrate 204 will be in the electromagnetic energy spectrum in the range from the visible through the far infrared, although other wavelengths (e.g. UV or shorter) may in certain cases be either the primary energy emitted by the illuminator, or at least a large fraction of the energy radiated (e.g. in high temperature blackbody radiation). For purposes of the following discussion, the energy emanating from the illuminator will be described generically as light. Furthermore, the source of light may be an electrically-energized filament, a resistively-heated ceramic bar, an arc lamp, a diode laser or any other rod or gas laser, or other source as may be effectively used to heat the substrate 204 at a distance.

FIG. 28*b* is a top-view schematic diagram of sinuous deposition in which the substrate 204 is pivoting about a pivot point 206. In this case, the pivot point 206 is not located on the substrate 204, but this point 206 may without loss of generality be located on the substrate 204. The point of light application 190 and the point of material application 194, it should be noted, are determined by the position, orientation and other characteristics of the apparatus, such as the location of the tip of the material application nozzle, and in this case are situated similarly to that depicted in FIG. 28*a*. Moving about the pivot point 206, a point on the substrate 204 describes a circular arc. In this case, the point of light application 190 and the point of material application 194 are not equidistant from the pivot point 206, and so the arcs they describe will be of different radii. The point of light application 190 follows along the curve 202, whereas the point of material application 194 follows along the curve 200. As can be seen, this causes the heated substrate 192 and the deposited material to form circular arcs. Importantly, the point of material application 194 does not overlap the heated substrate 192, meaning that the bonding of the material to the substrate 204 does not benefit from the effects of the heating the substrate.

The present invention ensures that material is deposited on substrate already heated. For cases where the substrate heating is performed subsequent to material deposition, the present invention similarly ensures that substrate is heated on which material has been deposited. These methods consistently create strong bonding of material to the substrate in applications in which the point of material application is not a straight line.

In order to ensure that the points of material application 194 and the heated substrate 192 overlap, there are two preferred methods. In the first method, the point of light application 190 is made very large relative to the point of material application 194. The point of material application 194 is limited to the size of the bead of material laid on the substrate 204, but the size of the point of light application 190 is large enough to encompass the most extreme relative movement of the point of material application 194. In a second method of the present invention, the points of material application 194 and light application 190 can move relative to one another under control of a digital processor, responding to changes in the line of substrate movement. The present invention provides supporting methods that both determine changes in substrate movement and respond to movements that have been detected.

Areal Extent of Light Application

FIG. 29 is a top-view schematic diagram of a sinuous deposition apparatus in which the light application location is of a fixed, elongated length. The apparatus configuration is similar to that of FIG. 28*b*, except that the point of light application 190 is replaced with a region of light application 208 which is elongated in the direction perpendicular to the primary direction of substrate movement 198. It is assumed that while sinuous deposition is permitted in this arrangement, the substrate 204 will primarily move in one direction defined by the line connecting the center of the point of material application 194 and the region of light application 208. As can be seen, the region of the heated substrate 192 is quite extensive, and is so large as to encompass the point of material application 194, ensuring good material bonding to the substrate 204.

This method does not require sophisticated controls, but has a number of disadvantages that might interfere with its implementation in certain applications. Of the region of heated substrate 192, only a small fraction of the area is ever used in bonding, and so a large fraction of the heat applied to the substrate at the region of light application 208 is wasted, resulting in substantial energy losses. Furthermore, because the substrate is constrained to move primarily in the direction of the line 198, certain application topologies will not be allowed, including reversal of the substrate 204 motion.

In order to determine the linear extent of the region of light application 208, it is assumed that non-linear substrate 204 movements begin with the point of material application 194 being situated on the primary movement line 198, and that movement will be in a circular arc about the pivot point 206. FIG. 30 is a schematic diagram describing this arrangement. It can be shown that if the distance between the point of material application 194 and the region of light application 208 in the direction of substrate motion is D, and the vertical dimension of the region of light application 208 is L, then the allowed radius of movement R is given by the equation $$R = \frac{L^2 + 4D^2}{4L} \tag{12}$$

Given anticipated radii of curvature for the substrate 204 movement, this equation determines the size of the region of light application 208 that must be provided to ensure that the extrudable material is tightly bonded to the substrate. As this equation indicates, for a fixed length L, in order to allow for a minimum radius of movement R (i.e. highly sinuous motion), the distance D should be as small as possible, meaning that the point of material application 194 should be as close as possible to the region of light application 208.

Constant-Velocity Linear Substrate Movement

In certain industrial material deposition processes, the substrate will move at a constant rate in a fixed direction, and material will be deposited in a pattern on the substrate. This mode of deposition might be used, for example, to deposit material over a wide swath of substrate while limiting the amount of material (i.e. the material covers only a portion of the substrate), or to deposit the material in a way that the substrate can be extended without breaking the deposited material (i.e. to allow topological movement of the substrate).

Figure 31:
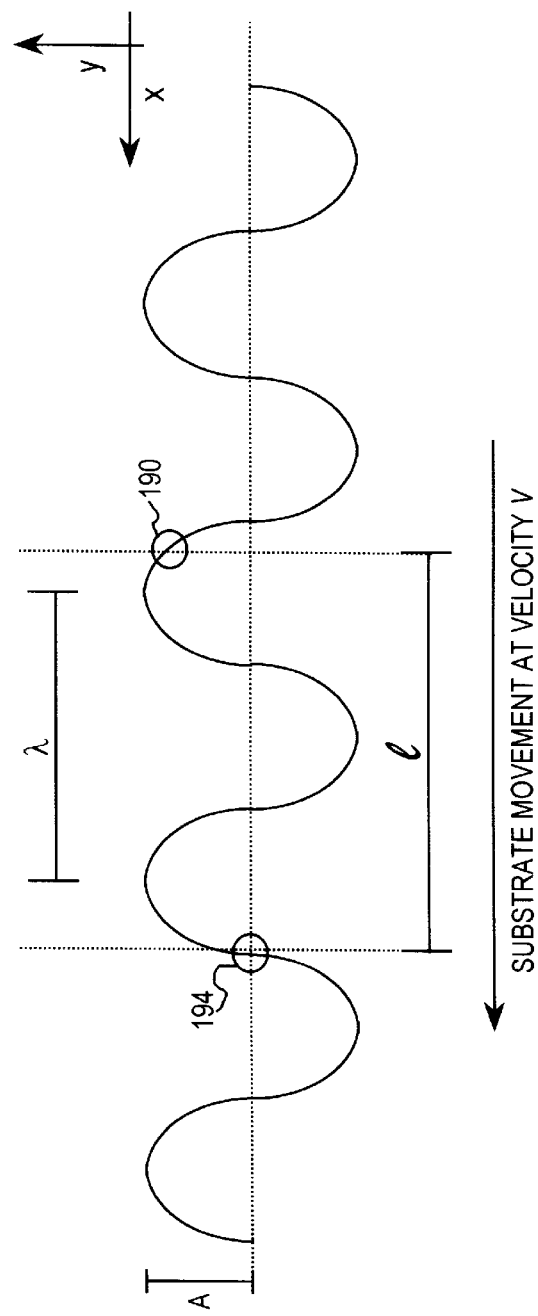
FIG. 31 is a top-view schematic of a deposition process where the substrate is moving at a constant velocity in a fixed direction, and the material is being deposited in a sinusoidal fashion on the substrate.

FIG. 31 is a top-view schematic of a deposition process where the substrate is moving at a constant velocity in a fixed direction, and the material is being deposited in a sinusoidal fashion on the substrate. The y-direction position ($y_d$) that the material deposition occurs at is given by $$y_d = A\sin\left(\frac{2\pi V}{\lambda}t\right) \tag{13}$$

where V is the x-direction velocity of the substrate, and 2A is the difference between the extremes of $y_d$ position, t is the time measured from an arbitrary time when the vertical position $y_d$ is 0, and $\lambda$ is the distance between successive repeats of the sinusoidal patterns (i.e. the wavelength). At a time when the point of material application 194 is located at position $y_d=0$, the point of light application 190 is located at a y-direction position of $$y_a = A\sin\left(\frac{2\pi V}{\lambda}\left(t - \frac{l}{V}\right)\right) \tag{14}$$

where $y_a$ is the vertical location of the light application point, and l is the distance between the horizontal location of the point of material application 194 and the point of light application 190. This demonstrates that the function of y position of the point of material application 194 and the point of light application 190 differ only by a phase difference, with the point of light application being at a more advanced phase position (i.e. in time, the substrate passes under this point 190 prior to the point of material application 194). From this example, it can be seen that if the y position of the point of material application 194 is $$h_d = f(t) \tag{15}$$

where $f$ is an arbitrary function, then the position of the point of light application 190 is $$y_a = f\left(t - \frac{l}{V}\right) \tag{16}$$

By using this equation, the relative motion of the position of the point of material application 194 and the point of light application 190 can be precisely coordinated.

It should be noted, however, that the amount of heat placed onto the substrate will be different depending on the rate of y-direction movement of the point of light application 190. The effectiveness of heating the substrate depends on the temperature that the substrate achieves, and this temperature is roughly linearly related to the amount of heat deposited on the substrate. Thus, it is important to control the light output to ensure that roughly equal amounts of radiant light energy are applied to all parts of the substrate on which material will be deposited. Consider two different scenarios. In the first, the point of light application 190 does not move in the y direction. The heat from the light source will be spread over a line the width of the point of light application 190. In a second case, consider that the light moves very rapidly along the y dimension, "painting" a wide swath with heat, and the heat is spread over a much larger area. Because the substrate is moving at a relatively constant speed, this means that the temperature that the substrate reaches will be far higher in the first case than the second.

Figure 32:
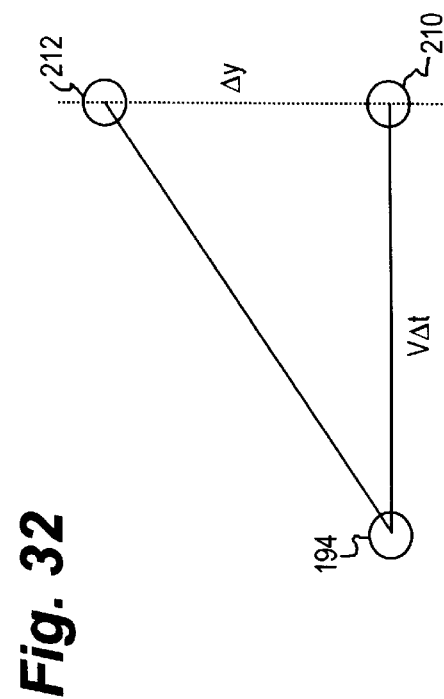
FIG. 32 presents a schematic in which traces of the point of light application with differing movement of the light source are shown.

In order to compensate for this effect, the amount of heat emitted by the radiant source must vary in some way with the y-direction movement of the point of light application 190. FIG. 32 presents a schematic in which traces of the points of light application 212 and 210 with differing movement of the light source are shown overlapping on the same diagram. The point of material application 194 is connected with two possible locations for the position of the light application. A point of fixed light application 210 represents the situation where the y-direction position of the light application does not change. A moving point of light application 212 represents the situation where the y-direction position of the light application changes by an amount $\Delta y$ from the time that a given point on the substrate passes from the moving point of light application 212 to the point of material application 194. The total length of substrate moving from the points 210 and 212 to the point of material application 194 involves the same time $\Delta t$ as it passes under the light source and therefore absorbs the same heat energy, but the total amount of substrate in the two cases is different. The length of substrate moving from the point 210 to the point of material application 194 is $V\Delta t$, where V is the horizontal velocity of the substrate, while the length of substrate from the point 212 to the point of material application 194 is $\sqrt{(V\Delta t)^2 + \Delta y^2}$. Taking the ratio R between the lengths traveled by the substrate from the point 212 to the distance traveled by the substrate from the point 210, both to the point of material application 194, yields:

$$R = \sqrt{1 + \frac{(\Delta y)^2}{(V\Delta t)^2}} \tag{17}$$

which for purposes of practical use, is more conveniently written as $$R = \sqrt{1 + \frac{1}{V^2}\left(\frac{\Delta y}{\Delta t}\right)^2} \tag{18}$$

The internal parameter $\Delta y/\Delta t$ is approximately the rate of movement in the y-direction, which will generally be available to the lighting system controller through its interaction with the motors or devices causing such y-direction movement. The ratio R indicates the factor by which the light source should be increased to maintain constant radiant heat onto the substrate. Thus, if the heat output of the light source is X watts for a constant y position for the point of light application 210, then the light output should be increased to XR when the light source is moving in the y direction. Knowledge of the maximum R that the system will encounter allows the system controller to reserve maximum light output power for those times when the light source is moving most rapidly.

It should be noted that while this method of control has been discussed with reference to an x-direction moving substrate, while the point of material application 194 and the point of light application move in the y direction, these methods more generally describe means of light output compensation simply in terms of the relative movements of the point of material application 194 and the point of light application. Measuring the movement of the light source relative to the substrate serves as a means of normalizing the amount of light output to maintain a constant temperature on the substrate.

It should also be noted that at the beginning and end of material application, movement in addition to that needed for material deposition may need to be included. For example, if the light application precedes material deposition, as in FIG. 31, the substrate must move through the point of light application 190 prior to the beginning of material deposition at the point 194. On the other hand, if the material deposition precedes light application, after material deposition has concluded, the substrate must continue to move through the point of light application 190. In this way, all substrate on which material is deposited will have undergone heating through the light application.

An apparatus capable of depositing material as indicated above may, for purposes of constant-velocity and linear substrate movement, involve the use of a material deposition system and light source which are mounted on independent linear tracks, in which the track movements are perpendicular to the direction of substrate movement. As before, the distance between the tracks will be minimized, so as to minimize the amount of relative movement necessary to handle material deposition that is in a curve or line very skewed from the direction of substrate movement. In both the material deposition system and the light source, the entire mechanisms may, but need not necessarily move on the tracks; only the final output means need be movable. For example, with the material deposition system, the storage means for heated extrudable material could be stationary, and be connected by a heated flexible tube to a movable apparatus containing a heated pump and nozzle which moves on the heretofore-mentioned track. By this means, the large mass of the extrudable material need not be moved and accelerated along the track, allowing for simpler transport mechanisms along the track.

Figure 33:
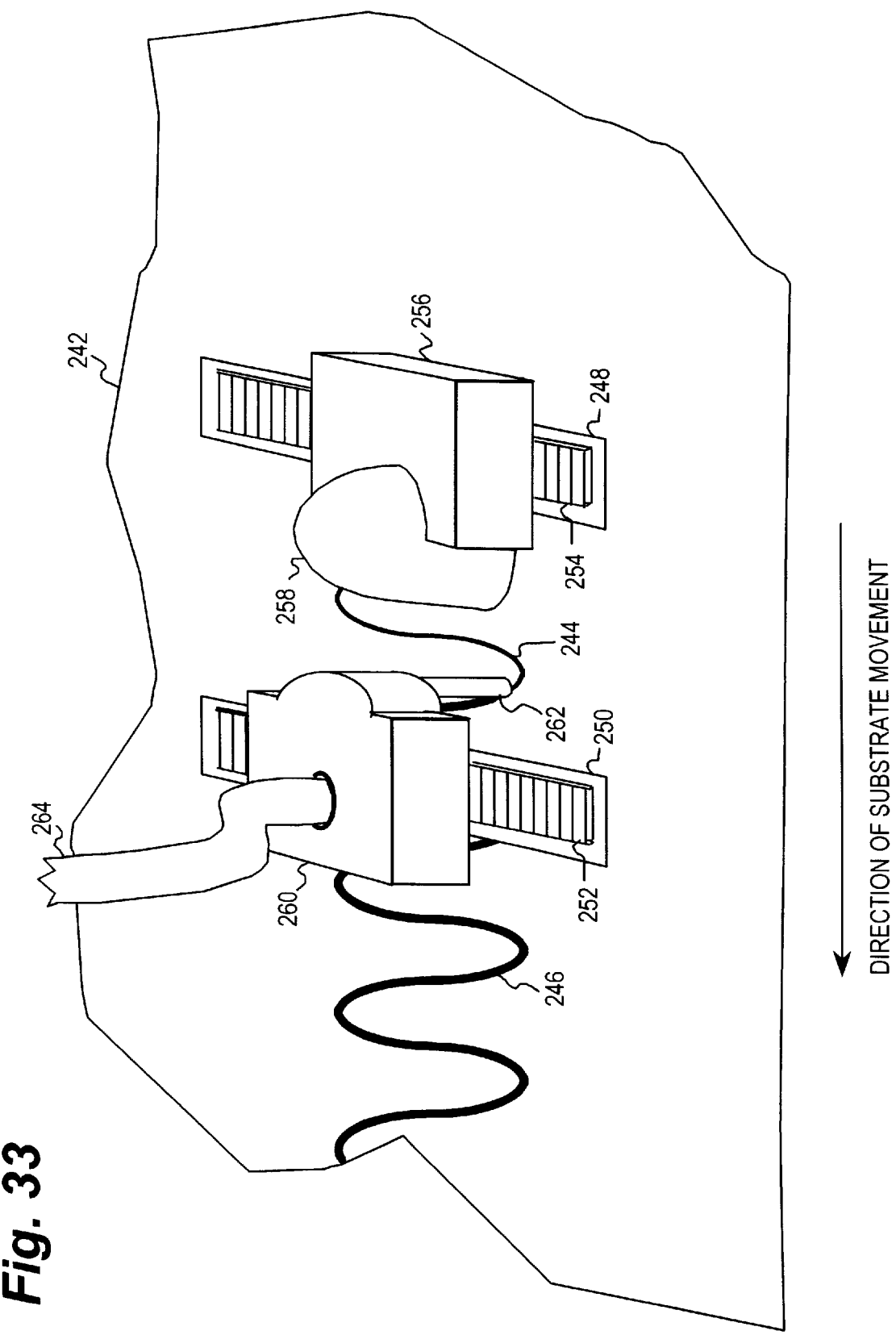
FIG. 33 is a perspective view of a dual linear track embodiment of the present invention.

FIG. 33 is a perspective view of one embodiment of such a dual linear track mechanism. A flat substrate 242 moves from right to left. A movable light source electronics assembly 256 moves on a suspended light support 248 on which a linear track 254 is laid. A reflector 258 is mounted on the electronics assembly 256, and contains a light source (not shown) which is focused onto the substrate 242. Under the influence of a controller (not shown), the movable electronics assembly 256 moves back and forth along the linear track 254 as the substrate 242 moves underneath, thereby causing a curved line of heated substrate 244 to be formed. By the movement of the substrate 242, the heated substrate 244 is caused to move to the longitudinal position of and underneath a material deposition device 260. The deposition device 260 is suspended over the substrate 242 on a deposition device support 250 on which lies a linear track 252 along which the device 260 moves back and forth. By algorithms and means previously described, a nozzle 262 of the deposition device 260 is coordinated to be just over the heated substrate 244, and lays down a bead of material 246. A hose 264 supplies material to the deposition device 260 for deposition, and the hose 264 may be heated in case the extruded material requires heating to maintain a working viscosity.

It should be noted that, within the spirit of the present invention, the reflector 258 may be replaced or coupled with any convenient electromagnetic energy source, including electrically-energized filaments, arc lamps, or lasers (including diode lasers).

Complex Substrate Movement

While the previous discussion involved relatively constant substrate movement, the process can be extended to more complex substrate movement. FIG. 34 is a perspective view of a sinuous deposition apparatus for bonding a shoe top 214 to a sole 215. A bead of adhesive 220 is deposited through a fixed deposition nozzle 218 extending from a deposition head 219. It is assumed that the shoe top 214 and sole 215 are moved by an apparatus (not shown) so that the fixed nozzle 218 is a roughly constant, predetermined distance from the shoe pieces, configured for bonding.

The shoe top 214 and the sole 215 adjacent to each other are heated by a laser diode array 222, which is affixed to a support platform 224, which may include supporting electronics, possibly including, for instance, cooling elements. The support platform 224 is attached to a positioning rod 226 that is used to place the laser diode array 222 in the proper place over the shoe substrates. The positioning rod 226 may also contain wires used to power the laser diode array 222, although limited space may require that these wires be attached to an external cable from a controller/power supply to the laser diode array 222.

The positioning rod 226 is inserted through a rotating pivot 228. The pivot 228 allows the rod 226 to rotate in a single direction roughly perpendicular to the flow of the adhesive bead 220. One means of accomplishing this is shown in FIG. 35a, which is a vertical cross-section through B–B' in FIG. 34. Inside the pivot case 229, the positioning rod 226 is inserted through a hole in a fixture 230. FIG. 35b, a vertical cross-section through C–C' in FIG. 34, and perpendicular to the cross-section in FIG. 35a, shows that the fixture 230 is constrained to rotate on bearings 232 and 234. The positioning rod 226 is further allowed to move vertically through the channel in the fixture 230, which may be facilitated either with lubricants or preferably with a self-lubricating or Teflon surface. The rotating pivot 228 is attached to the deposition head 219, so as to provide a fixed reference, allowing the precise placement of the laser diode array 222 relative to the nozzle 218.

The top of the positioning rod 226 is attached to a lateral positioner 230. The lateral positioner 230 moves the top of the rod 226 to precise locations back and forth perpendicular to the flow of the adhesive bead 220. As can be seen by the arrows in the upper and lower regions of the rod 226, as the positioner 230 moves the top of the rod in the direction of the sole 215 of the shoe, the pivot causes a movement of the laser diode array 222 in the opposite direction. The relative magnitudes of movement inside the positioner 230 and the laser diode array 222 is determined by the relative lengths of the rod 226 above and below the pivot 228, and will be adjusted so that the precision and rate of movement of the array 222 position is consistent with the precision and rate of movement of the top of the rod 226 within the positioner 230. Movement of the top of the rod may be accomplished with a number of different mechanisms, including stepper motors with gearing, or electromechanical devices such as are found in the head positioning mechanisms of floppy and hard disk drives.

The top of the rod 226 is fixed in the positioner 230, which itself may move vertically, and thereby move the laser diode array 222 also vertically in synchrony. The movement of the positioner 230 is vertical and relative to the deposition head 219, to which it is attached via a linear gearing mechanism (not shown) under the influence of a controllable motor (not shown). The positioner 230 may alternatively remain fixed in position relative to the deposition head 219, an internally move the rod 226 vertically, instead.

This arrangement allows two modes of motion for the laser diode array 222. The internal mechanism within the lateral positioner 230 moves the laser diode array 222 horizontally and in a direction perpendicular to the flow of adhesive bead 220, whereas vertical movement of the entire positioner 230 allows vertical movement of the array 222. This combination of movement will permit a complex series of motions of the shoe parts 214 and 215 relative to the fixed deposition nozzle 218.

It should be noted that the lateral movement of the rod 226 from the internal mechanism of the lateral positioner 230 does not cause precisely horizontal movement of the array 222, but rather radial movement around the pivot 228. This will generally not be of concern, if the positioning rod 226 is of sufficient length to minimize the vertical component of the radial movement. Alternatively, the vertical motion of the positioner 230 can be coordinated with lateral motion of the laser diode array 222 to lower the array 222 as the array is moved from the centerpoint, thereby maintaining the vertical position of the array 222.

In order to adjust for differential movement of the substrate with lateral movement, the equation (18) may be changed to account for motion not in simply the horizontal direction, but the vertical direction as well, yielding $$R = \sqrt{1 + \frac{1}{V^2}\left(\frac{\Delta y}{\Delta t}\right)^2 + \frac{1}{V^2}\left(\frac{\Delta z}{\Delta t}\right)^2} \quad (19)$$

where $\Delta z/\Delta t$ is the rate of change of vertical position. As before, the ratio R indicates the factor by which the light source should be increased relative to a reference amount to maintain constant radiant heat onto the substrate.

Figure 36:
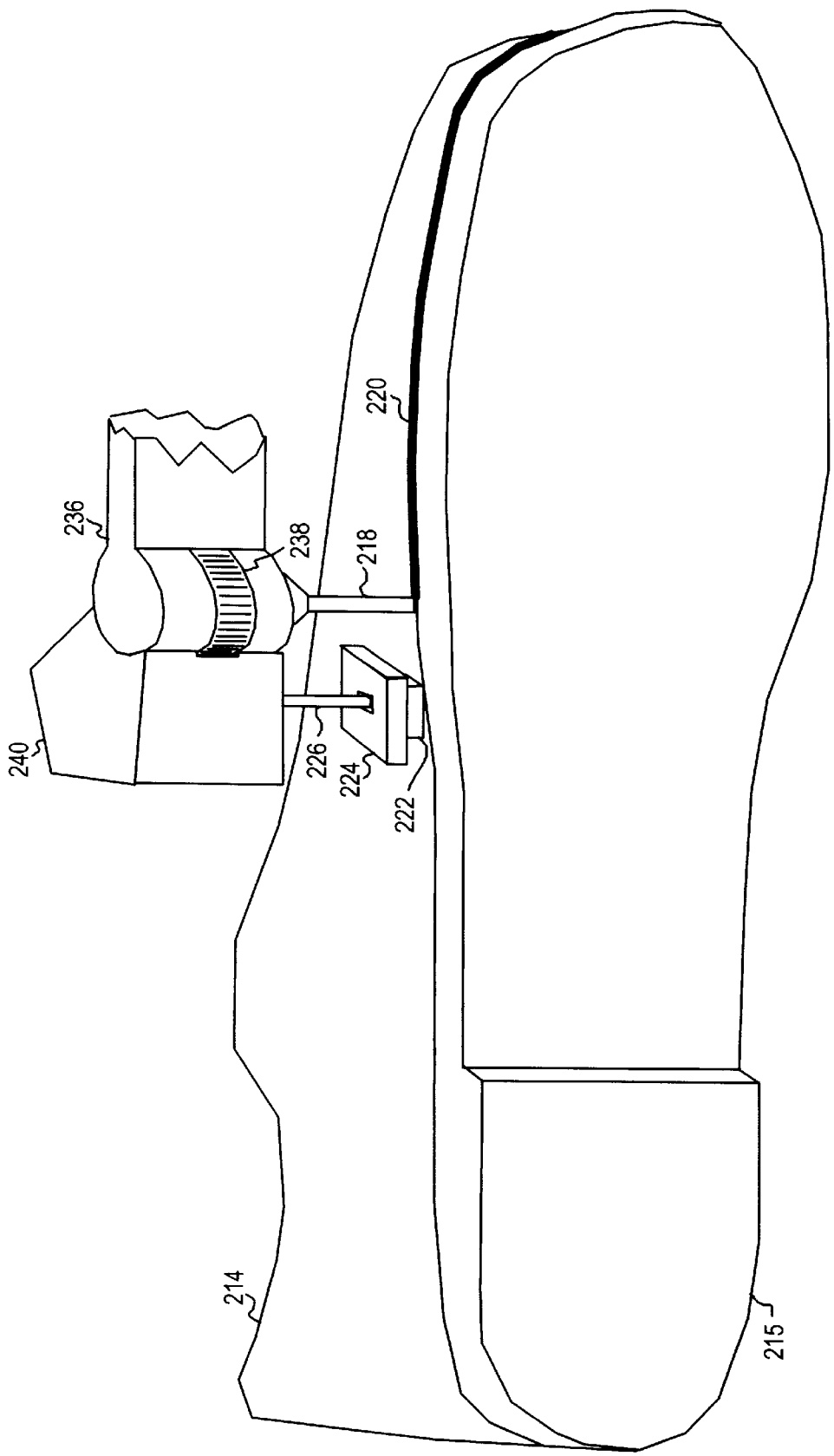
FIG. 36 is a perspective view of a sinuous deposition apparatus in which the light source rotates about the deposition nozzle.

An alternative arrangement is shown in FIG. 36, a perspective view of a sinuous bonding mechanism, similar to that of FIG. 34, but where the laser diode array 222 rotates in a circular motion around the deposition nozzle 218. In this embodiment, the distal aspect of a rounded deposition head 236 forms a circular cylinder with the nozzle 218 positioned roughly along the vertical, longitudinal axis. On the outside of the circular aspect of the rounded deposition head 236 is a gearing mechanism 238 to which a rotatable positioner 240 is attached and around which it moves. Similar to the embodiment described in FIG. 34, a positioning rod 226 descending from the rotatable positioner 240 is attached to the support platform 224 and laser diode array 222.

In this embodiment, the rotatable positioner 240 rotates about the rounded deposition head 236, maintaining a constant distance between the tip of the deposition nozzle 218 and the laser diode array 222. A stepper motor within the rotatable positioner 240, under the influence of a controller (both not shown), is used to position the positioner 240. Optionally, within the positioner 240 is another motor which adjusts the vertical height of the laser diode array 222 in relation to the tip of the deposition nozzle 218 and the substrates which are being bonded.

One advantage of this arrangement of light source relative to the deposition nozzle 218 is that because the light source maintains a fixed distance from the nozzle 218, the adjustment of the light intensity as a function of the direction of substrate movement is considerably less important. In fact, if the substrate can be approximated to move relatively directly from the point of light application under the light source to the point of material deposition under the nozzle 218, no or only small light intensity corrections need be made at all.

The use of the rotatable positioner 240, however, does not allow a simple functional relationship between the location of the point of material deposition and the point of light application as provided by equations (15) and (16). There may be multiple points a fixed distance between the point of material deposition and the point of light application with a given application pattern, so that the movement of the light source relative to the point of material deposition will in general be pre-determined and input to the process controller. For example, consider a high frequency, high-displacement sinusoidal deposition—a circular arc from the point of material deposition representing the possible locations of the point of light application might cross this curve multiple times. This difficulty, however, is substantially reduced by using a small distance between the point of material deposition and the point of light application, in which case there will usually be only a single possible location for the point of light application that is possible, thereby eliminating the ambiguity to the process controller.

The vertical movement of the positioning rod 226 of the apparatuses of FIG. 34 and FIG. 36 is required to maintain relatively constant radiant heat on the substrate when the vertical distance of the light source to the substrate changes the incident illumination energy density, such as when the light from the light source is focused or spreading. This would not be the case, for example, if the light from the heat source were relatively collimated as in a laser (e.g. a YAG laser).

An alternative to the physical positioning mechanism of FIG. 34 would be to adjust the heat/light output of the light source according to the distance between the light source and the substrate. An apparatus similar to that shown in FIG. 34 could be arranged without the gearing mechanism 232, with the laser diode array 222 located so that when the shoe components 214 and 215 were at the greatest vertical position, the laser diode array 222 would be at an acceptable working distance. The laser diode array 222 at this position would work at a low but acceptable rate of heating, and as the shoe components 214 and 215 moved away, the light output would increase so as to maintain the heat falling onto the shoe components 214 and 215. This would eliminate the need for the physical movement of the positioner 230, and would be suited for cases with relatively small vertical relief on the side of the substrate on which the extrudable material is deposited.

It is also possible for the movement of the shoe and the deposition of the adhesive bead 220 to be adjusted so that as the shoe components 214 and 215 are moved further from the diode array 222, the shoe moves slower, thereby increasing the total amount of heat deposited on a given location on the shoe. This form of control has the disadvantage that the adhesive deposition rates need also to be carefully controlled, and that the throughput of such an apparatus will be reduced.

It should also be appreciated that the apparatus of FIG. 33 may be altered to allow separate vertical movement of the light source and the deposition means. For example, the moveable electronics assembly 256 and the deposition device 260 may be able to move vertically independently of one another in order to adjust for changes in the height of the substrate 242. The coordination between the substrate 242, the movable assembly 256 and the deposition device 260 can be achieved similarly to the apparatuses presented in FIG. 34 and FIG. 36.

It is within the spirit of the present invention that many different arrangements of the components could be used to different purposes, including not only bonding but also coatings, and that the substrate may be many different industrial and commercial products. Many different light sources may be substituted for the laser diode array 222 of FIG. 34, including solid state and gas lasers, filament and arc lamps, and others. Furthermore, the light source itself does not need to be manipulated close to the substrate, but rather a focusing or light transport mechanism may be adjusted instead. For example, if the heat energy required for the production throughput can be contained within an optical fiber or fiber bundle, the fiber or fiber bundle may be manipulated rather than the light source itself. Alternatively, if the light source is a laser, steering mirrors may be used to direct the beam laterally along the path of the flow of adhesive bead 220.

It should be further noted that the arrangement could be straightforwardly modified to deal with a fixed light source and movable deposition means. In addition, it is within the spirit of the present invention to deal with both light application before material deposition, as well as material deposition before light application, with minimal alterations to the current embodiments.

It should be apparent to one skilled in the art that the above-mentioned embodiments are merely illustrations of a few of the many possible specific embodiments of the present invention. Numerous and varied other arrangements can be readily devised by those skilled in the art without departing from the spirit and scope of the invention.

Benefits and Advantages of Light-Mediated Material Application

The principles and designs of this invention have been reduced to practice using a simple device in the manner of FIG. 1 and alternatively with light irradiation of the substrate prior to material deposition. The substrates used were different woven and non-woven fabrics, leather, plastics (e.g. vinyl, ABS and acrylic), melamine (Formica), cardboard and wooden pieces, which were placed on an aluminum plate which was propelled by a variable speed motor along a linear track at a rate of 2 to 25 mm per second. Polyamide hot-melt adhesive 3379 from 3M Adhesive Systems of St. Paul, Minn. was used as the extrudable medium, and was deposited at 196° C. at a fixed point using a #9946 nozzle attached to a 3M Adhesive Systems bench-mounted Polygun II hot-melt adhesive applicator, pressurized to 80 pounds per square inch, and whose applicator trigger was variably set using a threaded-screw device that could be adjusted to provide an adhesive bead of approximate dimensions 3–6 mm wide and 2–4 mm in height. The light source used in illuminating the substrate was a 21 Volt General Electric EKE MR16 projector bulb mounted on a moveable holder, powered by a Techni-Quip Corporation (El Segundo, Calif.) T-Q/FOI-1 power supply. The EKE projector lamp includes an integrated ellipsoidal mirror, and the lamp was placed so that the substrate was at the approximate second focus of the ellipsoidal mirror. The dichroic coating of the lamp reflector (designed to pass infrared light through the reflector) was over-coated with pure evaporated aluminum on the inside surface so as to include the infrared energy in the focused light. A 5 mm-by-5 mm aperture was made with a metal casing to limit the area of light output, and in general, the lamp was placed so that the amount of light projected onto the fabric was contained within an approximately square-shaped spot approximately 7 mm on a side.

This test device was used to bond together, in the manner of FIG. 8, pieces of substrate which had been cut to provide complimentary linear edges, and the efficacy of the light-mediated application of the extrudable material was measured by the static strength of the resulting bond between the pieces of cut substrate. In certain cases, a small gap was maintained between the substrate pieces so that the adhesive and light energy were able to penetrate between the substrate pieces, in the manner of FIG. 9.

In the following tables, the resulting strength of bonds made with and without light are compared for various materials. In Table 1, the illuminating lamp was placed so that the substrate was heated approximately 1 cm after the deposition of the adhesive. In Table 2, the illuminating lamp was placed so that the substrate was heated 0.5–1.0 centimeter before the deposition of the adhesive.

TABLE I

Substrate Illumination After Adhesive Deposition

| Substrate | Average Illumination Energy Density (watts-sec/mm2) | Strength without Light (lb/inch) | Strength with Light (lb/inch) | Approximate Improvement |
|---|---|---|---|---|
| Darlexx (Pink) | 0.95 | 18.7 | 59.4 | 320% |
| Leather (Black) | 0.42 | <4.4–30.8 | 63.8 | >210% |
| Denim (Black, moderate weight) | 0.34 | <4.4 | 39.6 | >900% |
| Neoprene Wetsuit with Nylon Shell | 0.21 | 17.6 | 37.4 | 210% |
| Acetate Felt | 0.21 | <4.4 | 24.2 | >550% |
| Basswood (1/16" thick) | 0.95 | 12.7 | 57.2 | 450% |
| Birch Plywood (1/16" thick) | 0.95 | 9.5 | 81.4 | 860% |
| Cherry Wood (1/16" thick) | 0.95 | 27.5 | 61.6 | 230% |

TABLE 2

Substrate Illumination Before Adhesive Deposition

| Substrate | Average Illumination Energy Density (watts-sec/mm2) | Strength without Light (lb/inch) | Strength with Light (lb/inch) | Approximate Improvement |
|---|---|---|---|---|
| Darlexx (Pink) | 0.58 | 18.7 | 37.4 | 200% |
| Leather (Black) | 0.42 | <4.4–30.8 | 72.6 | >240% |
| Denim (Black, moderate weight) | 0.34 | <4.4 | 26.4 | >600% |
| Acetate Felt | 0.12 | <4.4 | 24.2 | >550% |
| Basswood (1/16" thick) | 0.95 | 12.7 | 52.8 | 420% |
| Birch Plywood (1/16" thick) | 0.95 | 9.5 | 72.6 | 760% |
| Cherry Wood (1/16" thick) | 0.95 | 27.5 | 44.0 | 160% |

It should be noted that on many of the materials, the bond strength varied considerably between different samples generated without light, but was much less variable in cases where light-mediated heating of the substrate was employed.

Figure 14:
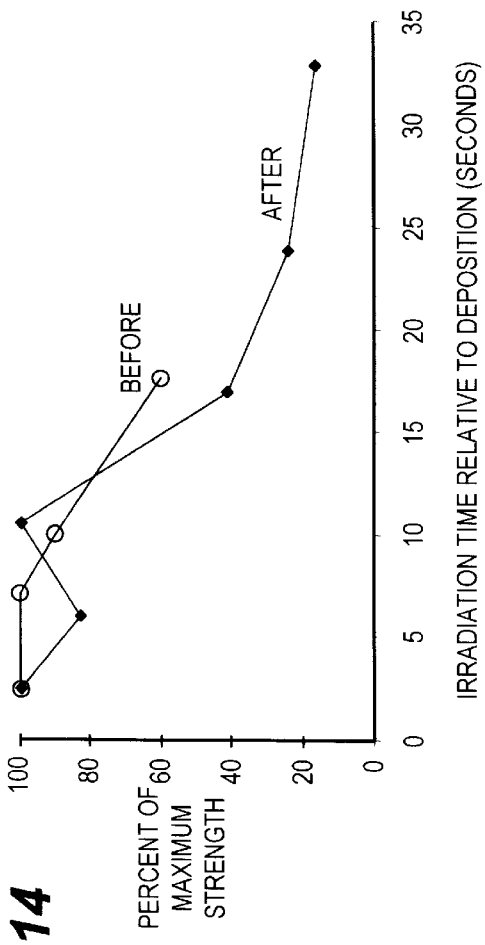
FIG. 14 is a graph of bond strength versus the time of irradiation relative to the deposition, using methods similar to that of FIG. 1 and FIG. 2.

Tests were also performed which varied the length of time between the illumination of the substrate and the deposition of the hot-melt adhesive, some of whose results are presented in FIG. 14, a graph of bond strength versus the time of irradiation relative to the deposition. As can be seen, when the illumination preceded adhesive deposition, there was a relatively rapid decrease in the strength of the bond with increasing time between the two steps. After approximately 17 seconds between the illumination and the deposition, approximately 60% of maximal bond strength remained. However, when the deposition preceded the illumination by a similar time lag, the bond strength remaining was 80% of that which was observed when the illumination immediately succeeded the deposition. However, after 33 seconds, the bond strength is only approximately 20% of that of the maximal bond strength. Thus, the time between irradiation and deposition steps needs to be carefully controlled in the process.

When the substrate is very heavily irradiated, it may be subjected to oxidation or pyrolysis. Table 3 below presents results for three substrates showing that excess irradiation can cause damage to the substrate and failure of the resulting bond. When the irradiation was increased, for example, less than a factor of two for Neoprene and Denim substrates, the resulting bond strength decreased dramatically. In these cases, visible charring of the substrate was observed, and bond failure within the substrate was observed. This result points out the need to carefully regulate the amount of irradiation on the substrate, such as through the methods herein described.

TABLE 3

Bond Failure from Heavy Illumination

| Substrate | Radiation as % at Max Strength | Strength as % at Max Strength |
|---|---|---|
| Neoprene Wetsuit with Nylon Shell | 0% | 53% |
|  | 100% | 100% |
|  | 195% | 67% |
| Acetate Felt | 0% | <9% |
|  | 100% | 100% |
|  | 408% | 39% |
| Denim (Black, moderate weight) | 0% | 0% |
|  | 100% | 100% |
|  | 191% | 17% |

It should be noted that the prior art applying extrudable materials to solid substrates involved the projection of light energy into the extrudable material, not to the substrate (e.g. U.S. Pat. No. 4,861,404 to Neff and U.S. Pat. No. 5,348,604 to Neff). Furthermore, U.S. Pat. No. 5,348,604 to Neff requires that the laser energy must impinge on the material through the flow path of the material deposition, placing severe restraints on the energy density of the light source required. In light of these and other examples of prior art, the present invention provides a number of advantages relative to methods of material application practiced in the prior art, including:

1 The method provides bond strengths significantly stronger than bonds made without light mediation.

The method exhibits large benefits on a wide variety of substrates.

The method utilizes inexpensive components. For comparison purposes, the illumination experiments described above were carried out using a lamp with a retail price of $18, and with an inexpensive rheostat control, whereas a YAG laser, used in the prior art, may cost well in excess of $20,000 including its power supplies, water circulators, water purifiers, and laser optics.

The method exhibits benefits over a wide range of operating conditions. The treatment may be carried out before or after the deposition of the extrudable material. Furthermore, the light energy may be provided with a short duration intense illumination, or with a less intense illumination of longer duration. This operating parameter flexibility indicates the ease with which the method can be applied to a variety of manufacturing environments.

The method utilizes equipment that requires little and inexpensive maintenance. The system used in the experiments required minimal calibration and maintenance, and can be compared with the intense and expensive maintenance required, for example, for an industrial YAG laser, where water, optics and illumination system components require frequent replacement with expensive components, as well as lengthy calibration.

The method is energy efficient. The system used in the experiments was over 12% efficient at converting input electrical energy into light energy at the substrate, and the method described above for areal surfaces should be well over 50% efficient. On the other hand, for comparison purposes, YAG laser-based systems are generally less than 3% efficient, and often much less. The energy-efficiency of the method increases the operational cost effectiveness of the method.

The method can be applied when the material deposition apparatus utilizes small apertures. Because of this, lower energy density illumination sources, which are generally inexpensive to purchase and operate, can be used.

The method can be used with extrudable materials which are largely opaque to the incident illumination, by illuminating the substrate prior to material deposition. This increases the number of materials in which light mediation of material application can be practiced.

The method can be used in areal applications. With laser-based light mediation that uses small irradiation apertures, the material deposition apparatus must be passed many times over the substrate to assure even coverage, or a multitude of deposition points must be used. With the present method, wide array illumination of moderate power density can be used, allowing the use of appropriate wide-array material deposition apparatuses.

Because the method effectively uses broad wavelength illumination sources, materials which absorb in a restricted number of wavelengths can be used. With laser-based light mediation, light-mediation may not be used if the material has discrete light absorption at the wavelength of laser emission.

Because the electromagnetic energy used in heating the substrate never passes through the deposition apparatus, and because wide-spectrum energy sources may be used, the intense light sources used for light-mediation may serve a second purpose in initiating cross-linking of light-activatable cross-linkable extrudable materials. This reduces the cost of using the method since a focused, high-power UV source may not need to be separately provided.

It should be apparent to one skilled in the art that the above-mentioned embodiments are merely illustrations of a few of the many possible specific embodiments of the present invention. Numerous and varied other arrangements can be readily devised by those skilled in the art without departing from the spirit and scope of the invention.

What is claimed is:

1. A method for applying a heat-activatable material to a solid substrate to form a bond, comprising:

(a) heating the material above its melting temperature, so that it becomes molten;

(b) irradiating the substrate in an area with light from a radiant heat source, the substrate being substantially opaque to the light, with an energy density on the substrate that is greater than approximately 50 mJ/mm$^2$ and is less than an amount which would cause substantial pyrolysis of the substrate; and (c) subsequently applying the material in a molten state to the heated area of the substrate within approximately 1 minute after the step of irradiating the substrate, wherein a portion of the material proximal to the heated area on the substrate is heated by contact with the substrate so that the portion of the material becomes relatively less viscous and thereby conforms to the substrate.

2. The method of claim 1, wherein the radiant heat source includes a laser.

3. The method of claim 2, wherein the laser includes a carbon-dioxide laser.

4. The method of claim 2, wherein the laser includes a diode array.

5. The method of claim 1, wherein the radiant heat source generates substantially isotropic radiation.

6. The method of claim 5, wherein the radiant heat source includes a xenon arc lamp.

7. The method of claim 5, wherein the radiant heat source includes a coiled tungsten wire.

8. The method of claim 7, wherein the substrate is moved relative to the area of application of the material in a direction, wherein the axis of the coiled tungsten wire is substantially linear and is oriented approximately parallel to the direction of movement of the substrate relative to the area of application of the material.

9. The method of claim 5, wherein heat energy from the substantially isotropic radiant heat source is collected using a reflecting surface.

10. The method of claim 9, wherein the reflecting surface contains a shape through one of its cross-sections substantially in a form selected from the group consisting of ellipses, circles and parabolas.

11. The method of claim 5, wherein heat energy from the substantially isotropic radiant heat source is collected using a converging optical lens.

12. The method of claim 1, wherein the light from the radiant heat source has an energy density that is greater than approximately 250 mJ/mm$^2$ on the substrate.

13. The method of claim 1, wherein the material is applied to the substrate within approximately 5 seconds of the irradiation of the substrate.

14. The method of claim 1, including removal of visible light energy from the output of the radiant heat source, prior to irradiating the substrate.

15. The method of claim 1, including treating the substrate to promote absorption of radiant heat from the radiant heat source, prior to irradiating the substrate.

16. The method of claim 15, wherein the treatment comprises depositing a radiant heat absorbing compound onto the substrate.

17. The method of claim 1, including passing a stream of non-reactive gas over the substrate during some or all of a time period from the onset of irradiating to the onset of the applying of the material, wherein the gas substantially excludes oxygen-bearing atmosphere from the vicinity of the substrate and protects the substrate from oxidation.

18. The method of claim 1 in combination with the heat-activatable material, wherein the material comprises:

(a) a bulk heat-activatable agent whose temperature of heat-activation is below that of the temperature of the molten material at the time of application to the heated area; and (b) a particle heat-activatable agent including particles of diameter less than 100 microns, whose temperature of heat-activation is above that of the temperature of the molten material at the time of application to the heated area and whose temperature of heat-activation is below that of the heated area, and wherein the particles are homogeneously mixed within the bulk agent;

wherein a portion of the material proximal to the heated area on the substrate is heated by contact with the substrate so that in this portion the particle agent is activated and allows the particle agent to participate relatively more in bond creation.

19. The method of claim 18, wherein the particles have a diameter of less than 25 microns.

20. The method of claim 18, wherein the particle agent has a temperature of heat-activation that is greater than 50° C. above that of the temperature of the molten material at the time of application to the heated area.

* * * * *